United States Patent
Ji et al.

(10) Patent No.: US 9,733,828 B2
(45) Date of Patent: Aug. 15, 2017

(54) MOBILE TERMINAL AND CONTROL METHOD THEREOF

(71) Applicant: LG Electronics Inc., Seoul (KR)

(72) Inventors: Jaeyoung Ji, Seoul (KR); Byoungzoo Jeong, Seoul (KR); Jinhae Choi, Seoul (KR); Soyeon Yim, Seoul (KR); Kyungjin You, Seoul (KR); Soohyun Lee, Seoul (KR); Younghoon Lee, Seoul (KR); Nayeoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 363 days.

(21) Appl. No.: 14/528,588

(22) Filed: Oct. 30, 2014

(65) Prior Publication Data
US 2015/0135080 A1    May 14, 2015

(30) Foreign Application Priority Data

Nov. 14, 2013  (KR) .................. 10-2013-0138463
Jan. 3, 2014    (KR) .................. 10-2014-0000849

(51) Int. Cl.
| | | |
|---|---|---|
| *G06F 3/16* | (2006.01) | |
| *G06F 3/0488* | (2013.01) | |
| *G09G 5/10* | (2006.01) | |
| *G06F 3/0482* | (2013.01) | |
| *G06F 3/0484* | (2013.01) | |
| *G06F 3/0481* | (2013.01) | |
| *G06F 3/041* | (2006.01) | |

(52) U.S. Cl.
CPC ........ *G06F 3/04886* (2013.01); *G06F 3/0416* (2013.01); *G06F 3/0482* (2013.01); *G06F 3/04817* (2013.01); *G06F 3/04842* (2013.01); *G06F 3/167* (2013.01); *G09G 5/10* (2013.01)

(58) Field of Classification Search
CPC .................................................. G06F 3/0416
USPC ............................................ 715/728
See application file for complete search history.

(56) References Cited

U.S. PATENT DOCUMENTS

| | | | | |
|---|---|---|---|---|
| 8,441,356 | B1 * | 5/2013 | Tedesco | G08B 21/0453 340/539.15 |
| 9,104,271 | B1 * | 8/2015 | Adams | G06F 3/0426 |
| 2006/0248478 | A1 * | 11/2006 | Liau | G06F 3/015 715/863 |
| 2009/0322685 | A1 * | 12/2009 | Lee | G06F 3/011 345/173 |
| 2010/0033457 | A1 * | 2/2010 | Kim | G09G 3/2003 345/207 |
| 2011/0055846 | A1 * | 3/2011 | Perez | G06F 3/017 719/313 |
| 2011/0221709 | A1 * | 9/2011 | Yao | G06F 3/039 345/179 |
| 2012/0280917 | A1 | 11/2012 | Toksvig et al. | |

(Continued)

*Primary Examiner* — William Titcomb
(74) *Attorney, Agent, or Firm* — Birch, Stewart, Kolasch & Birch, LLP

(57) ABSTRACT

A mobile terminal including a wireless communication unit configured to provide wireless communication; a touch screen; and a controller configured to receive a plurality of taps applied to the touch screen, and display at least one function executable by the mobile terminal on the touch screen based the received plurality of taps and based on at least one of an operating state and an ambient environmental state of the mobile terminal.

19 Claims, 32 Drawing Sheets

(56) References Cited

U.S. PATENT DOCUMENTS

| | | | | |
|---|---|---|---|---|
| 2013/0060183 A1* | 3/2013 | Ramirez | ................ | A63B 71/14 |
| | | | | 602/48 |
| 2013/0270896 A1* | 10/2013 | Buttolo | ................ | H03K 17/955 |
| | | | | 307/9.1 |
| 2013/0270899 A1* | 10/2013 | Buttolo | ................ | H03K 17/955 |
| | | | | 307/9.1 |
| 2013/0271157 A1* | 10/2013 | Buttolo | ................ | H03K 17/955 |
| | | | | 324/647 |
| 2013/0291281 A1* | 11/2013 | Lee | .................... | A41D 19/0024 |
| | | | | 2/160 |
| 2013/0328828 A1* | 12/2013 | Tate | ........................ | G06F 3/044 |
| | | | | 345/174 |
| 2014/0028611 A1* | 1/2014 | Chen | .................... | G06F 3/0416 |
| | | | | 345/174 |

* cited by examiner

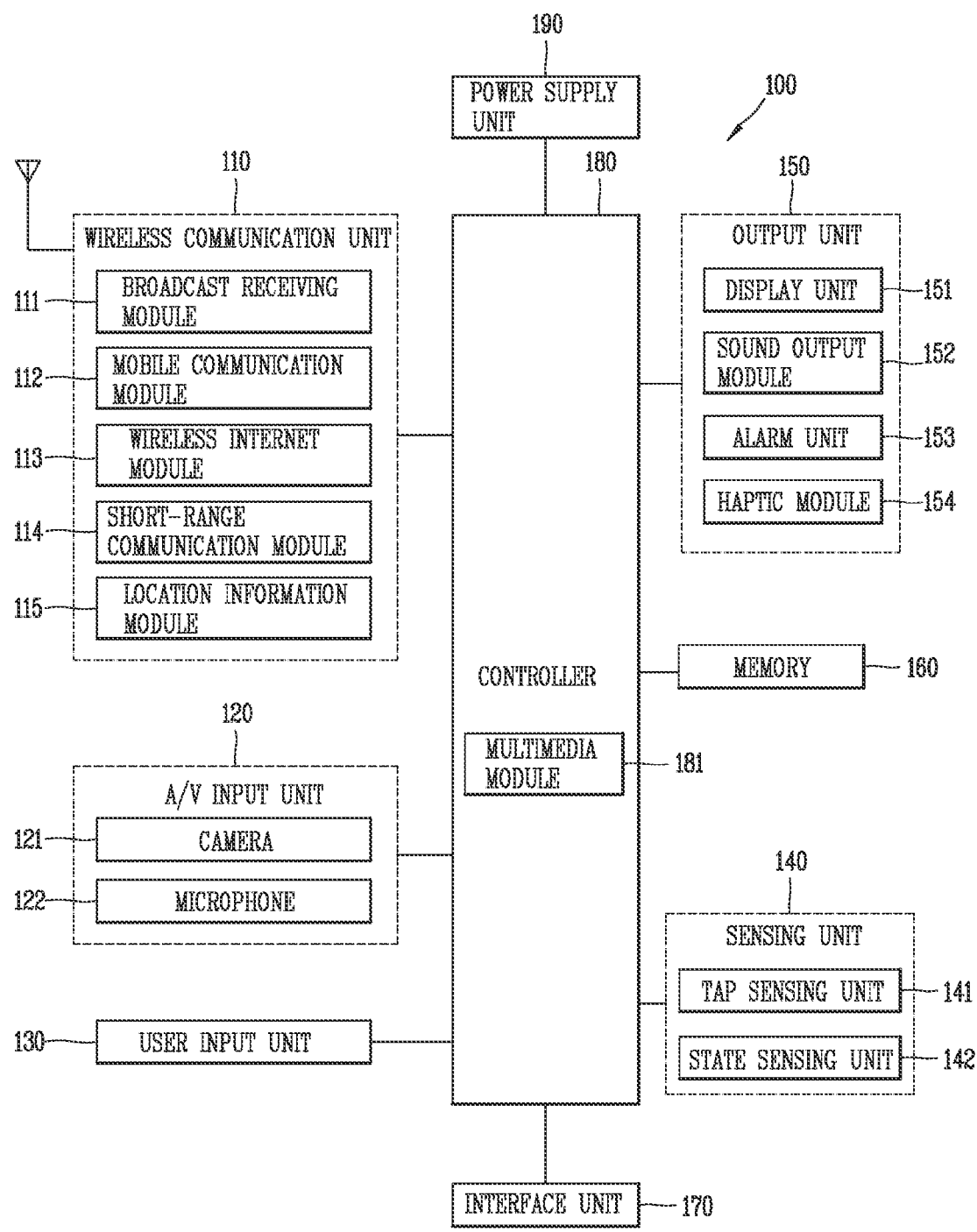

(a)  (b)

(a)  (b)

(a)  (b)

MOBILE TERMINAL AND CONTROL METHOD THEREOF

CROSS-REFERENCE TO RELATED APPLICATIONS

This application claims the benefit of priority of Korean Patent Application Nos. 10-2013-0138463 and 10-2014-0000849, filed on Nov. 14, 2013 and Jan. 3, 2014, which is herein expressly incorporated by reference in their entireties.

BACKGROUND OF THE INVENTION

1. Field of the Invention

This present invention relates to a mobile terminal and a control method thereof.

2. Background of the Invention

Mobile terminals are implemented as multimedia devices having various functions, such as capture or playback of photographs or videos, Internet search, short message service (SMS), or social network service (SNS). Such mobile terminals can also provide more functions and services due to the current technology development. Thus, research is being conducted on a method for allowing a user to easily and directly select a desired function in a mobile terminal.

SUMMARY OF THE INVENTION

Therefore, an aspect of the present invention is to provide a mobile terminal and a control method thereof, which allows the user to easily and conveniently select and execute a desired function in a mobile terminal.

Another aspect of the present invention is to provide a mobile terminal and a control method thereof, which allows the user to select and execute a desired function in a mobile terminal without a complicated process in which several menu selection screens should be experienced.

Still another aspect of the present invention is to provide a mobile terminal and a control method thereof, which provides more suitable user interface screen according to a state and a situation of a user who applies a tap to the mobile terminal.

To achieve these and other advantages and in accordance with the purpose of this specification, as embodied and broadly described herein, there is provided a mobile terminal including a main body of the mobile terminal, a touch screen disposed on the main body, and a control unit configured to, when a plurality of taps are applied to the touch screen, control any one of functions executable by the mobile terminal to be displayed based on any one of an operation state of the mobile terminal or an ambient environmental state of the mobile terminal and based on the plurality of taps.

When the plurality of taps are applied to at least two different positions of the main body that are separated a certain distance from each other while the touch screen is deactivated, the control unit may output a predetermined virtual keyboard for performing a character input function to at least a portion of the touch screen and process information input through the virtual keyboard in association with at least one of functions executable by the mobile terminal.

The control unit may display graphic objects corresponding to the at least one function executable by the mobile terminal on the touch screen before the virtual keyboard is output to the touch screen when the plurality of taps are applied, and process the information input through the virtual keyboard in association with a function corresponding to the any one graphic object selected by a user from among the graphic objects.

The control unit may output a lock screen including a graphic object for displaying at least one unchecked event when the user's input for activating the touch screen is applied while the touch screen is deactivated and display information related to the unchecked event on the touch screen when the plurality of taps are applied while the lock screen is output.

The control unit may process the information related to the virtual machine in association with any one selected by the user from among the unchecked events.

The control unit may output the information related to the unchecked event and the virtual keyboard to different regions and process the information input through the virtual keyboard in association with any one uncheck event selected by the user when the plurality of taps are applied.

When any one is selected from the information related to the unchecked event, the control unit may reflect a checked state to at least one graphic object for displaying the unchecked event and display the graphic object having the checked state reflected thereto on still another region of the touch screen.

The control unit may output the virtual keyboard when the plurality of taps are applied and each of the plurality of taps corresponds to a predetermined condition.

The predetermined condition may be that a first tap indicating the main body is hit a first reference number of times is applied and then a second tap indicating the main body is hit a second reference number of times is applied in a predetermined time or that the first tap and second tap are applied to positions that are separated a certain distance from each other.

The control unit may perform search using the information input through the virtual keyboard and output the search result to at least a partial region of the touch screen.

When the plurality of taps are applied while the touch screen is deactivated, the control unit may display at least one icon corresponding to different functions executable by the mobile terminal on the touch screen based on at least one of a distance between the positions in which the plurality taps are applied and angles at which the plurality of taps are applied.

When the plurality of taps are applied, according to ambient brightness of the main body, the control unit may display a menu screen including an icon corresponding to at least one application that adjusts brightness of the touch screen and corresponds to the ambient brightness.

The control unit may determine whether the user wears a glove based on an electric current generated from a touch object that applies the tap and operate any one of a user interface corresponding to a glove wearing state and a typical user interface based on the determination result.

The user interface corresponding to the glove wearing state may include application icons having a size larger than an application icon included in the typical user interface.

When the control unit operates in a user interface corresponding to the glove wearing state and an icon corresponding to any one of applications related to the character input is selected by the user, the control unit may convert a voice signal input from the user into character information to process the character information in association with an application corresponding to the icon.

When the plurality of taps are applied while the touch screen is deactivated, the control unit may display a menu screen including an icon corresponding to predetermined at least one application on the touch screen based on whether the user wears a glove.

When the plurality of taps are applied, the control unit may perform different functions based on at least one of a current time and a position movement state of the main body and based on whether the user wears a glove.

The control unit may determine whether the user is running or walking based on at least one of the current time and the position movement state, and when the plurality of taps are applied, provide information related to a current position of the mobile terminal or information about the current time to a user in different forms based on the determined operation state of the user.

When at least one peripheral device connectable to the main body is positioned in proximity to the main body, and the plurality of taps are applied, the control unit may perform connection to the at least one peripheral device and display information related to the connected peripheral device on the touch screen.

There is also provided a control method of a mobile terminal, the control method including receiving, by a touch screen of the mobile terminal, a plurality of touch signals, and displaying any one of functions executable by the mobile terminal on the touch screen based on any one of an operation state of the mobile terminal or an ambient environmental state of the mobile terminal and based on the plurality of touch signals.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 1 is a block diagram showing a mobile terminal according to an embodiment of the present invention;

DETAILED DESCRIPTION OF THE INVENTION

Figure 2A:
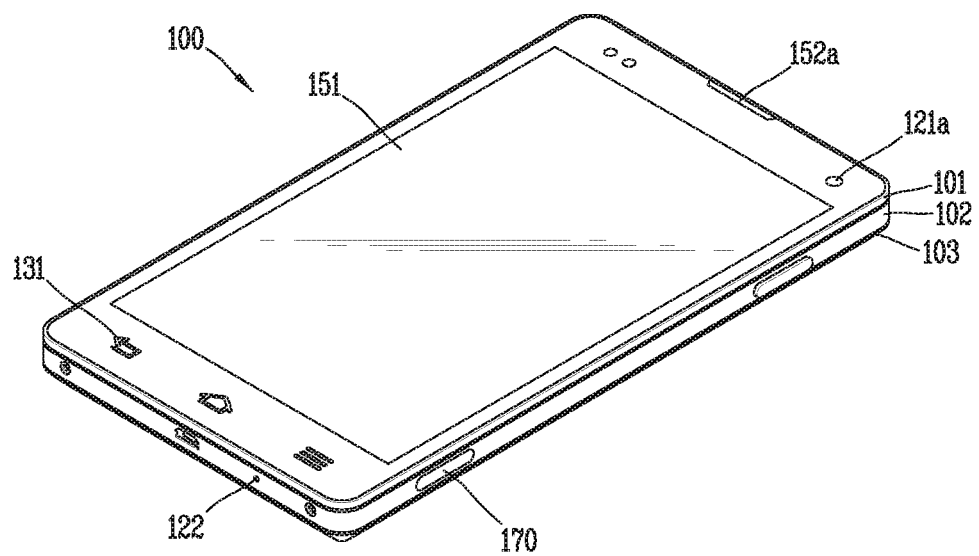
FIGS. 2A and 2B are front and rear perspective views of a mobile terminal according to an embodiment of the present invention.

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, etc. However, it will be obvious to those skilled in the art that the present invention may be also applicable to a fixed terminal such as a digital TV and a desktop computer, except for specific configurations for mobility.

FIG. 1 is a block diagram of a mobile terminal 100 according to one embodiment of the present invention. The mobile terminal 100 may include components, such as a wireless communication unit 110, an Audio/Video (A/V) input unit 120, a user input unit 130, a sensing unit 140, an output unit 150, a memory 160, an interface unit 170, a controller 180, a power supply unit 190, and the like. FIG. 1 shows the mobile terminal 100 having various components, but implementing all of the illustrated components is not a requirement. Greater or fewer components may alternatively be implemented.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and in this instance, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLU- ETOOTH, Radio Frequency IDentification (RFID), Infrared Data Association (IrDA), Ultra-WideBand (UWB), ZigBee, and the like. The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display unit 151. The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 for the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

When the display unit 151 and a touch sensitive sensor (hereinafter, referred to as a "touch sensor") have an inter-layer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 can sense which region of the display unit 151 has been touched.

A proximity sensor may also be arranged at an inner region of the mobile device 100 surrounded by the touch screen, or adjacent to the touch screen. The proximity sensor may be provided as an example of the sensing unit 140. The proximity sensor refers to a sensor to sense the presence or absence of an object approaching to a surface to be sensed, or an object disposed adjacent to a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this instance, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into part of the alarm 153.

The haptic module 154 generates various tactile effects which a user can feel. A representative example of the tactile effects generated by the haptic module 154 includes vibration. Vibration generated by the haptic module 154 can have a controllable intensity, a controllable pattern, and so on. For instance, different vibration may be output in a synthesized manner or in a sequential manner.

The haptic module 154 can generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 can be configured to transmit tactile effects through a user's direct contact, or a user's muscular sense using a finger or a hand. The haptic module 154 can be implemented in two or more in number according to the configuration of the mobile terminal 100.

The memory 160 can store a program for processing and controlling the controller 180. Alternatively, the memory 160 may temporarily store input/output data (e.g., phonebook, messages, still images, videos, and the like). Also, the memory 160 may store data related to various patterns of vibrations and sounds output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 allows a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

Further, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 can include a multimedia module 181 which provides multimedia playback. The multimedia module 181 may be configured as part of the controller 180 or as a separate component.

Furthermore, the controller 180 can perform a pattern recognition processing so as to recognize writing or drawing input performed on the touch screen as text or image. Furthermore, the controller 180 can implement a lock state for limiting the user's control command input to applications when the state of the mobile terminal satisfies a preset condition. Furthermore, the controller 180 can control a lock screen displayed in the lock state based on a touch input sensed through the display unit 151 in the lock state.

The power supply unit 190 receives external and internal power to provide power required for various components under the control of the controller 180. Various embodiments described herein may be implemented in a computer or similar device readable medium using software, hardware, or any combination thereof.

For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some instances, such embodiments may be implemented in the controller 180 itself For a software implementation, the embodiments such as procedures or functions described in the present invention may be implemented with separate software modules. Each of the software modules may perform at least one function or operation described in the present invention. Software codes can be implemented by a software application written in any suitable programming language. The software codes may be stored in the memory 160 and executed by the controller 180.

In addition, the sensing unit 140 of the mobile terminal 100 according to an embodiment of the present invention may further include a tap sensing unit 141 configured to sense a tap indicating that a user hits a main body or the display unit 151 or a tap gesture and a state sensing unit 142 configured to sense an operation state and an environmental state of the mobile terminal 100.

The tap sensing unit 141 can sense a gesture of hitting the main body or the display unit 151 of the mobile terminal 100 or an article. More specifically, the tap may be understood as an operation of lightly hitting the main body and the display unit 151 of the mobile terminal 100 or the article with a tap object such as a finger or an operation of bring the tap object into contact with the main body and the display unit 151 of the mobile terminal 100 or the article.

The tab object for applying the tap may be a thing capable of applying external force to the main body and the display unit 151 the mobile terminal 100 or the article, which includes, for example, a finger, a stylus pen, a pen, a pointer, a blow, and the like. The tap object is not limited to the thing capable of applying a touch input to the mobile terminal 100 according to an embodiment of the preset invention, but may include various types of things capable of applying an external force to the main body and the display unit 151 of the mobile terminal 100 or the article.

The article to which the tap gesture is applied may include at least one of the main body of the mobile terminal 100 and the article on which the mobile terminal 100 is positioned. In an embodiment of the present invention, the tap or tap gesture may be sensed by at least one of an acceleration sensor and a touch sensor which are included in the tap sensing unit 141. Here, the acceleration sensor can measure acceleration of the main body of the mobile terminal 100 or dynamic forces, such as vibration, impact, and the like, applied to the main body and the display unit 151.

That is, the acceleration sensor may sense movement (or vibration) of the main body of the mobile terminal 100 that is caused by the tap gesture to determine whether the tap has been applied to the article. Accordingly, the acceleration sensor may sense a tap applied to the main body of the mobile terminal 100 or sense a tap applied to the article that is positioned so closely to the main body of the mobile terminal 100 to sense whether movement or vibration has occurred in the main body of the mobile terminal 100.

As such, the acceleration sensor can sense a tap applied to a point that is positioned away from the main body in addition to the main body of the mobile terminal as long as the acceleration sensor can sense the movement or vibration in the main body of the mobile terminal 100.

The mobile terminal according to an embodiment of the present invention may use only one of the acceleration sensor and the touch sensor, sequentially use the acceleration sensor and the touch sensor, or simultaneously use the acceleration sensor and the touch sensor in order to sense a tap applied to the main body or the display unit 151 of the mobile terminal 100. To sense a tap, a mode using only the acceleration sensor may be referred to as a first mode, a mode using the touch sensor may be referred to as a second mode, a mode using both of the acceleration sensor and the touch sensor (simultaneously or sequentially) may be referred to as a third mode or hybrid mode.

When a tap is sensed through the touch sensor, a position in which the tap is sensed may be found more accurately. The mobile terminal according to an embodiment of the present invention may operate in a specific mode in which minimum electric current or power is consumed even when the display unit 151 of the mobile terminal 100 is in an activated state in order to sense the tap through the acceleration sensor or touch sensor. The specific mode is referred to as a doze mode.

For example, the doze mode may be a mode in which only a light emitting device for outputting a screen to the display unit 151 is turned off, and the touch sensor may be maintained in an on-state, in a touch screen structure in which the touch sensor and the display unit 151 form a mutual layer structure. Alternatively, the doze mode may be a mode in which the display unit 151 is turned off and the acceleration sensor is maintained in an on-state. Alternatively, the doze mode may be a mode in which the display unit 151 is turned off and both of the touch sensor and the acceleration sensor are maintained in an on-state.

Accordingly, in the doze mode, that is, when a lighting device of the display unit 151 is turned off or the display unit 151 is turned off (i.e., the display unit 151 is inactivated), and when a user applies the tap to at least one point on the display unit 151 or a specific point of the main body of the mobile terminal 100, at least one of the touch sensor and the acceleration sensor, which is turned on, can sense that the tap has been applied by the user.

In addition, the tap sensing unit 141 can determine that "tap" for controlling the mobile terminal 100 has been sensed only when two or more taps are applied in a reference time. For example, when one tap is applied to the display unit 151 by the touch object for applying a touch to the display unit 151, the tap sensing unit 141 can recognize the one tap as a touch input. That is, in this instance, the controller 180 can control a function (for example, a function of selecting an icon output at a point where the touch input is applied) according to a touch input corresponding to the one tap rather than a function corresponding to the one tap.

Accordingly, the controller 180 can determine whether "tap" for controlling one or more functions has been sensed only when two or more (or a plurality of) consecutive taps are sensed by the tap sensing unit 141 in a reference time. That is, the tap gestures may mean that the tap gesture is sensed twice or more consecutively in the reference time. Accordingly, the phrase "tap has been sensed" used herein may mean that it has been sensed that the main body or the display unit 151 of the mobile terminal 100 is tapped substantially two or more times with an object such as a user's finger or touch pen.

Furthermore, the controller 180 can determine whether the taps are applied with the same or different fingers of the user in addition to whether the taps are sensed in the reference time. For example, when the taps are sensed on the display unit 151, the controller 180 can sense whether the taps are applied with one or different fingers by utilizing fingerprints that are sensed at points where the taps are applied. Alternatively, the controller 180 can sense whether the taps are applied with one or different fingers by recognizing positions in which the taps are sensed on the display unit 151 or accelerations which are caused by the taps through at least one of the touch sensor and acceleration sensor that are included in the tap sensing unit 141.

Furthermore, the controller 180 can sense whether the taps are applied with one hand or finger or both hands or at least two fingers by the user in further consideration of angles and distances at which the taps are applied or directions in which the fingerprints are recognized. The taps may mean a plurality of hits that are sensed consecutively in a reference time. Here, the reference time may be a very short time, for example 300 ms to 2 sec.

Further, when the tap sensing unit 141 senses that the main body or the display unit 151 of the mobile terminal 100 is first hit, the tap sensing unit 141 can sense a presence of a subsequent hit in a reference time after the first hit is sensed. Then, when the subsequent hit is sensed in the reference time, the tap sensing unit 141 or the control unit 108 may determine that a tap for controlling a specific function of the mobile terminal 100 has been sensed according to an embodiment of the present invention. As such, the controller 180 can determine whether the tap has been applied by the user to control the mobile terminal 100 or just by mistake by recognizing the tap as an effective tap only when a second tap is sensed in a predetermined time after the first tap is sensed.

In addition, there may be various methods for recognizing the effective tap. For example, the controller 180 can recognize, as the effective tap, a second tap indicating that the main body or display unit 151 is hit a second reference number or more of times in a predetermined time after a first tap indicating that the main body or display unit 151 is hit a first reference number or more of times is sensed. Here, the first reference number may be the same as or different from the second reference number. For example, the first reference number may be one, and the second reference number may be two. Alternatively, the first reference number may be one, and also the second reference number may be one.

In addition, the controller 180 can determine that a "tap" have been sensed only when the tap is applied to a "predetermined region." That is, when a first hit is sensed on the main body or display unit 151 of the mobile terminal 100, the controller 180 can calculate a predetermined region away from a point in which the first hit has been sensed. Then, when the "predetermined region" is hit the first or second reference number or more of times within the reference time from a time when the first hit is sensed, the controller 180 can determine the first tap or the second tap is applied.

The above described reference time and predetermined region may be varied depending on the embodiment of the present invention. Each of the first tap and the second tap may be sensed as a separate tap depending on a position in which each tap has been sensed in addition to the reference time and the predetermined region. That is, the controller 180 can determined that the first tap and the second tap are applied when the second tap is sensed at a position spaced a certain distance from a position in which the first tap is sensed. As such, when the first tap and the second tap are recognized based on the sensed position, the first tap and the second tap may be sensed at the same time.

In addition, when the first tap and the second tap include a plurality of touches, that is, a plurality of taps, the plurality of touches included in each of the first tap and the second tap may also be sensed at the same time. For example, while a first touch included in the first tap is sensed and at substantially the same time, a first touch included in the second tap is sensed at a position spaced a certain distance from a position in which the first touch of the first tap is sensed, the controller 180 can sense the first touches included in the first tap and the second tap. When an additional touch input is sensed at each position and then the touch is sensed at each position the first reference number or the second reference number or more of times, the controller 180 can determine that the first tap and the second tap are applied.

The state sensing unit 142 can sense a current operation state and an environmental state of the mobile terminal 100. For example, the state sensing unit 142 can determine the operation state of the mobile terminal 100, that is, whether the mobile terminal 100 is currently in a call operation or in a camera capturing operation. Furthermore, the state sensing unit 142 can sense a current environmental state of the mobile terminal 100.

The term "environmental state" used herein includes a direction in which the mobile terminal 100 is positioned, that is, when the mobile terminal 100 faces upward or downward or when the mobile terminal 100 lies on its side or stands upright. Thus, the state sensing unit 142 can further include various sensors such as a gyro sensor.

Here, the direction of the mobile terminal 100 may be determined when a call speaker of the mobile terminal 100 is positioned upward and a call microphone of the mobile terminal 100 is positioned downward. Furthermore, the controller 180 can determine when the mobile terminal 100 is lifted or when the mobile terminal 100 is laid using a gyro sensor, etc. The controller 180 can determine that the mobile terminal 100 stands upward when the call speaker is positioned higher than the call microphone in a vertical direction of the mobile terminal 100, and can determine that the mobile terminal 100 stands downward in the opposite case.

Furthermore, the state sensing unit 142 can sense whether the mobile terminal 100 lies on its side or stands upright. For example, the state sensing unit 142 can sense whether the mobile terminal 100 is in a horizontal state or in a vertical state using a gyro sensor, etc. Specifically, the state sensing unit 142 can determine that the mobile terminal 100 lies on its side when the mobile terminal 100 is in the horizontal state and determine that the mobile terminal 100 stands upright when the mobile terminal 100 is in the vertical state.

In addition, the state sensing unit 142 can further sense an ambient brightness or the like of the mobile terminal 100. For example, the state sensing unit 142 can further include an illumination sensor, and may determine the ambient brightness of the mobile terminal 100 based on a value sensed by the illumination sensor. When a tap is sensed on the main body or the display unit 151 of the mobile terminal 100 by the tap sensing unit 141 multiple times, the controller 180 can control at least one of functions executable by the mobile terminal based on the tap that is sensed multiple times.

For example, the controller 180 can control at least one of functions executable on the mobile terminal when the tap sensed multiple times satisfies a predetermined condition. As an example, the controller 180 can control different functions depending on whether the user applies the plurality of taps using only one finger or hand or at least two fingers or both hands. Furthermore, the controller 180 can control at least one of functions executable by the mobile terminal 100 according to the plurality of taps based on the current operation state of the mobile terminal 100 and the environmental state of the mobile terminal 100.

Here, the functions executable on the mobile terminal 100 may mean all kinds of functions that can be executed or driven by the mobile terminal 100. For example, one of the executable functions may be an application installed by the mobile terminal 100. For example, the phrase "execute any function" may mean that any application is executed or driven in the mobile terminal 100.

As another example, the function executable by the mobile terminal 100 may be a function that is needed to basically drive the mobile terminal 100. For example, the basic driving function may include a function of turning on/off a lighting device included in the display unit 151, a function of switching the mobile terminal 100 from an unlock state to a lock state or from the lock state to the unlock state, a function of setting a communication network, and a function of changing setting information of the mobile terminal 100.

In addition, the function executable by the mobile terminal 100 may be a function associated with an input of a character. For example, when the user applies a plurality of taps on the display unit 151 of the mobile terminal 100, the mobile terminal 100 according to an embodiment of the present invention may output a screen associated with an input method editor (IME), that is, a screen such as a virtual keyboard based on an input state of the plurality of taps. As an example, the controller 180 can output the virtual keyboard on the display unit 151 when the user inputs the plurality of taps with at least two fingers or both hands as a result of sensing of the taps by the tap sensing unit 141.

Also, the controller 180 can process information input through the virtual keyboard in association with the function related to the character input. For example, the controller 180 can use the information input through the virtual keyboard to perform searching and output the searching result on the display unit 151. In addition, the controller 180 can use the information input through the virtual keyboard to provide a social network service (SNS) or a short message service (SMS) message.

Furthermore, the controller 180 can distinguish between a case in which a user uses at least two fingers or both hands and a case in which a user uses only one finger or hand to configure different menu screens as a result of sensing of the taps by the tap sensing unit 141. For example, as a result of sensing by the tap sensing unit 141, when the plurality of taps are applied with at least two fingers or both hands of the user, the controller 180 can output a screen including functions, such a character input function, that may be controlled by the user with both hands to the display unit 151. Furthermore, when the plurality of taps are applied with only one finger or hand of the user, the controller 180 can output a screen including functions, such as video appreciation or music appreciation, that may be controlled by the user with only one hand to the display unit 151.

Figure 2B:
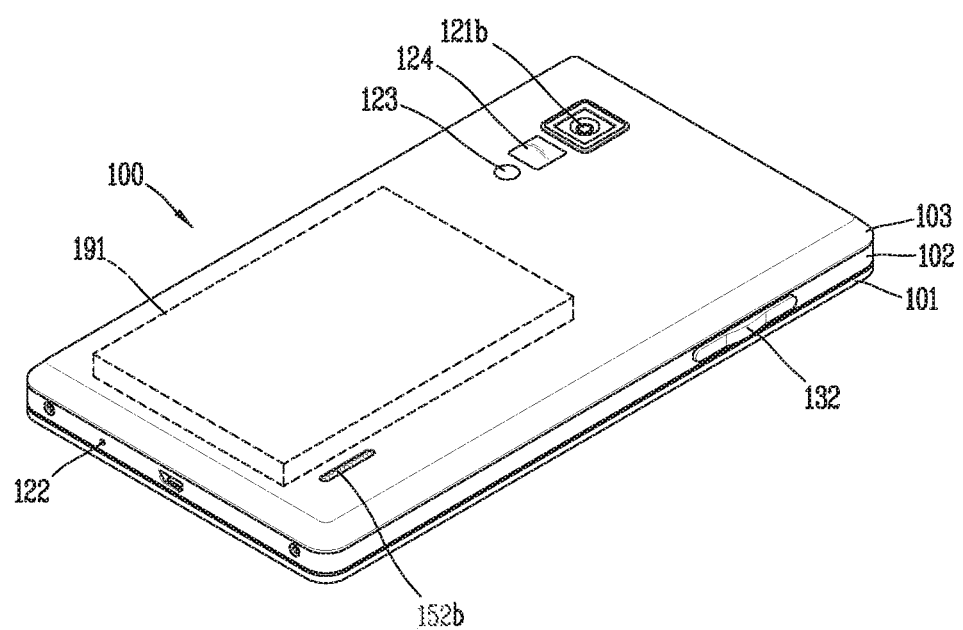

Hereinafter, a mobile terminal according to an embodiment of the present invention as illustrated in FIG. 1 or a mobile terminal disposed with the constituent elements of the mobile terminal or the structure of a mobile terminal will be described. In particular, FIG. 2A is a front perspective view illustrating an example of the mobile terminal 100 associated with the present invention, and FIG. 2B is a rear perspective view illustrating an example of the mobile terminal 100 of FIG. 2A.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components are incorporated into a space formed between the front case 101 and the rear case 102. At least one middle case may be additionally disposed between the front case 101 and the rear case 102. The cases may be formed by injection-molding a synthetic resin or may be also formed of a metal, for example, stainless steel (STS), titanium (Ti), or the like.

A display unit 151, an audio output module 152a, a camera 121a, user input units 131 and 132, and the like may be disposed on a front surface of the terminal body. The display unit 151 occupies most parts of a main surface of the front case 101. The audio output unit 152a and the camera 121a are arranged at ends of the display unit 151.

Various types of visual information may be displayed on the display unit 151. Such information may include characters, numbers, symbols, graphics, icons, or the like. For input of such information, at least one of the characters, numbers, symbols, graphics, icons, or the like are arranged in the form of keypads. Such keypads may be called 'soft keys'. The display unit 151 may be operated as an entire region, or may be operated as it is divided into a plurality of regions. In the latter case, the plurality of regions may be associated with each other.

The user input unit 130 is manipulated to receive a command for controlling the operation of the mobile terminal 100, and may include a plurality of manipulation units 131 and 132. The manipulation units 131 and 132 may be referred to as manipulation portions, and may include any type of ones that can be manipulated in a user's tactile manner.

The manipulation units 131 and 132 may receive various commands. For instance, the first manipulation unit 131 is configured to input commands such as START, END, SCROLL or the like, and is arranged at a region adjacent to another end of the display unit 151, the another end opposite to one end of the display unit 151 where the audio output unit 152a is arranged.

The second manipulation unit 132 and a third manipulation unit are configured to input commands for controlling a level of sound output from the audio output unit 152a, or commands for converting the current mode of the display unit 151 to a touch recognition mode.

A wired/wireless headset port and a wired/wireless data port may be arranged at one side surface of the mobile terminal 100. The ports may be one example of the interface unit 170.

Referring to FIG. 2B, a camera 121b may be additionally provided on the rear case 102. The camera 121b faces a direction which is opposite to a direction faced by the camera 121a (refer to FIG. 2A), and may have different pixels from those of the camera 121a. For example, the camera 121a may operate with relatively lower pixels (lower resolution). Thus, the camera 121a may be useful when a user can capture his face and send it to another party during a video call or the like. Further, the camera 121b may operate with a relatively higher pixels (higher resolution) such that it can be useful for a user to obtain higher quality pictures for later use. The cameras 121a and 121b may be installed at the terminal body so as to rotate or pop-up.

A flash 123 and a mirror 124 may be additionally disposed close to the camera 121b. The flash 123 operates in conjunction with the camera 121b when taking a picture using the camera 121b. The mirror 124 can cooperate with the camera 121b to allow a user to photograph himself in a self-portrait mode.

An audio output unit 152b may be additionally arranged on a rear surface of the terminal body. The audio output unit 152b may cooperate with the audio output unit 152a (refer to FIG. 2A) disposed on a front surface of the terminal body so as to implement a stereo function. Also, the audio output unit 152b may be configured to operate as a speakerphone.

A broadcast signal receiving antenna as well as an antenna for calling may be additionally disposed on a side surface of the terminal body. The broadcast signal receiving antenna of the broadcast receiving module 111 (refer to FIG. 1) may be configured to retract into the terminal body.

The microphone, the interface unit, etc. may be provided at the terminal body. The microphone is arranged at a region adjacent to another end of the display unit 151, the other end opposite to one end of the display unit 151 where the audio output module is arranged. The user input unit 132, a connection port, etc. may be arranged on side surfaces of the front case 101 and the rear case 102.

The connection port may be configured to receive data from an external device, or to receive power and to transmit the power to each component of the mobile terminal 100. Alternatively, the connection port may be configured to transmit data in the mobile terminal 100 to an external device. The connection ports may be an example of the interface unit 170 (refer to FIG. 1).

A power supply unit 190 for supplying power to the mobile terminal 100 is mounted to the body. The power supply unit 190 may be mounted in the body, or may be detachably mounted to the body.

Hereinafter, in a mobile terminal according to an embodiment of the present invention, a process of outputting a virtual keyboard screen on the display unit 151 based on an input state of an applied plurality of taps applied on the display unit 151 of the mobile terminal 100 will be described in detail.

Figure 3:
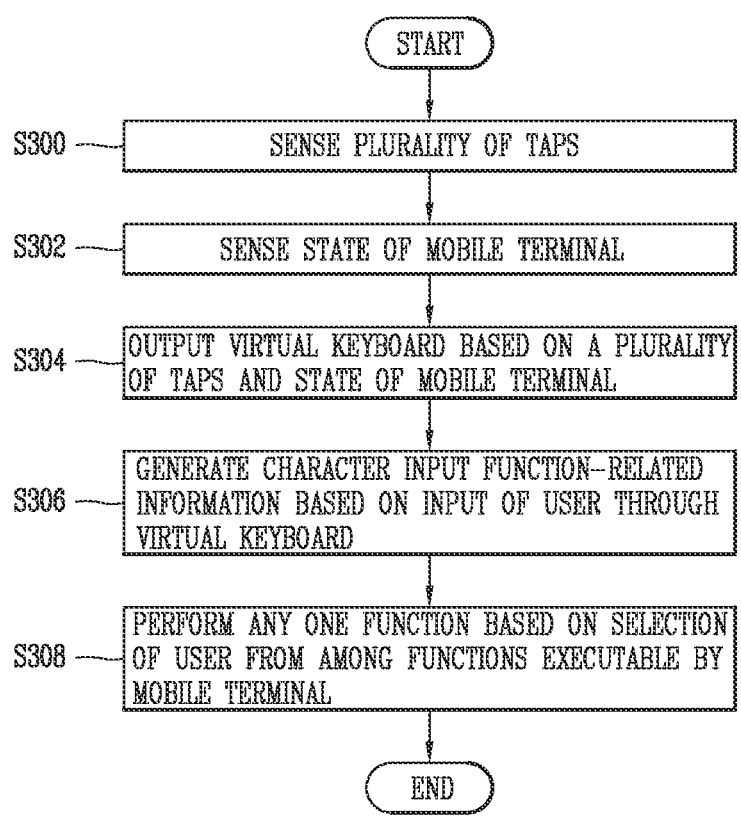
FIG. 3 is a flowchart illustrating a control method of a mobile terminal according to an embodiment of the present invention.
Figure 4:
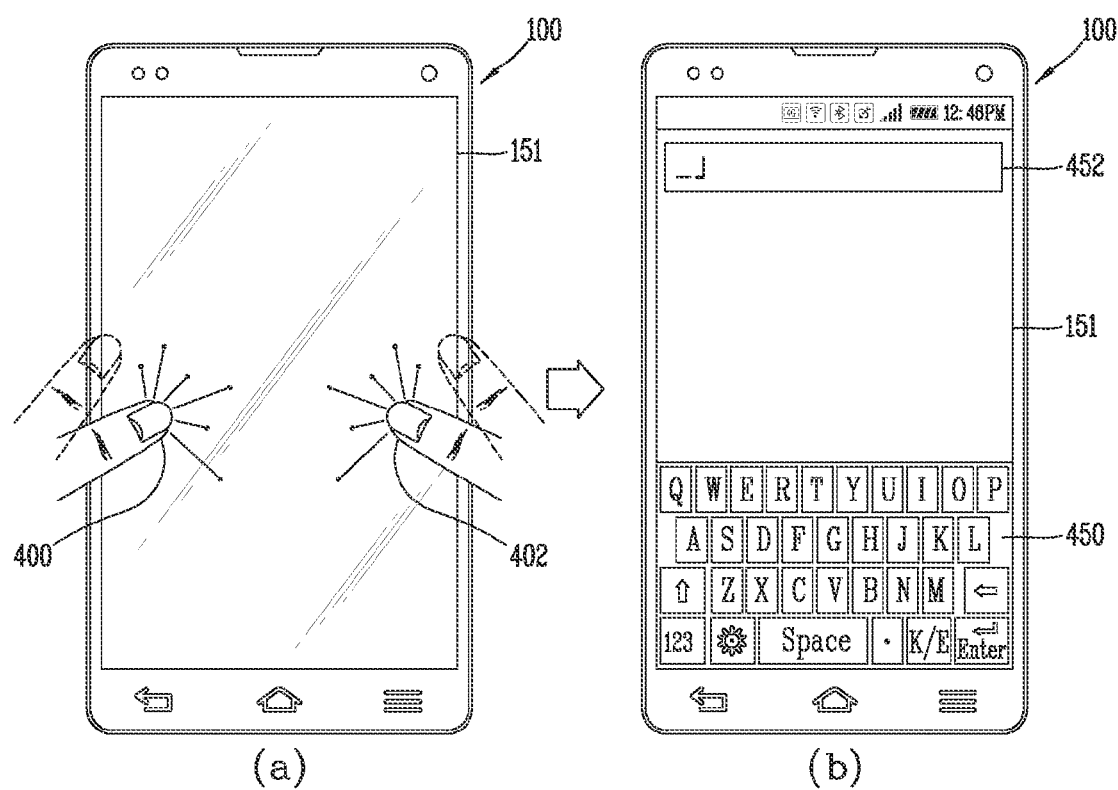
FIG. 4 is a conceptual view showing an example in which a virtual keyboard is output based on a user's tap input in a mobile terminal according to an embodiment of the present invention.

In particular, FIG. 3 is a flowchart illustrating a virtual keyboard screen on the display unit 151 based on an input state of a plurality of taps applied to the main body of the mobile terminal 100 according to an embodiment of the present invention. FIG. 4 is a view showing an example in which a virtual keyboard is output based on a user's tap input in the mobile terminal 100 according to an embodiment of the present invention. For convenience, in FIGS. 3 and 4, an example in which the tap is applied by the user to the display unit 151 will be described.

First, referring to FIG. 3, the controller 180 of the mobile terminal 100 according to an embodiment of the present invention determines whether a plurality of taps have been sensed (S300). Furthermore, the controller 180 can determine whether the plurality of taps are effective taps in operation S300.

For example, as described above, the controller 180 can determine whether a plurality of taps including a first tap and a second tap have been input when the first tap is sensed and then the second tap is sensed in a predetermined time. Here, the first tap and the second tap may be hits applied to the display unit 151 of the mobile terminal 100a first reference number or more of times and a second reference number or more of times, respectively.

When the first reference number or the second reference number is two or more, the controller 180 can recognize that the first tap is applied when a hit is sensed the first reference number of times in a predetermined region that is formed around the region on the display unit 151 where the first hit has been sensed. Furthermore, when the first tap is sensed, a hit is sensed in a predetermined time, and then a hit is applied the two reference number of times in a predetermined region that is formed around a region where the hit has been sensed, the controller 180 can recognize that the second tap is applied.

In the operation S300, the controller 180 can determine whether the sensed first tap and second tap are applied with a user's one hand or finger or whether the sensed first tap and second tap are applied with both hands or at least two fingers of the user. For example, when directions or angles in which the first tap and the second tap are sensed are the same, the controller 180 can determine that the first tap and second tap are applied with one hand or finger of the user. When directions or angles in which the first tap and the second tap are sensed are different over a predetermined level, that is, the first tap is applied from a left side of the mobile terminal 100 and the second tap is applied from a right side of the mobile terminal 100, the controller 180 can determine that the first tap and second tap are applied with one hand or finger of the user.

Alternatively, the controller 180 can determine whether the first tap and the second tap are applied with at least two fingers or with one finger by recognizing and comparing fingerprints of the user who has applied the first tap and the second tap. In addition, in operation S300, the controller 180 can determine that the first tap and second tap are applied by the user with at least two fingers when positions in which the first tap and the second tap are sensed are separated a certain distance from each other. As such, when the plurality of taps are sensed at positions that are separated a certain distance from each other, the first tap and the second tap may be sensed at the same time.

If each of the first tap and the second tap includes a plurality of touches, that is, a plurality of hits, the plurality of touches included in the first tap and the plurality of touches included in the second tap may be sensed at the same time. For example, while a first touch included in the first tap is sensed and at substantially the same time, a first touch included in the second tap is sensed at a position spaced a certain distance from a position in which the first touch of the first tap is sensed, the controller 180 can sense the first touch included in the first tap and the second touch included in the second tap. The controller 180 can sense an additional touch input at each position. When a touch is sensed a first reference number or second reference number or more of times at each position, the controller 180 can determine that the first tap and the second tap are applied.

In this instance, if the first reference number is exactly or substantially equal to the second reference number, the first tap and the second tap may be sensed at the same time. For example, when the first reference number is one and also the second reference number is one, the first tap and the second tap may be sensed at the same time.

In operation S300, when the first and second taps are sensed, the controller 180 determines a current state of the mobile terminal 100 (S302). For example, in operation S302, the control unit 108 may determine whether the display unit 151 is in an on-state (activated state) or in an off-state (deactivated state).

The controller 180 can perform at least one function executable by the mobile terminal 100 based on the result of sensing the state of the mobile terminal 100 in operation S302 and the result of sensing the plurality of taps in operation S300. For example, when the plurality of taps sensed in operation S300 are applied with both hands or at least two hands of the user and the display unit 151 is in an off-state, the controller 180 can output a virtual keyboard for generating information related to a character input function to at least a portion of the display unit 151 (S304).

FIG. 4 illustrates such an example. As shown in (a) of FIG. 4, when a user applies a first tap 400 and a second tap 402 using both hands or at least two fingers, the controller 180 can sense the first tap 400 and the second tap 402 applied to the display unit 151 using at least one of a touch sensor and an acceleration sensor of the tap sensing unit 141. In addition, the controller 180 can check a state of the display unit 151 corresponding to the sensed plurality of taps 400 and 402.

As a result of checking of the state of the display unit 151, when the display unit is deactivated, the controller 180 can output a virtual keyboard 450 to at least a portion of the display unit 151 as shown in (b) of FIG. 4. In this instance, as shown in (b) of FIG. 4, the controller 180 can further output a screen 452 for displaying the result input through the virtual keyboard 450 to another portion of the display unit 151.

As shown in (b) of FIG. 4, the display unit 151 can maintain the remaining region of the display unit 151, other than the virtual key board 450 and the screen 452 for displaying the input result, in the above described doze state. As described above, the term "doze mode" used herein means when a light emitting device for outputting a screen to the display unit 151 is turned off. That is, when the plurality of taps are sensed in operation S300, the controller 180 of the mobile terminal 100 according to an embodiment of the present invention may divide the display unit 151 into a plurality of regions and maintain in the doze mode in the regions other than a region in which the virtual keyboard 450 is output and a region in which the screen for displaying the input result is output. In this instance, the controller 180 of the mobile terminal 100 according to an embodiment of the present invention can reduce unnecessary power consumption.

In operations S300 and S302, it has been described that the controller 180 senses the state of the mobile terminal 100 when the plurality of taps are sensed. However, the state of the mobile terminal 100 may be sensed regardless of whether the plurality of taps have been sensed. For example, the controller 180 can have already recognized the current state of the mobile terminal 100 when the mobile terminal 100 is in the doze state or executes a specific function. In this instance, when the plurality of taps are sensed in operation S300, the controller 180 can proceed to operation S304 to perform at least one function based on the sensing result of the plurality of taps and the current state of the mobile terminal 100.

When a screen for the virtual keyboard 450 is output to the display unit 151 in operation S304, the controller 180 can generate information related to the character input function of the mobile terminal 100 based on input by the user to the virtual keyboard 450 (S306). For example, when a user's touch is sensed on a region of the display unit 151 in which the virtual keyboard is displayed, the controller 180 can generate information related to the character input that is accepted based on a position in which the touch of the user is sensed. Furthermore, the controller 180 can output the generated information to the input result display screen 452.

The information generated in operation S306 may be processed in association with any one selected function by the user from among functions executable by the mobile terminal 100. For example, before or after the virtual keyboard 450 is output in operation S304, the controller 180 can receive any one function selected by the user from among the executable functions by the mobile terminal 100. In addition, the controller 180 can perform the selected function using the information generated in operation S306.

For example, a function of the mobile terminal 100 selected by the user in operation S306 may be a function related to at least one character input function that can be performed by the mobile terminal 100, such as SMS transmission, SNS posting, or Internet search. When any one function is selected by the user from among the character input functions, the controller 180 can perform the function selected by the user using the information generated in operation S306 (S308). For example, the controller 180 can generate and transmit an SMS message or post an SNS post using the information input in operation S306. Alternatively, the controller 180 can perform a web search using the information input in operation S306.

It has been described that the virtual keyboard 450 is output when the plurality of taps 400 and 402 are applied. However, the controller 180 can output the virtual keyboard 450 to the display unit 151 based on positions to which the plurality of taps 400 and 402 are applied. For example, only when the plurality of taps 400 and 402 are sensed on a predetermined region, for example, a lower portion of the display unit 151, the controller 180 can display the virtual keyboard 450 on the display unit 151. In addition, only when the plurality of taps 400 and 402 sensed on the predetermined region are input with at least two fingers, that is, the user applies the plurality of taps 400 and 402 on the predetermined region with both hands, the controller 180 can display the virtual keyboard 450 on the display unit 151.

Accordingly, in the mobile terminal according to an embodiment of the present invention, even when the display unit 151 is deactivated, can display the virtual keyboard screen on the display unit 151 using a simple tap applied by the user to the display unit 151. Thus, in the mobile terminal according an embodiment of the present invention, any one of the character input-related functions can be performed using the information generated through the virtual keyboard, and the user may directly perform the user's desire function without menus having several steps for performing the character input-related function even when the display unit 151 is deactivated.

Hereinafter, one function selected by the user using the information generated in operation S306 being performed will be described in detail with reference to drawings. As described above, the mobile terminal 100 according to an embodiment of the present invention can process the information input by the user through the virtual keyboard 450 in association with any one function selected by a user from among the character input-related functions the selection of the user. Here, when the plurality of taps applied by the user are sensed, the controller 180 can receive a specific character input-related function selected by the user before the virtual keyboard 450 is output to the display unit 151.

Figure 5:
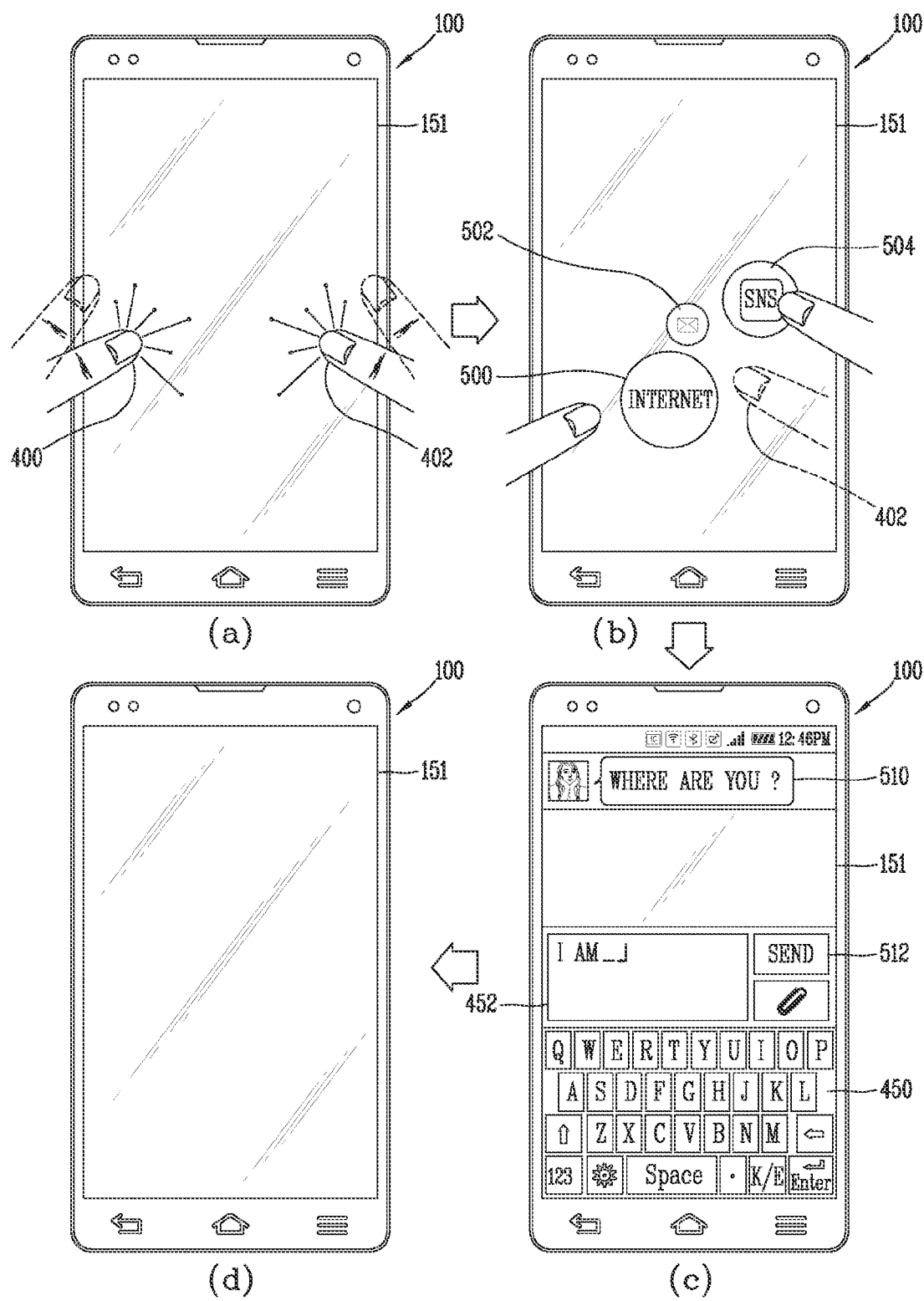
FIG. 5 is a conceptual view showing an example in which an associated function is performed through a virtual keyboard output based on a user's tap input in a mobile terminal according to an embodiment of the present invention.

Next, FIG. 5 is a view showing an example in which an associated function is performed through a virtual keyboard that is output based on the user's tap input in a mobile terminal according to an embodiment of the present invention. As shown in (a) of FIG. 5, when a first tap 400 and a second tap 402 are applied on the display unit 151, the controller 180 can sense the first tap 400 and the second tap 402 applied to the display unit 151 using at least one of a touch sensor and an acceleration sensor of the tap sensing unit 141.

Herein, the first tap 400 and the second tap 402 may be sensed at the same time. The controller 180 can also determine whether the first tap 400 and the second tap 420 are effective. When the first tap 400 and the second tap 402 are effective, the controller 180 can select at least one of character input-related functions executable by the mobile terminal 100.

Further, the controller 180 can display at least one graphic object corresponding to each of the character input-related functions executable by the mobile terminal 100 on at least a portion of the display unit 151. For example, the character input-related functions may include SMS message transmission or SNS posting, or Internet search. When the character input-related functions includes SMS message transmission or SNS posting, or Internet search, as shown in (b) of FIG. 5, a graphic object 500 corresponding to the Internet search, a graphic object 502 corresponding to the SMS message transmission, and a graphic object 504 corresponding to the SNS posting may be displayed on the display unit 151.

Such graphic objects 500, 502, and 504 may be displayed around a position in which any one of the plurality of taps 400 and 402 is sensed on the display unit 151. For example, as shown in (b) of FIG. 5, the graphic objects 500, 502, and 504 may be displayed around a position in which the second tap 402 is sensed. In addition, the graphic objects 500, 502, and 504 may be output only while any one of the plurality of taps 400 and 402 is sensed.

Here, when each of the plurality of taps 400 and 402 includes a plurality of touches, the graphic objects 500, 502, and 504 may be output only while any one of the plurality of touches included in the taps is continuously maintained. In this instance, the controller 180 can display the graphic objects 500, 502, and 504 on or around at least one tap or touch that is continuously sensed among the plurality of taps 400 and 402 or the plurality of touches.

As such, when the graphic objects 500, 502, and 504 are displayed on the display unit 151, the controller 180 can receive one that is selected by the user from among the graphic objects 500, 502, and 504. For example, when a user's touch is sensed in any one of regions in which the graphic objects 500, 502, and 504 are displayed, the controller 180 can recognize that the one graphic object corresponding to the user's touch input is selected by the user. In addition, the controller 180 can output a screen related to a character input-related function corresponding to the selected graphic object to the display unit 151.

When a drag input that originates from a position in which the last tap 402 among the plurality of taps 400 and 402 is sensed, the controller 180 can select any one from among the graphic objects 500, 502, and 504 based on the sensed drag input. For example, when a drag input that is directed toward any one of the graphic objects 500, 502, and 504 is sensed, the controller 180 can determine that any one graphic object corresponding to the drag input has been selected by the user. Accordingly, the controller 180 allows the user to select and execute any one function by one touch, that is, without detaching the finger.

In (a) of FIG. 5, it is assumed that there are three graphic objects 500, 502, and 504 corresponding to the SMS message transmission, SNS posting, and Internet search. However, there may be four or more graphic objects. In this instance, the graphic objects related to the functions may be displayed around the position in which the last tap 402 is sensed. In addition, when the number of functions is greater than a predetermined number, the controller 180 can display in a dispersive way the graphic objects corresponding to the functions on positions where that plurality of taps 400 and 402 are sensed.

As shown in (b) of FIG. 5, when the graphic object 504 corresponding to the SNS posting is selected, the controller 180 can output a screen related to the SNS posting function to at least a partial region of the display unit 151 as shown in (c) of FIG. 5. For example, as shown in (b) of FIG. 5, when the graphic object 504 is selected by the user, the controller 180 can output the SNS screen 510 related to the graphic object 504 to at least a partial region of the display unit 151. The term "SNS screen" used herein means a screen for displaying information that is posted in a specific SNS bulletin board through a predetermined SNS-related application corresponding to the graphic object 504.

When the SNS screen 510 is output to at least a partial region of the display unit 151, the controller 180 can output the virtual keyboard 450 and the screen 452 for displaying the result input through the virtual keyboard 450 to at least a portion of the display unit 151.

When there is a user's touch input to the virtual keyboard 450, the controller 180 generates information to be processed in association with the character input-related function that is currently selected in response to this. For example, as shown in the result display input window 452 in (c) of FIG. 5, the information generated through the virtual keyboard 450 may include characters generated by the user's touch input.

In addition, the controller 180 can further display the graphic object 512 for processing the generated characters based on the character input-related function selected by the user on the display unit 151. For example, the graphic object 512 can convert information input by the user through the virtual keyboard 450 based on the character input-related function selected by the user.

Furthermore, the controller 180 senses whether there is the user's touch input on a region where the graphic object 512 is displayed. When the user's touch input is sensed in the region where the graphic object 512 is displayed, the controller 180 processes the information input through the virtual keyboard by that time according to the selected character input-related function. For example, in (c) of FIG. 5, when the selected character input-related function is the SNS posting, the controller 180 converts characters input through the virtual keyboard 450 until the user's touch input is sensed in the region where the graphic object 512 is displayed to a form for the SNS post and then transmits the converted characters. Thus the characters that have been input by the user through the virtual keyboard 450 can be posted on an SNS bulletin board.

When the characters input by the user through the virtual key board 450 are posted on the SNS bulletin board through the graphic object 512, the controller 180 can determine that the character input-related function selected by the user has ended. In this instance, as shown in (d) of FIG. 5, the controller 180 can enter back into an operation mode state (for example, a doze mode state) in which the display unit 151 is deactivated. As shown in (a) of FIG. 5, the controller 180 can maintain the state until a user applies a plurality of taps or there is the user's input in order to switch the display unit 151 to an activated state.

Accordingly, the mobile terminal according to an embodiment of the present invention allows the user to directly perform the user's desired character input-related function while the display unit 151 is deactivated, even without a process of activating the mobile terminal that is in a sleep mode state, entering into a specific menu screen, and selecting the user's desired character input-related function in order to perform the character input-related function.

As shown in FIG. 5, the controller 180 can perform the character input-related function based on an unchecked event that has occurred in the mobile terminal 100 as well as allows the user to select the user's desired character input-related function when the plurality of taps are sensed.

Figure 6A:
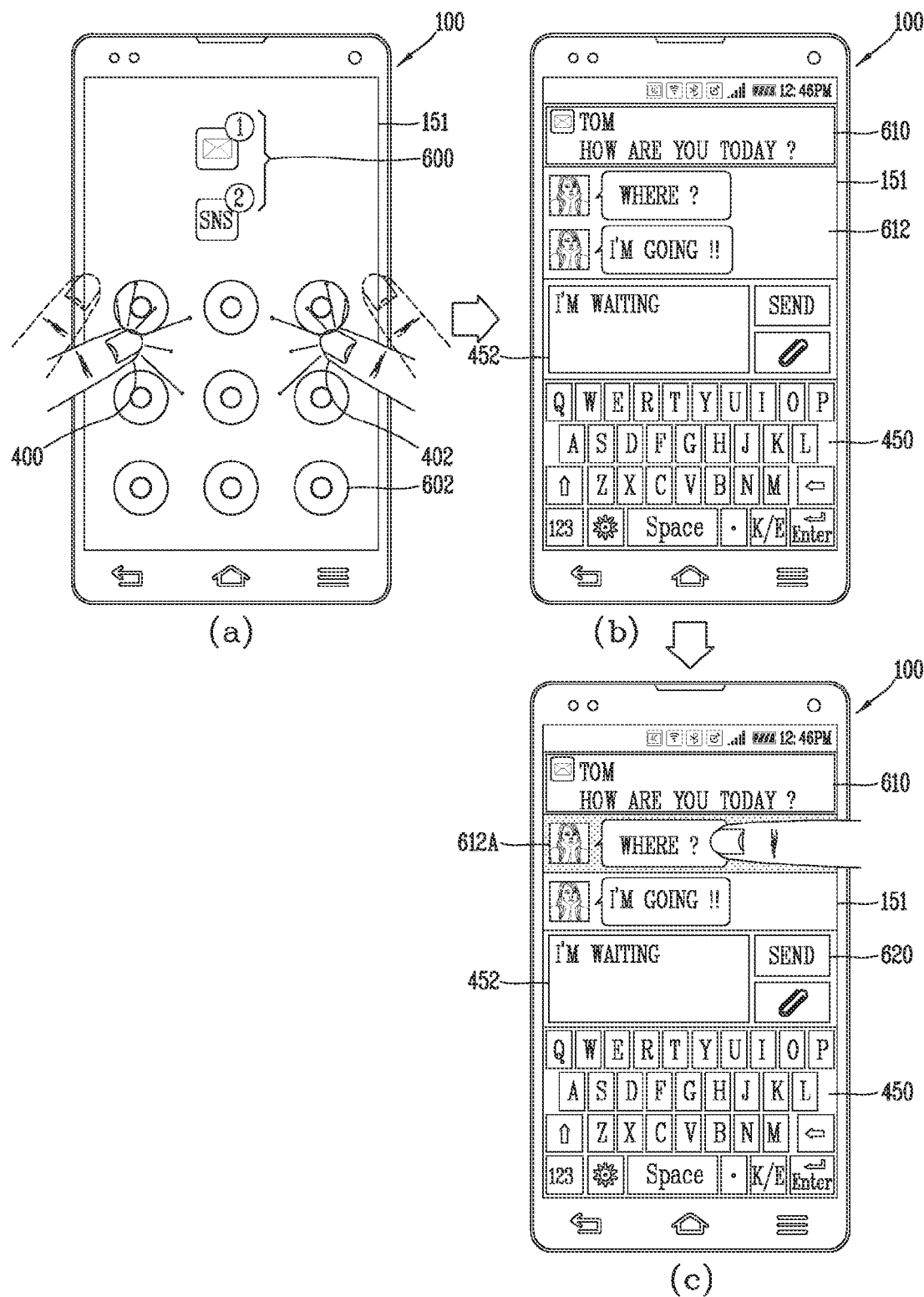
FIGS. 6A and 6B are conceptual views showing an example in which a character input function is performed based on an unchecked event, in a mobile terminal according to an embodiment of the present invention.
Figure 6B:
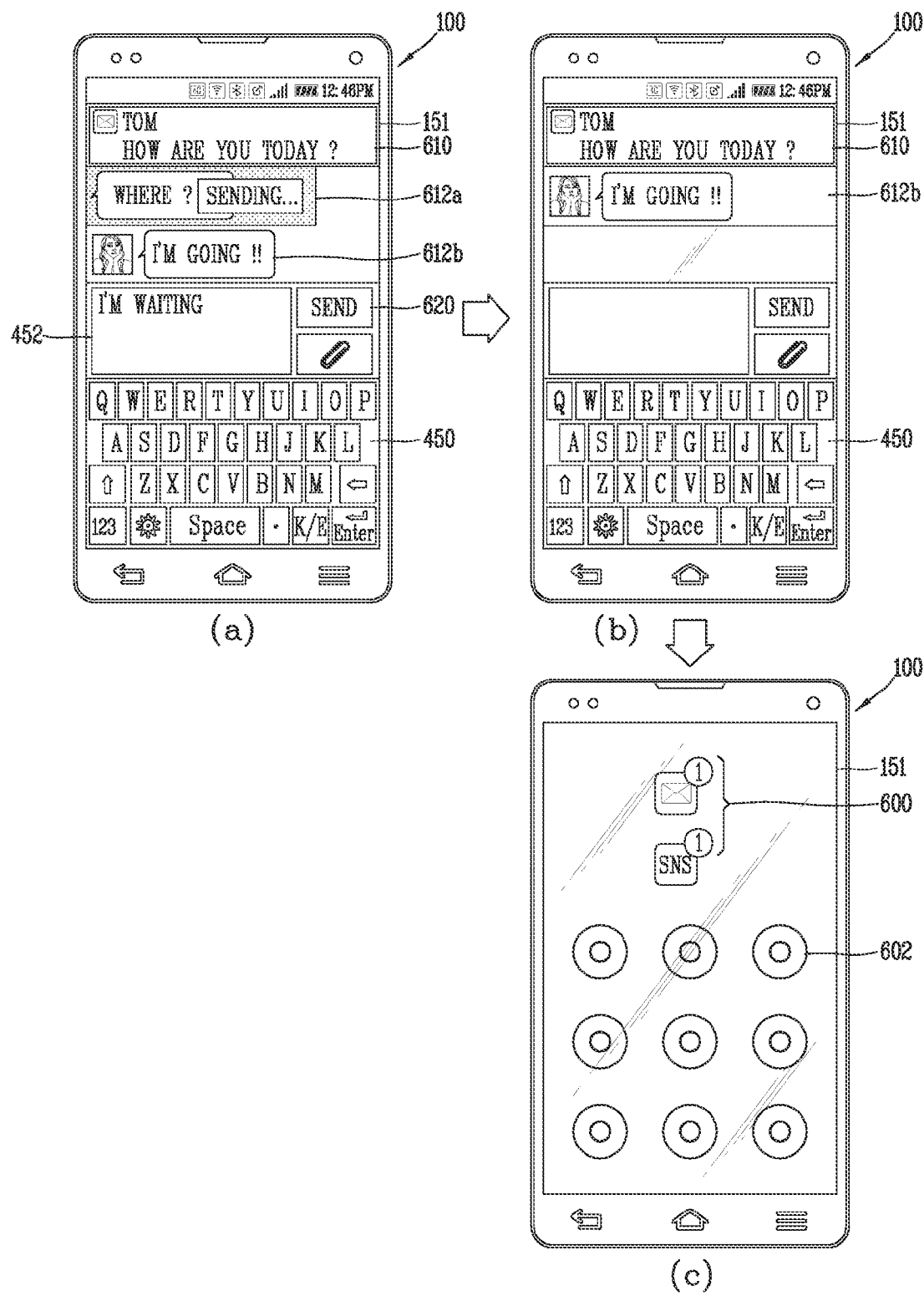

Next, FIGS. 6A and 6B are views showing an example in which a character input-related function is performed based on an unchecked event, in a mobile terminal according to an embodiment of the present invention. First, referring to (a)

of FIG. 6A, the mobile terminal 100 according to an embodiment of the present invention can be switched to a wake-up state (when the display unit 151 is activated) according to the selection of the user when the display unit 151 is deactivated (for example, in a doze mode state). For example, the user can switch the mobile terminal 100 to the wake-up mode by inputting a specific key (for example, a power key). Alternatively, the controller 180 can switch the mobile terminal 100 to the wake-up state when the user applies a plurality of taps during the doze mode state.

When the mobile terminal 100 is switched to the wake-up state, the controller 180 can display a graphic object 600 for displaying one or more unchecked events that have occurred in the mobile terminal 100 in addition to a graphic object 602 for displaying an unlock screen on at least a partial region of the display unit 151, as shown in (a) of FIG. 6A.

Here, the controller 180 can display the number of unchecked events in the vicinity of graphic objects for displaying the unchecked events. For example, if the unchecked events include one unchecked SMS message and two unchecked SNS posting, as shown in (a) of FIG. 6A, the controller 180 can display the number of the unchecked events in the vicinity of the graphic objects corresponding to the unchecked events.

In this instance, the controller 180 can sense whether the plurality of taps 400 and 402 have been applied by the user to the display unit 151 using at least one of a touch sensor and an acceleration sensor of the tap sensing unit 141 as shown in (a) of FIG. 6A. Herein, the first tap 400 and the second tap 402 may be sensed at the same time. Here, the controller 180 can output more detailed information on the one or more unchecked events to the display unit 151.

In (b) of FIG. 6A, such an example is shown. Referring to (b) of FIG. 6A, when the plurality of taps 400 and 402 are sensed, the mobile terminal 100 according to an embodiment of the present invention divides the display unit 151 into a plurality of regions and outputs information related to the one or more unchecked events to the regions of the display unit 151.

For example, as shown in (a) of FIG. 6A, if the unchecked events include one unchecked SMS message and two unchecked SNS posting messages, the controller 180 can output a screen 610 including information on the one or more unchecked SMS messages to any one of the divided plurality of display regions. Furthermore, the controller 180 can output a screen 612 including information on the one or more unchecked SNS posting messages to another one of the plurality of display regions.

In addition, as shown in (b) of FIG. 6A, the controller 180 can output the virtual keyboard 450 and the screen 452 for displaying a user's input result input through the virtual keyboard 450 to still another one of the plurality of display regions. In this instance, the controller 180 can sense a user's input to the display region where the virtual keyboard 450 is displayed.

Furthermore, the sensed user's input may be displayed through the input result screen 452. As shown in (c) of FIG. 6A, when one or more characters are input by the user, the controller 180 can receive any one character input-related function selected by the user and used for the input characters. For example, the controller 180 can sense whether any one unchecked event has been selected by the user from the screens 610 and 612 in which information about the one or more unchecked events is displayed.

Then, when information about any one unchecked event is selected by the user, the controller 180 can determine that a character input-related function corresponding to the selected unchecked event has been selected by the user. For example, as shown in (c) of FIG. 6A, when the user selects any one unchecked SNS posting message 612A from the screen on which information on the unchecked SNS posting messages is displayed, the controller 180 can determine that the character input-related function selected by the user is associated with the SNS posting message.

In addition, as shown in (c) of FIG. 6A, when the user selects any one SNS posting message, the controller 180 can determine that the user has selected a function related to the selected SNS posting message 612A. That is, controller 180 can determine that the user has selected a function of transmitting a response message to a third party who has posted the selected SNS posting message 612A, using the virtual keyboard 450.

In this instance, the controller 180 can sense whether there is the user's input to the graphic object 620. Here, the graphic object 620 processes characters input by the user through the virtual keyboard 450 based on the character input-related function selected by the user.

When the user's input is sensed in the region in which the graphic object 620 is displayed, the controller 180 processes the characters that are input through the virtual keyboard 450 based on the character input-related function selected by the user, corresponding to the selection of the user. That is, the controller 180 can process characters displayed on the input result display screen 452 into a response message form and transmit the processed characters.

In FIG. 6B, such an example is shown. As shown in (a) of FIG. 6D, when there is a user's input to the graphic object 620, the controller 180 of the mobile terminal 100 transmits the message. As such, when any one unchecked SNS posting message 620A is checked, the controller 180 can determine that the check of the SNS posting message by the user has been completed. Accordingly, the controller 180 can not output information on the checked SNS posting message to a screen 620 for checking unchecked SNS messages. In (b) of FIG. 6B, such an example is shown.

In addition, when it is determined that the check of the SNS posting message by the user has been completed, the controller 180 can reflect the determination to modify the graphic object 600 for displaying unchecked events. For example, the controller 180 can reduce the number of unchecked events that has been displayed around the graphic objects 600 for displaying the unchecked events by subtracting the number of events that are checked by the user. Moreover, when there are no unchecked events, the control unit may not display the graphic object for displaying the unchecked event on the display unit 151 any more.

In (b) of FIG. 6B, such an example is shown. For example, if it is determined that any one unchecked message has been checked by the user through processes that are described above with reference to (a) to (c) of the FIG. 6A and (a) and (b) of FIG. 6B, the controller 180 can enter back into a state when the lock screen is output. In this instance, the controller 180 can display graphic objects 600 for displaying the unchecked events on the lock screen. For example, the controller 180 can enter back into the lock screen even when the character input-related function selected by the user is ended.

As shown in (c) of FIG. 6B, the graphic objects 600 that are displayed on the lock screen may reflect the number of events that are checked through the above-described process, that is, the process in which the screen for displaying information on at least one unchecked event is output through the plurality of taps 400 and 402 and any one is selected by the user from the displayed information.

It has been described that the graphic objects 600 for displaying the unchecked events are displayed only on the lock screen. However, the graphic objects 600 for displaying the unchecked events may be displayed on a screen other than the lock screen. For example, in (c) of FIG. 6B, the controller 180 can further display the graphic objects 600 for displaying the unchecked events on a region other than the regions 610 and 612 for displaying information on the unchecked events, the virtual keyboard 450, and the display region 452 for displaying the result input through the virtual keyboard 450. Furthermore, the graphic objects 600 may reflect the number of events that are determined by the user to be checked.

It has been described that when the user selects any one unchecked SNS posting message, the user accordingly transmits the characters that are input through the virtual keyboard 450 as a response message. However, a process of further displaying detailed information on the selected SNS posting message may be added.

For example, as shown in (b) of FIG. 6A, when the information on the at least one unchecked event is displayed on the display unit 151 corresponding to the sensed plurality of taps 400 and 402, the controller 180 can receive the selection of any one from among the unchecked events from the user before receiving the user's input through the virtual keyboard 450.

In this instance, the controller 180 can output a screen for displaying detailed information on the selected unchecked event to the display unit 151. Here, for example, when the selected unchecked event is an SNS posting message, the detailed information on the selected unchecked event may include information (for example, a name, an ID, and a contact) on a person who has posted the SNS posting message and information on an entire contents of the SNS posting message and a time when the SNS posting message was posted.

The virtual keyboard 450 may be output to the display unit 151, corresponding to the selection of the user from the screen on which the detailed information are displayed. In this instance, the controller 180 can divide the display unit 151 into a plurality of regions. Then, the controller 180 can output a screen on which the detailed information is displayed to one of the plurality of regions and output the virtual keyboard 450 to another region.

In addition, similarly to as described in (c) of FIG. 6A, the controller 180 can transmit the user's input that is accepted from the virtual keyboard 450, to any third party through a graphic object 620 in the form of a response message to the selected uncheck SNS posting message. In this instance, as shown in (a), (b), and (c) of FIG. 6B, the number of events that are checked by the user may be reflected to the display of the number of unchecked events.

As described above, when the information on the at least one unchecked event message is displayed on the lock screen, the user may apply a plurality of taps to a region where specific information is displayed. In this instance, the controller 180 can determine that the unchecked event corresponding to the display region where the plurality of taps are sensed has been selected by the user. Also, the controller 180 can perform the information input through the virtual keyboard 450 in association with the unchecked event that is selected by the user.

Accordingly, in the mobile terminal according to an embodiment of the present invention, the user may select a specific unchecked event using the plurality of taps and directly perform its associated function. In this instance, the controller 180 can display the remaining unchecked events on a region of the display unit 151 other than the region in which the information on the unchecked event is displayed and the region the virtual keyboard is output. When any one is selected by the user from among the remaining events, the controller 180 can display the detailed information on the selected unchecked event on the display unit 151 and perform its associated function.

The SMS message or SNS posting message has been described as an example of the unchecked event. However, the unchecked event to which the present invention can be applied is not limited thereto. For example, the present invention may be applied to a case in which the unchecked event includes a missed call.

For example, when there is a missed call, the controller 180 can display graphic objects for displaying the missed call on the display unit 151. When a graphic object corresponding to the missed call or detailed information corresponding to the missed call is selected by the user, the controller 180 can perform control such that a function of transmitting a response message to a partner of the missed call using the virtual keyboard 450 is performed in response to the selection of the user. Here, the detailed information corresponding to the missed call may include information on the party of the missed call, such as the party's name or phone number.

Accordingly, as shown in FIGS. 6A and 6B, in the mobile terminal according to an embodiment of the present invention, a specific character input-related function may be selected in relation to the unchecked event that currently occurs in the mobile terminal. In addition, the mobile terminal according to an embodiment of the present invention can process the user's input accepted from the virtual keyboard 450 in association with the selected character input-related function, using the virtual keyboard 450 output directly from the lock screen. Accordingly, the mobile terminal according to an embodiment of the present invention allows the user to directly perform a function related to the specific unchecked event in the lock screen state, without unlocking the lock screen and experiencing multiple menu screens in order to perform the function related to the specific unchecked event.

It has been described by way of example that the character input-related function such as the SNS posting or SMS message transmission is performed using the virtual keyboard that is output based on the plurality of taps. However, the virtual keyboard that is output based on the plurality of taps may be used for various functions in addition to the above described functions. For example, an input of characters through the virtual keyboard may be used for memo input, schedule management, or Internet search.

Figure 7:
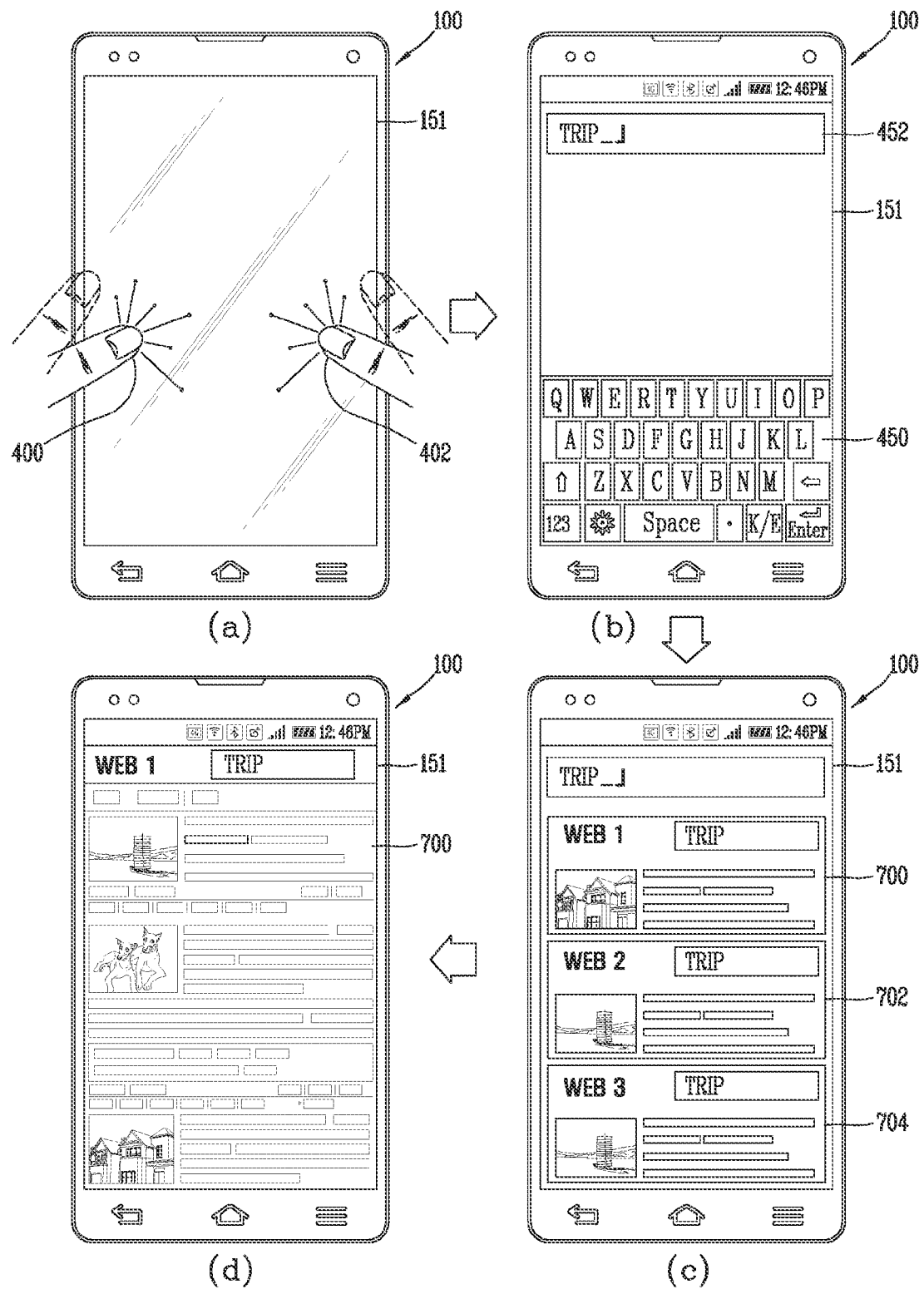
FIG. 7 is a conceptual view showing an example in which a web search is performed through a virtual keyboard that is output based on a user's tap input in a mobile terminal according to an embodiment of the present invention.

Next, FIG. 7 is a view showing an example in which a web search is performed through a virtual keyboard that is output based on the user's tap input in a mobile terminal according to an embodiment of the present invention. As shown in (a) of FIG. 7, even when the display unit 151 is deactivated, that is, for example, the display unit 151 is in a doze mode state, the controller 180 according to an embodiment of the present invention can sense the first tap 400 and the second 402 applied to the display unit 151 using at least one of the touch sensor and the acceleration sensor of the tap sensing unit 141.

Herein, the first tap 400 and the second tap 402 may be sensed at the same time. As shown in (b) of FIG. 7, the controller 180 can output the virtual keyboard 450 and the input result display screen 452 on which the result input through the virtual keyboard 450 is displayed, to at least a partial region of the display unit 151.

In this instance, the controller 180 can perform search based on the user's input to the region of the display unit 151 on which the virtual keyboard 450 is displayed. In addition, the controller 180 can output the search results to the display unit 151. Here, the controller 180 can perform the search using at least one search engine. When a plurality of search engines are provided, the controller 180 can display search results for each of the plurality of search engines on the display unit 151.

In (c) of FIG. 7, such an example is shown. Referring to (c) of FIG. 7, when the search is performed using the plurality of search engines, the controller 180 can divide the display unit 151 into a plurality of regions, and output respective search results for the plurality of engines Web1, Web2, and Web3 to different regions. In this instance, the controller 180 can output only the result searched by any one search engine (for example, Web1) to the display unit 151 based on the selection of the user.

For example, as shown in (c) of FIG. 7, the controller 180 can sense the user's input to any one of the plurality of regions 700, 702, and 704. When the user's input is sensed in any one of the plurality of regions 700, 702, and 704, the controller 180 can determine that the search engine for outputting a search result to a corresponding region has been selected by the user.

In this instance, the controller 180 can output only the result searched by the currently selected search engine to the display unit 151. In (d) of FIG. 7, such an example is shown. For example, the controller 180 can determine that the search engine Web1 is selected by the user when the user's input is sensed in the region 700 in which the result searched by the search engine Web1 is displayed among the plurality of regions 700, 702, and 704. As shown in (d) of FIG. 7, the controller 180 can output only the result searched by the search engine Web1 to the display unit 151.

Accordingly, the mobile terminal according to an embodiment of the present invention allows the web search to be directly executed even when the display unit 151 is deactivated by outputting the virtual keyboard based on the plurality of taps and processing information input through the virtual keyboard in association with the web search function.

It has been described as an example that when the plurality of taps are sensed, the virtual keyboard for inputting characters is output to the display unit 151 corresponding thereto. It also has been described that the character input-related function among functions executable by the mobile terminal using the virtual keyboard is executed in association with the information input through the virtual keyboard.

However, the present invention is not limited thereto. For example, the user may select a function that may be executed based on the plurality of taps and different from the character input function from among functions executable by the mobile terminal. That is, the user may set the mobile terminal such that a game application is executed when the plurality of taps are sensed. In this instance, when the plurality of taps are sensed, the controller 180 can output a virtual keypad that may be commonly used for a plurality of game applications to the display unit 151, instead of the virtual keyboard for inputting characters.

In this instance, when the plurality of taps are sensed, the controller 180 can display respective graphic objects corresponding to the plurality of game applications on the display unit 151. The controller 180 can execute any one game application selected by the user and drive the game application based on the user's input that is accepted from the virtual keypad.

In addition, it has been described as an example that only one virtual keyboard is output. However, either different virtual keyboards or a virtual keyboard and a virtual keypad may be displayed based on the sensed plurality of taps. For example, as described above, the controller 180 of the mobile terminal 100 according to an embodiment of the present invention may determine whether the sensed plurality of taps have been applied with one hand or finger or with both hands or at least two fingers. With this, the controller 180 can output a specific virtual keyboard or any one of the virtual keyboard and the virtual keypad based on the determination result.

Alternatively, the controller 180 can determine whether the specific virtual keyboard or the any one of the virtual keyboard and the virtual keypad is output based on the first reference number for sensing the first tap or the second reference number for sensing the second tap.

It has been described that the mobile terminal 100 according to an embodiment of the present invention operates only while the display unit 151 of the mobile terminal 100 is deactivated. However, the mobile terminal 100 according to an embodiment of the present invention allows any one of functions executable by the mobile terminal to be performed based on the plurality of taps.

Figure 8:
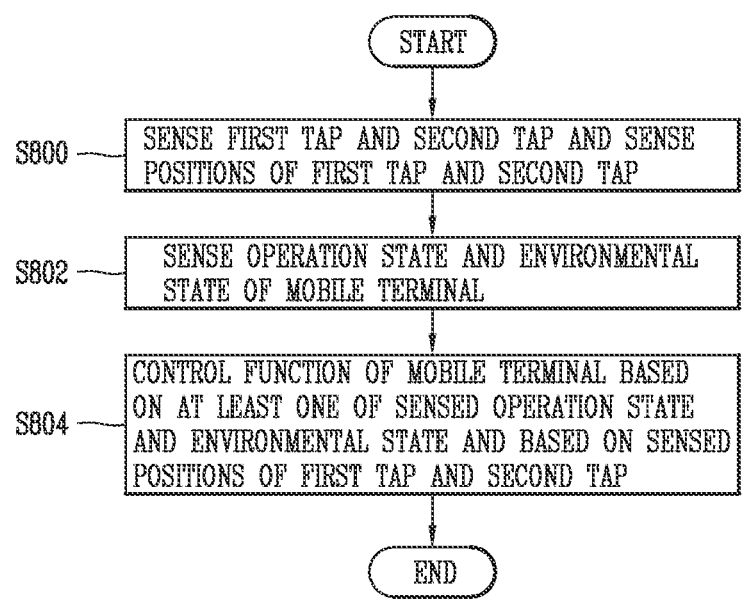
FIG. 8 is a flowchart illustrating a control method of a mobile terminal according to another embodiment of the present invention.

FIG. 8 is a flowchart illustrating a control method of a mobile terminal according to an embodiment of the present invention. When a plurality of taps indicating the main body or display unit 151 of the mobile terminal 100 is hit a plurality of times, the controller 180 of the mobile terminal 100 according to an embodiment of the present invention senses the plurality of taps (S800). In operation S800, the controller 180 can determine whether the first tap and the second tap that form the plurality of taps are effective.

For example, when an initial tap is applied, the controller 180 can determine whether the first tap is applied by determining whether the initial tap has been applied a first reference number or more of times. When the applied first tap is effective, the controller 180 can determine whether the second tap is applied in a predetermined time after the first tap is applied. Here, the controller 180 can determine whether the second tap is effective based on whether a tap that is applied in a predetermine time after the first tap is applied has been applied a second reference number or more of times.

In addition, in operation S800, when it is determined that the first tap and the second tap are effective, the controller 180 can recognize positions in which the first tap and the second tap are sensed. For example, the controller 180 can recognize the positions in which the first tap and the second tap are sensed using a touch sensor included in the rear case 202 or front case 201. For example, the controller 180 can recognize the positions in which the first tap and the second tap are sensed using a touch sensor included in the rear case 141 or front case 201.

In operation S800, when the effective plurality of taps, that is, the first tap and the second tap are sensed, and the positions in which the first tap and the second tap are applied, the controller 180 senses at least one of a current operation state and a current environmental state of mobile terminal 100 (S802).

In operation S802, the controller 180 can sense whether the mobile terminal 100 is currently in a call operation state or in a camera capturing operation. Furthermore, the controller 180 can sense the current environmental state of the mobile terminal 100 in operation S802. The term "environmental state" used herein may include a direction in which the mobile terminal 100 is positioned, that is, when the mobile terminal 100 faces upward or downward or when the mobile terminal 100 lies horizontally or stands vertically upright. In operation S802, the controller 180 can further sense surrounding environment of the mobile terminal 100, such as ambient brightness of the mobile terminal 100.

In operation S802, when at least one of the operation state and the environmental state of the mobile terminal 100 is sensed, the controller 180 can control a function of the mobile terminal 100 based on at least one of the sensed operation state and environmental state and at least one of whether the first tap and the second tap are sensed in operation S800 and where the first tap and the second tap are positioned (S804).

In operation S804, the controller 180 can control various functions of the mobile terminal 100. For example, when the mobile terminal 100 is in a call, the controller 180 can adjust a call volume or execute a call content recording function. In addition, the controller 180 can also perform control such that a screen for selecting any one from among functions that can be used in respective display modes is executed or any one function is directly executed, depending on whether the display state of the mobile terminal 100 is in a landscape display mode or a portrait display mode.

Hereinafter, an example in which the mobile terminal 100 executes a specific function or controls a function in execution will be described in detail with reference to accompanying drawings, based on the plurality of taps applied to the main body of the mobile terminal 100, the positions in which the plurality of taps are sensed, and the current operation state or environmental state of the mobile terminal 100.

For example, when the mobile terminal 100 is in a call, the controller 180 can perform control such that a call volume adjusting function or a call content recording function is selected and then executed based on the positions in which the first tap and the second tap are sensed in operation S800.

Figure 9A:
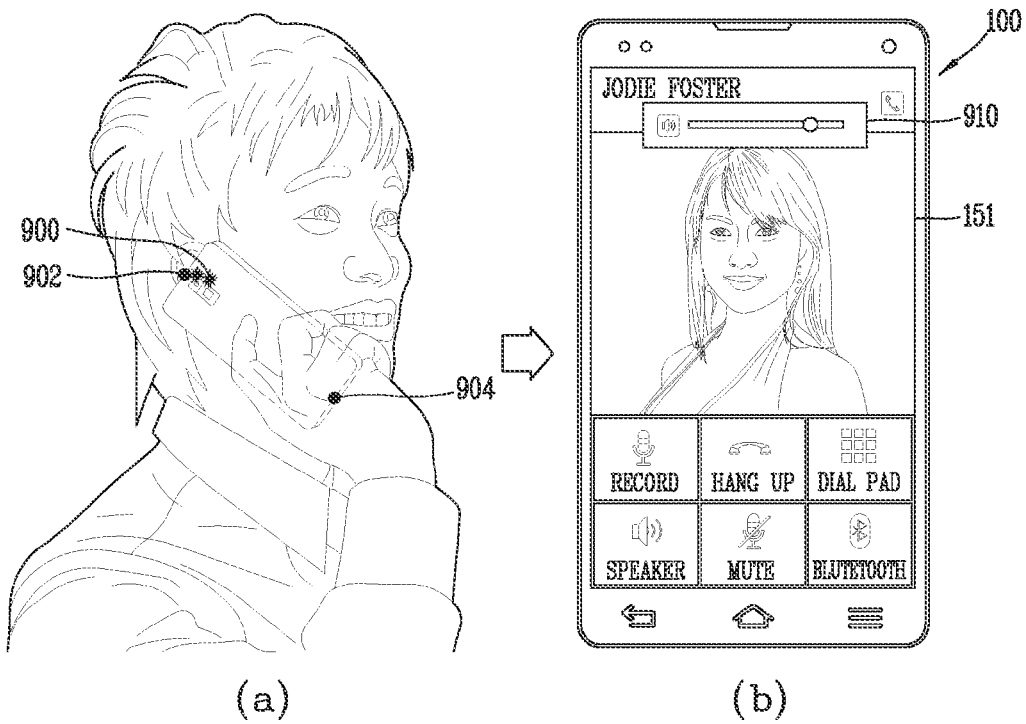
FIGS. 9A and 9B are conceptual views showing an example in which its associated function is performed based on a user's tap input during a call state in a mobile terminal according to an embodiment of the present invention.
Figure 9B:
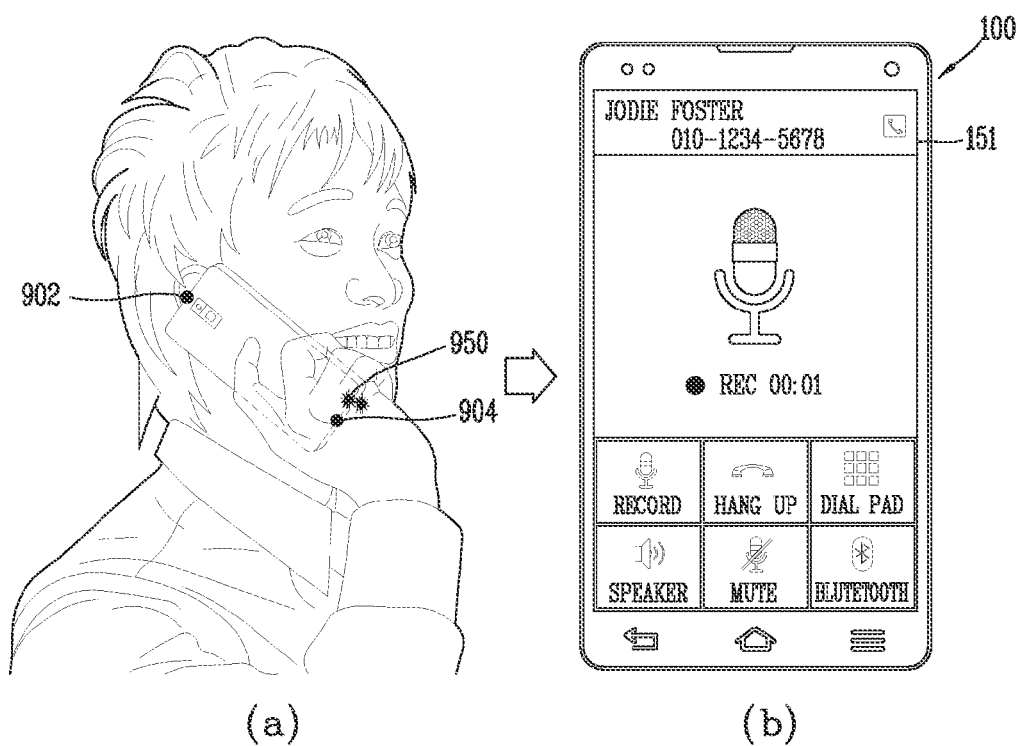

FIGS. 9A and 9B are views showing an example in which a mobile terminal performs its associated function based on a user's tap input in a call state according to an embodiment of the present invention.

For example, as shown in (a) and (b) of FIG. 9A, the user may apply a plurality of taps 900 or 950 to the main body of the mobile terminal 100 while the user is in a phone call using the mobile terminal 100. In this instance, the controller 180 can sense a position in which the plurality of taps 900 or 950 are applied to execute a function related to the phone call or control the function related to the phone call.

That is, as shown in (a) of FIG. 9A, when a position in which the plurality of taps 900 are applied is a position of the mobile terminal 100 in which a call speaker 902 is disposed or a part corresponding to a part to which the user's ear is closely attached, that is, for example, a portion of the rear case 102 of the mobile terminal 100 corresponding to the part to which the user's ear is closely attached, the controller 180 can determine that the plurality of taps 900 are applied to control a function related to the volume. Accordingly, as shown in (b) of FIG. 9A, the controller 180 can adjust the call volume based on the applied plurality of taps 900.

Here, the controller 180 can adjust the call volume based on the sensing states of the first tap and the second tap, which form the plurality of taps 900. For example, the controller 180 can increase the call volume when the position in which the second tap is sensed in the main body of the mobile terminal 100 is higher than the position in which the first tap is sensed, with respected to the position in which the first tap is sensed. On the contrary, if the position in which the second tap is sensed is lower than the position in which the first tap is sensed, the controller 180 can decrease the call volume.

Alternatively, the controller 180 can adjust the call volume based on the number of times the plurality of taps are sensed. For example, when the mobile terminal 100 is in a call and a tap for controlling a function related to the call volume is sensed, the controller 180 can adjust the volume based on a position in which an additional tap is sensed and the number of times additional taps are sensed.

That is, when two taps are additionally sensed at a position that is higher than the position at which the tap for controlling the call volume is sensed, the control unit may increase the call volume by two steps. On the contrary, when two taps are additionally sensed at a position that is lower than the position at which the tap for controlling the call volume is sensed, the controller 180 can increase the call volume by two steps.

Here, the terms "top direction" and "bottom direction" means that a direction in which the call speaker 902 of the mobile terminal 100 is disposed is the top direction and a direction in which the call microphone 904 of the mobile terminal 100 is disposed is the bottom direction, with reference to the position in which the tap is sensed.

Alternatively, the controller 180 can adjust the call volume according to and the input types of the first tap and the second tap in addition to the positions in which the first tap and the second tap are sensed. For example, when the first tap is sensed and then the second tap is sensed once in a predetermined time, the controller 180 can increase the call volume. When the first tap is sensed and then the second tap is sensed two or more times in a predetermined time, the controller 180 can decrease the call volume.

As shown in (a) of FIG. 9B, when a position to which the plurality of taps 950 are applied is a position of the mobile terminal 100 in which a call microphone 904 is disposed or a part corresponding to the user's mouse, that is, for example, a portion of the rear case 102 of the mobile terminal 100 corresponding to the part to which the user's mouse is closely attached, the controller 180 can determine that the plurality of taps 950 intend to perform a specific function related to the phone call.

For example, as shown in (b) of FIG. 9B, when the plurality of taps 950 are sensed, the controller 180 can execute a call content recording function. The controller 180 can have recorded the phone content until an end signal is sensed. Here, the end signal may be generated when the phone call is ended or by any input of the user. Here, the input of the user includes a case in which the user inputs the plurality of taps 950 again.

The controller 180 can output the virtual keyboard or execute different functions based on the first tap and the second tap that sensed in operation S800, depending on whether or not the display unit 151 is activated. Here, the different functions may be determined based on the positions of the first tap and the second tap.

For example, when the first tap and the second tap are sensed and the display unit 151 is deactivated, as shown in FIGS. 3, and 4 to 7, the controller 180 can execute a specific character input-related function using the virtual keyboard. However, when the first tap and the second tap are sensed and the display unit 151 is activated, the controller 180 can execute or control a specific function based on the positions in which the first tap and the second tap are sensed.

Figure 10A:
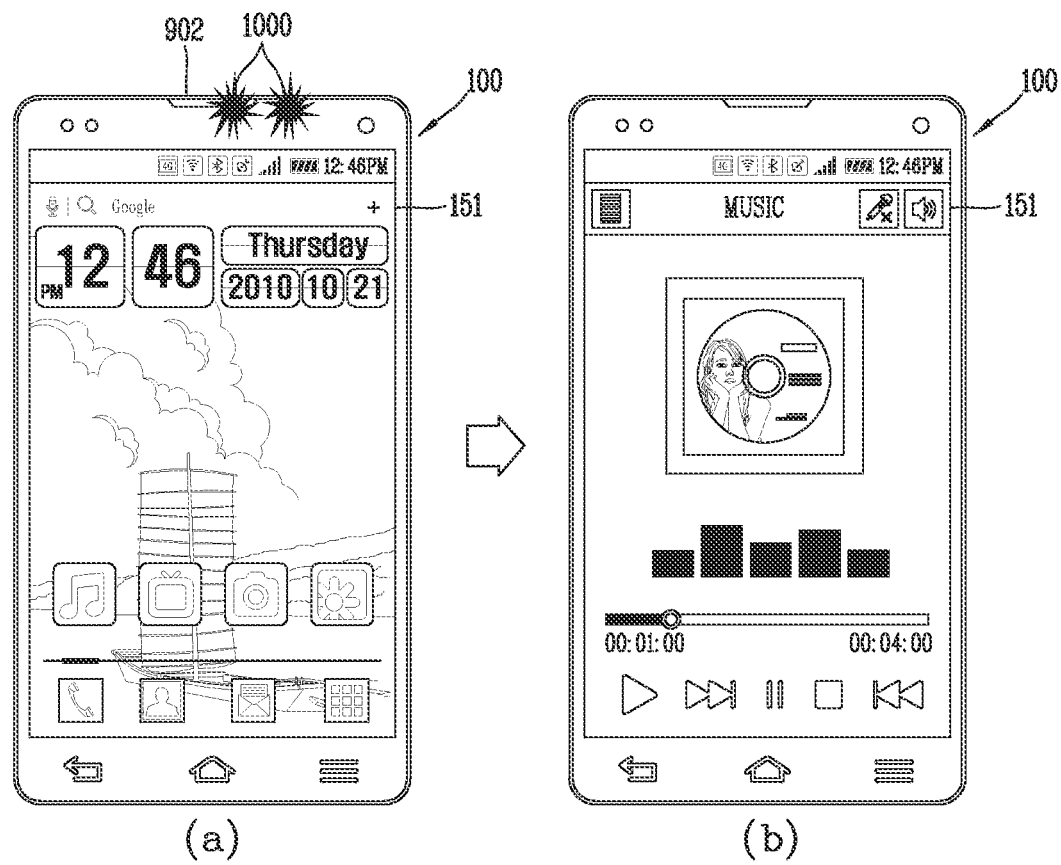
FIGS. 10A and 10B are conceptual views showing an example in which its associated function is performed based on a position in which a user's tap input is sensed in a mobile terminal performs according to an embodiment of the present invention.
Figure 10B:
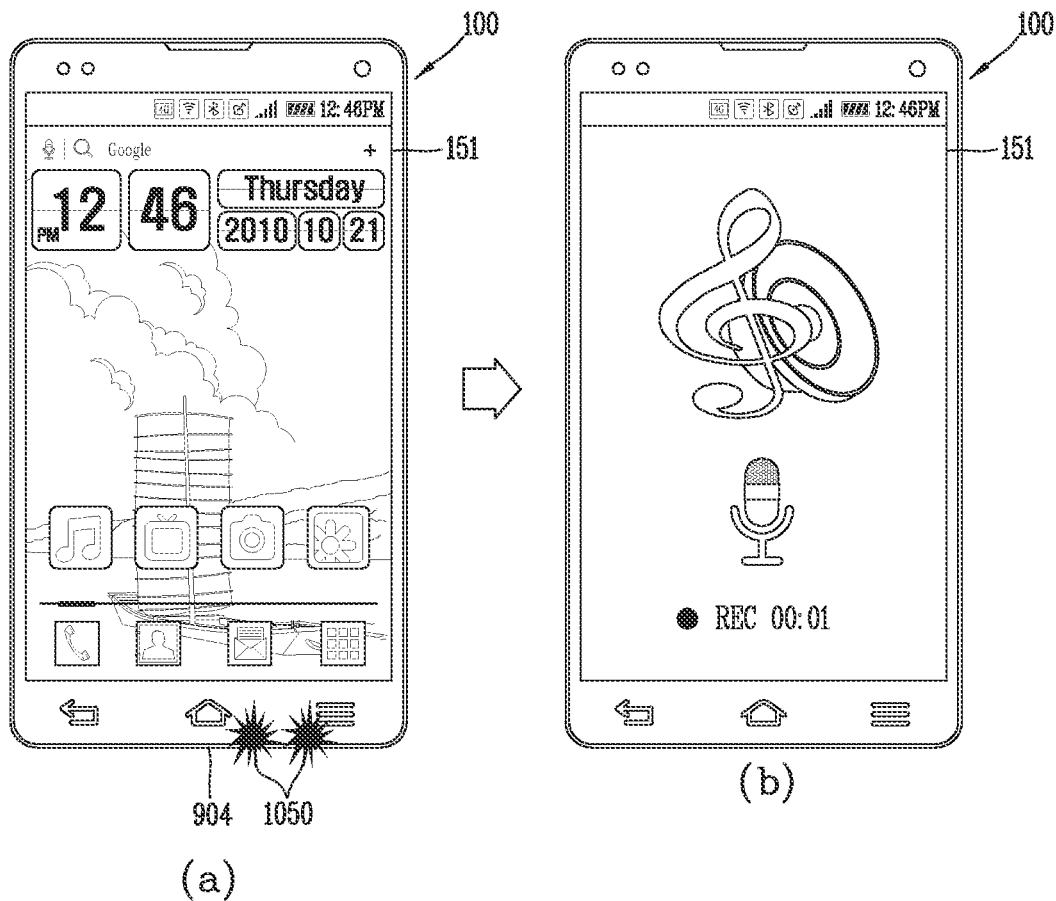

FIGS. 10A and 10B are views showing an example in which an associated function is performed by a mobile terminal based on a position in which a user's tap input is sensed while a display unit is activated according to an embodiment of the present invention. First, referring to FIGS. 10A and 10B, when a plurality of taps 1000 or 1050 are sensed and the display unit 151 is activated, the controller 180 can execute a specific function based on a position in which the plurality of taps 1000 or 1050 are sensed.

For example, as shown in (a) of FIG. 10A, when the plurality of taps 1000 are applied to a position of the call speaker 902 of the mobile terminal 100 or, if there is a separate speaker for outputting a sound signal, a position in which the separate speaker is disposed, the controller 180 can determine that execution of a music playback function is selected as shown in (b) of FIG. 10A. The controller 180 can execute a music playback function, as shown in (b) of FIG. 10A.

The controller 180 can control the music playback function corresponding to a tap applied to the display unit 151. For example, the controller 180 can adjust a volume of the played-back music or switch the played-back music to a different music corresponding to the tap applied to the main body of the mobile terminal 100. Furthermore, the controller 180 can control the music playback function variously depending on the position to which the tap is applied.

For example, when a tap is additionally sensed at a top end in any one region of the display unit 151, the controller 180 can increase a volume (or loudness). Furthermore, when a tap is additionally sensed at a bottom end in any one region of the display unit 151, the controller 180 can decrease the volume.

In addition, when a tap is additionally sensed at a right side end other than the top end or the bottom end of the display unit 151, the controller 180 can play back a next music that is to be play back after the current play-backed music. When a tap is additionally sensed at a left side end other than the top end or the bottom end of the display unit 151, the controller 180 can play back a previous music that has been played back before the current play-backed music.

As shown in (a) of FIG. 10B, when the plurality of taps 1050 are applied to a position of the call microphone 904 of the mobile terminal 100 or, if there is a separate microphone for inputting a sound signal, a position in which the separate microphone is disposed, the controller 180 can determine that execution of a function for recording the sound signal is selected as shown in (b) of FIG. 10B. The controller 180 can execute a recording function, as shown in (b) of FIG. 10B.

Here, the controller 180 can control the recoding function corresponding to a tap applied to the display unit 151, as shown in (b) of FIG. 10A. For example, the controller 180 can adjust a volume of the recorded sound signal corresponding to the tap applied to the main body of the mobile terminal 100. Furthermore, the controller 180 can previously set a time at which recording of the sound signal is ended depending on the position to which the tap is applied.

As such, the mobile terminal according to an embodiment of the present invention allows different controls to be achieved in the mobile terminal depending on taps applied to different positions. The different positions may be positions that may be commonly and conceptually known by the user. Thus, the controller 180 can provide a friendlier user experience (EX) to the user.

For example, when the position in which the tap is applied is a part in which the camera 121a or 121b is disposed, the controller 180 can control a function of driving the camera 121a or 121b. That is, when the position in which the user has applied a tap is located at or around the position in which the front camera 121a of the front case 101 is disposed, the controller 180 can drive the front camera 121a to output an image obtained by a self-capturing function, that is, an image received from the front camera 121a to the display unit 151. When the position in which the user has applied a tap is located at or around the position in which the rear camera 121b of the rear case 102 is disposed, the controller 180 can drive the rear camera 121b to output an image received from the rear camera 121b to the display unit 151. The controller 180 can store the image received from the front camera 121a or the rear camera 121b in the memory 160 in the form of a picture or video based on selection of the user.

The controller 180 of the mobile terminal 100 according to an embodiment of the present invention may sense whether the mobile terminal 100 lies horizontally when the plurality of taps are sensed and may perform any one function or output a screen for easily selecting any one function to the display unit 151 based on the sensing result.

Figure 11:
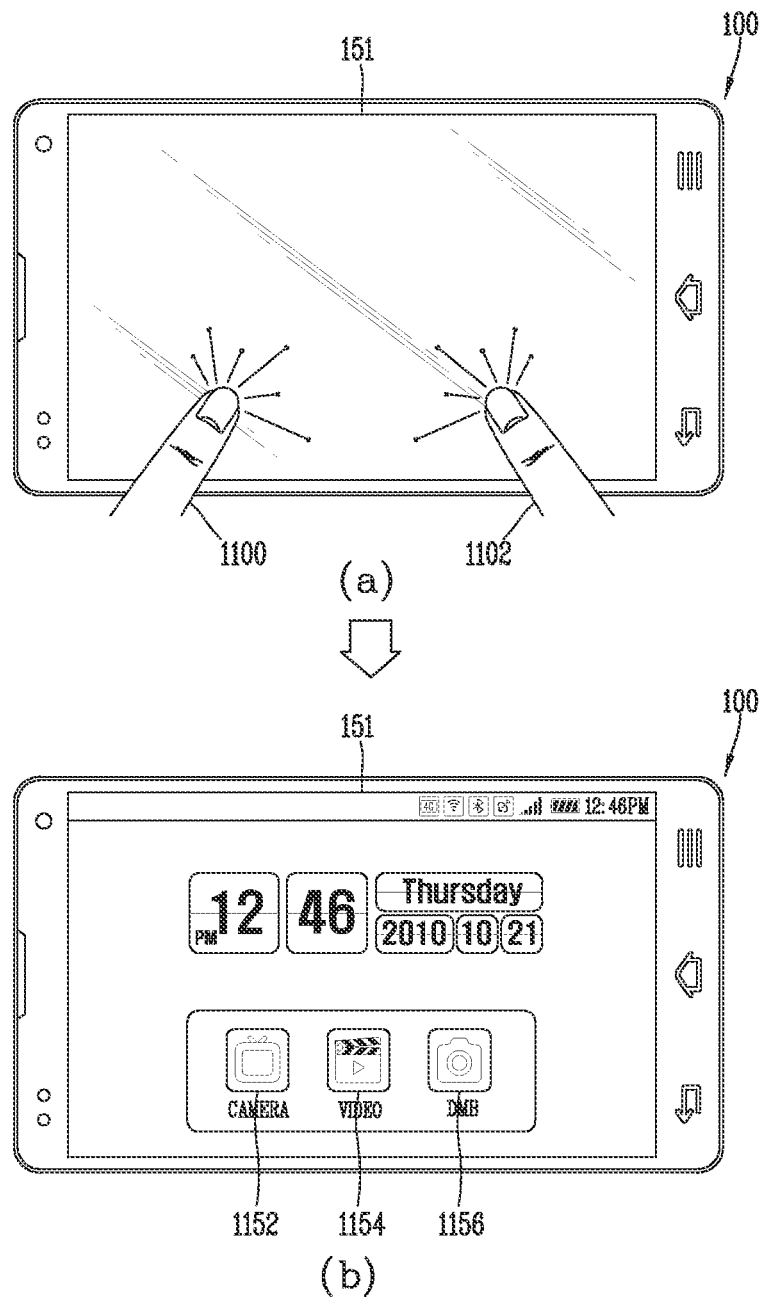
FIG. 11 is a conceptual view showing an example in which at least one executable function is displayed based on a display operation state in a mobile terminal according to an embodiment of the present invention.

FIG. 11 is a conceptual view showing an example in which a mobile terminal displays at least one executable function based on a display operation state according to an embodiment of the present invention. For example, as shown in (a) and (b) of FIG. 11, the controller 180 can sense the first tap 400 and the second tap 402 applied to the display unit 151 of the mobile terminal 100 that lies horizontally using at least one of a touch sensor and an acceleration sensor of the tap sensing unit 141. Herein, the first tap 1100 and the second tap 1102 may be sensed at the same time.

The controller 180 can output, to the display unit 151, a screen for executing any one of functions, such as video playback, camera capture, and digital multimedia broadcasting (DMB) watching, that are generally used in a landscape display mode, or for selecting any one from among the functions.

In (b) of FIG. 11, such an example is shown. Referring to (b) of FIG. 11, when the first tap 1100 and the second tap 1102 are applied while the mobile terminal 100 lies horizontally as shown in (a) of FIG. 11, the controller 180 can sense a current state of the mobile terminal 100 to determine that that mobile terminal is in the landscape display mode. When the first tap 1100 and the second tap 1102 are sensed, the controller 180 can display one or more graphic objects 1152, 1154, and 1156 on the display unit 151 in response to this.

Here, the graphic objects 1152, 1154, and 1156 may correspond to functions that may be used in the landscape display mode. That is, when the plurality of taps 1100 and 1102 are sensed, the controller 180 can sense the state of the mobile terminal 100, detect functions corresponding to the sensed state of the mobile terminal 100, that is, the landscape display mode, and display graphic objects corresponding to the detected functions on the display unit 151.

Accordingly, when the plurality of taps are applied, the mobile terminal according to an embodiment of the present invention allows the graphic objects corresponding to the usable functions to be directly displayed on the display unit 151 based on the sensed current state of the mobile terminal 100.

When any one is selected by the user from among the graphic objects 1152, 1154, and 1156, the controller 180 can execute a function corresponding to the selected graphic object. Here, the controller 180 can control the function in execution based on the plurality of taps applied to the main body or display unit 151 of the mobile terminal 100. For example, when the user has selected the graphic object 1152 related to a camera function from among the graphic objects 1152, 1154, and 1156 as shown in (b) of FIG. 11, the controller 180 can execute the camera function, such as photograph capture or video capture.

In this instance, when an additional tap is sensed on the main body or the display unit 151 of the mobile terminal 100, the controller 180 can control the camera function in execution based on the sensed tap. For example, when the plurality of taps that are additionally applied by the user are sensed at a position corresponding to a part in which a flash 223 of the mobile terminal 100 is disposed, the controller 180 can determine whether to turn on or off the flash 223 based on the plurality of taps that are additionally applied by the user.

If the user selects the graphic object 1154 related to video playback, the controller 180 can execute the video playback function in the mobile terminal 100. In this instance, when a plurality of taps that are additionally applied by the user are sensed, the controller 180 can adjust a video playback volume based on the position in which the plurality of taps are sensed.

In FIG. 11, it has been described as an example that the graphic objects corresponding to one or more functions that are determined based on the current state of the mobile terminal 100 are displayed on the display unit 151 when the plurality of taps are sensed. However, a tap gesture may be used instead of the plurality of taps.

Figure 12:
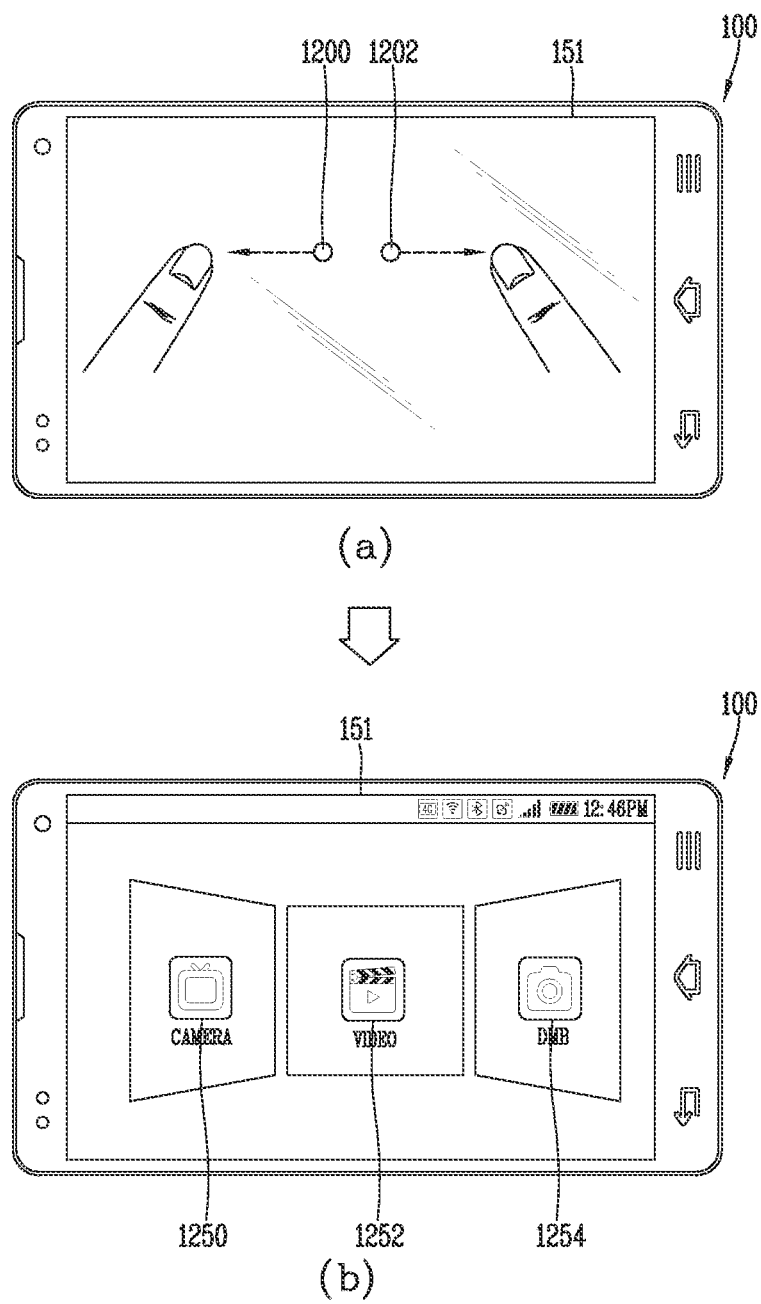
FIG. 12 is a conceptual view showing an example in which its associated function is performed based on a display operation state in a mobile terminal according to an embodiment of the present invention.

Next, FIG. 12 is a view showing an example in which a mobile terminal performs its associated function based on a display operation state when a tap gesture is applied according to an embodiment of the present invention. As shown in (a) of FIG. 12, when the user applies a plurality of taps and then certain gestures (for example, bidirectional drags 1200 and 1202) in respective positions in which the taps are applied, the controller 180 can sense this. The controller 180 can output, to the display unit 151, a screen for executing any one of functions executable by the mobile terminal 100 in response to the sensed touch gestures 1200 and 1202 for easily selecting at least one of the executable functions based on the current operation state of the mobile terminal 100.

For example, when the tap gesture is input as shown in (a) of FIG. 12, the controller 180 can display graphic objects corresponding to the executable functions based on the current operation state of the mobile terminal 100 on the display unit 151. Here, when the tap gesture is sensed unlike when a plurality of taps are applied, the controller 180 can operate in an operation mode for executing at least one specific function among the executable functions based on the current operation state of the mobile terminal 100. For example, when the tap gestures 1200 and 1202 are sensed, the controller 180 can operate in an operation mode in which a user may appreciate a photograph or movie, or a video that is made available to the public on the web.

In (b) of FIG. 12, such an example is shown. For example, when the tap gestures 1200 and 1202 are input, the controller 180 can switch the operation state of the mobile terminal 100 to an operation mode including a function of allowing the user to appreciate photographs, a function of allowing the user to appreciate movies, and a function of allowing videos that are available to the public on the web. The controller 180 can display the graphic objects 1250, 1252, and 1254 corresponding to functions included in the current operation mode on the display unit 151 and execute any one function corresponding to the selection of the user in the operation mode.

Here, when a tap additionally applied by the user is sensed, similarly to as described above, the controller 180 can control a function that is currently executed by the mobile terminal 100 based on the sensed tap. The mobile terminal 100 according to an embodiment of the present invention can operate in a specific operation mode according to the currently sensed environmental state and switch the specific operation mode to an original operation mode or a new operation mode when the plurality of taps or the tap gesture is applied by the user. For example, the controller 180 can control the mobile terminal 100 to operate in a specific operation mode based on whether the mobile terminal 100 faces upward or downward.

Figure 13:
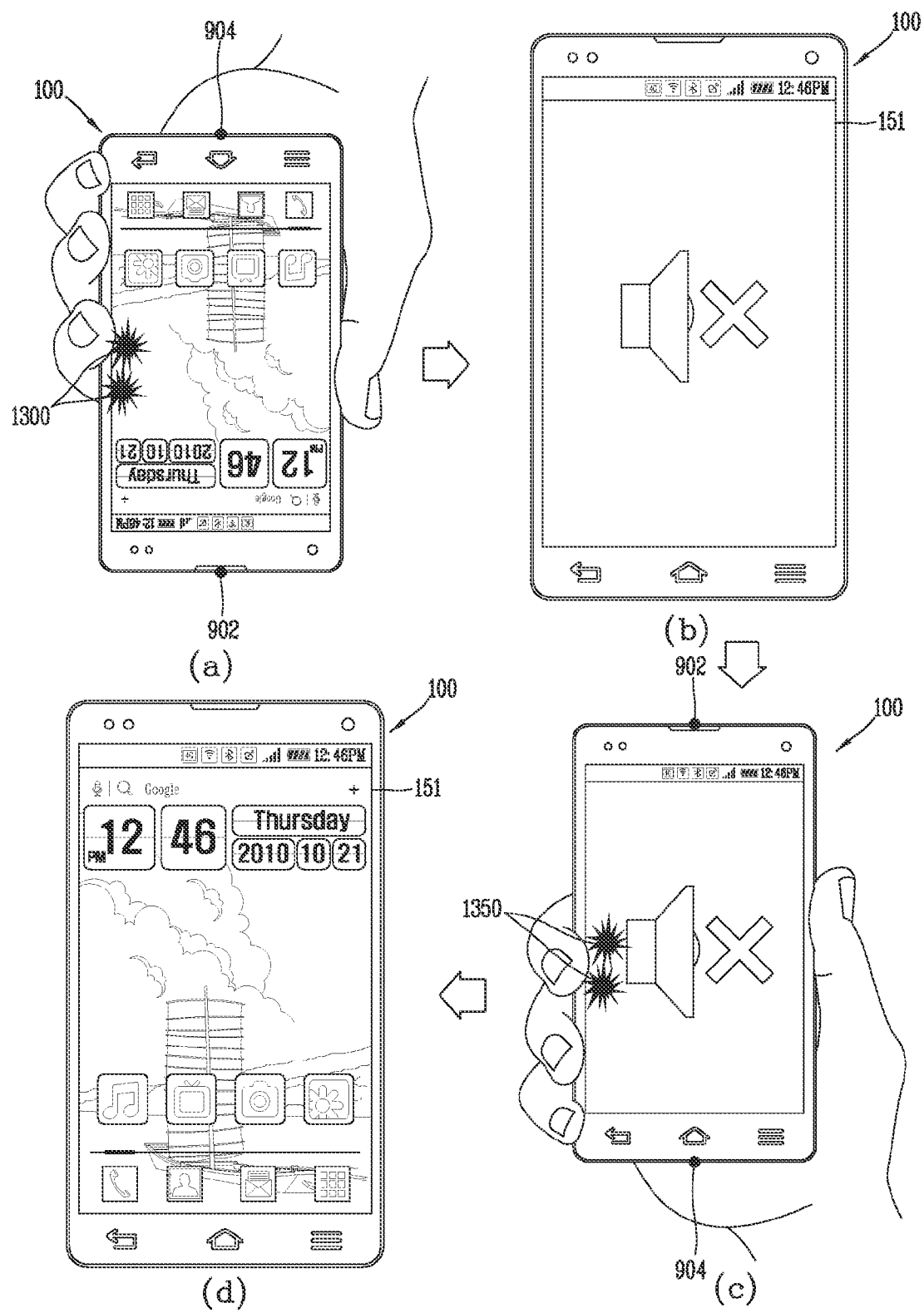
FIG. 13 is a conceptual view showing an example in which a mobile terminal operates in a specific operation mode based on an environmental state of the mobile terminal according to an embodiment of the present invention.

FIG. 13 is a view showing an example in which a mobile terminal operates in a specific operation mode based on an environmental state of the mobile terminal according to an embodiment of the present invention. As shown in (a) of FIG. 13, when a plurality of taps 1300 are input to the main body or display unit 151 of the mobile terminal 100 while the mobile terminal 100 is directed downward by a user, the controller 180 can sense this to switch the mobile terminal to a specific operation mode, for example, a mute mode or an incoming call mute mode.

Here, when the mobile terminal 100 is directed downward indicates the mobile terminal 100 standing upright but facing downwards such that the call speaker 902 is disposed vertically lower than the call microphone 904, as shown in (a) of FIG. 13. On the contrary, when the mobile terminal 100 is directed upward indicates the mobile terminal 100 is standing upright in a vertical direction such that the call speaker 902 is disposed higher than the call microphone 904. The controller 180 can sense a horizontal state or a vertical state of the mobile terminal 100 and sense whether the mobile terminal 100 is directed upward or downward using a gyro sensor, etc.

In (b) of FIG. 13, an example is shown in which the operation mode is switched to the mute mode or incoming call mute mode when the plurality of taps 1300 are applied while the mobile terminal 100 is directed downward, as shown in (a) of FIG. 13. Here, the mute mode indicates sound signal not being output through a speaker of the mobile terminal 100. The incoming call mute mode indicates an operation mode of informing the user that the call request signal has been received by using a light emitting device such as a light emitting diode (LED), instead of a sound signal such as a bell sound or alarm sound, when the call request signal is received by the mobile terminal 100.

Accordingly, when the user of the mobile terminal according an embodiment of the present invention enters a place, such as a conference room or a theater, in which the output of the sound signal is required to be limited, the user may switch the operation mode of the mobile terminal to the mute mode or incoming call mute mode only by simply inputting the plurality of taps while directing the mobile terminal 100 downward.

When the current operation mode of the mobile terminal 100 is the mute mode or incoming call mute mode, and when the plurality of taps are sensed, the controller 180 can unlock the mute mode or the incoming call reception mode in consideration of the direction of the mobile terminal 100. For example, as shown in (c) of FIG. 13, when the plurality of taps 1350 are sensed, the controller 180 can sense whether the mobile terminal 100 is directed upward. As the sensing result, when the mobile terminal 100 is directed upward, the controller 180 can determine that the plurality of taps 1350 intend to unlock the mute mode or incoming reception mode that is currently set.

Thus, the controller 180 can unlock the mute mode or the incoming call mute mode, as shown in (d) of FIG. 13. In this instance, the controller 180 can switch back to an operation mode before the mute mode or the incoming call mute mode. When the plurality of taps are applied, the mobile terminal 100 according to an embodiment of the present invention may sense ambient brightness to perform its associated operation function according to the sensed brightness.

Figure 14:
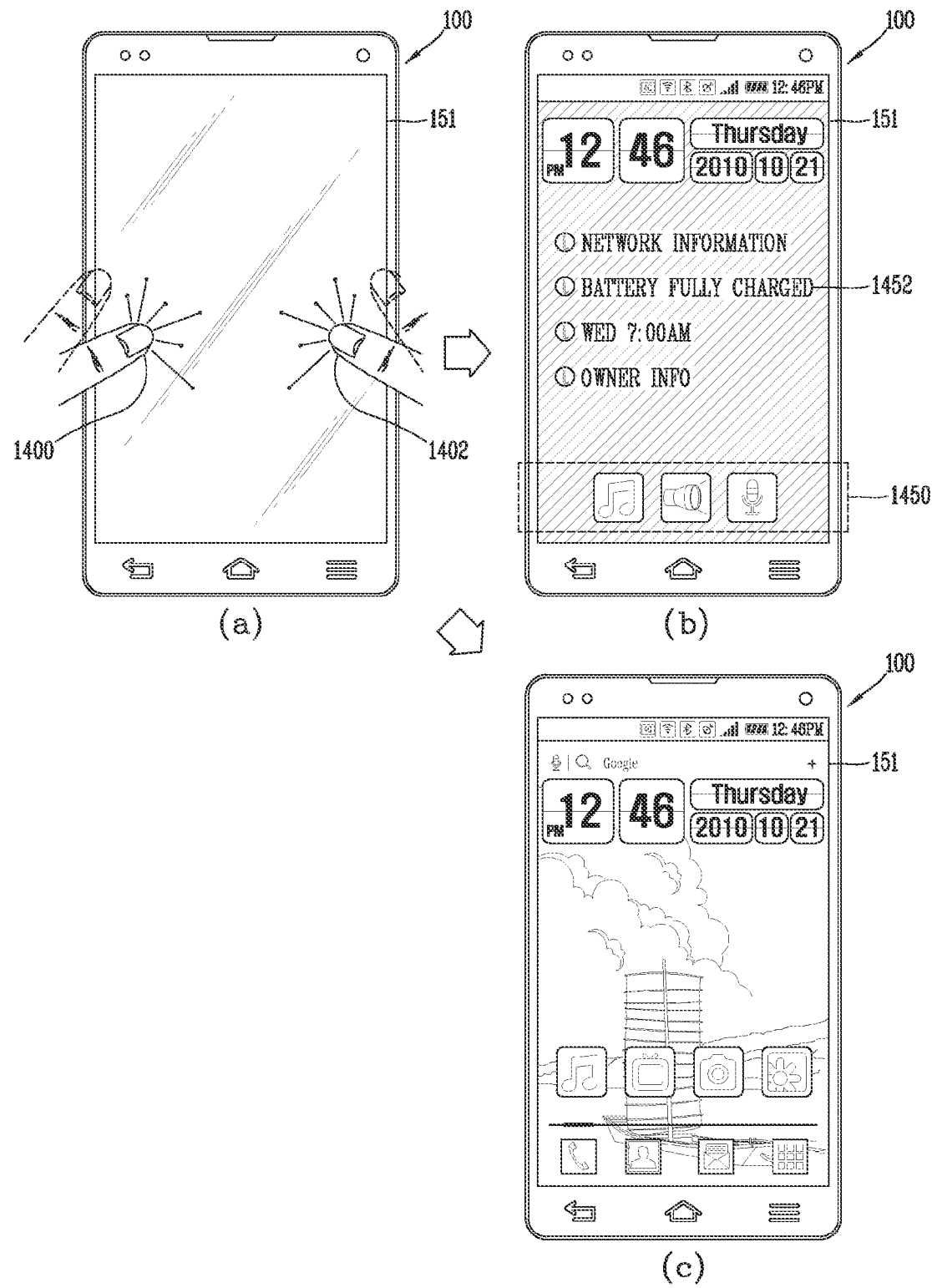
FIG. 14 is a conceptual view showing another example in which its associated operation function is performed based on an ambient brightness in a mobile terminal performs according to an embodiment of the present invention.

FIG. 14 is a view showing another example in which a mobile terminal performs its associated operation function based on an ambient brightness according to an embodiment of the present invention. For example, when a plurality of taps 1400 and 1402 are applied as shown in (a) of FIG. 14, the controller 180 can sense an ambient brightness of the mobile terminal 100 using an illumination sensor, etc. In addition, the controller 180 can adjust the brightness of the display unit 151 based on the sensed ambient brightness.

For example, when the plurality of taps 1400 and 1402 are applied, the controller 180 can output a home screen or unlock screen to the display unit 151 and simultaneously adjust the brightness of the display unit 151 based on the sensing result of the illumination sensor. That is, when a sensed value of the illumination sensor is less than a predetermined level, the controller 180 can determine that the ambient brightness of the mobile terminal 100 is low and output the home screen or unlock screen to the display unit 151 at a predetermined brightness level corresponding to a dark environmental state. Here, the predetermined brightness level corresponding to a dark environmental state may be less than a brightness level of the display unit 151, which is typically set by the user.

However, when the sensed value of the illumination sensor is greater than or equal to the predetermined level, the controller 180 can determine that the ambient brightness of the mobile terminal 100 is high and output the home screen or unlock screen to the display unit 151 at a predetermined brightness level.

The controller 180 can output a screen for allowing a user to select at least one function according to the sensed ambient brightness of the mobile terminal 100 to the display unit 151. For example, as shown in (a) of FIG. 14, when the plurality of taps 1400 and 1402 are sensed while the mobile terminal 100 is deactivated, that is, in a doze mode state, the controller 180 can output a screen on which graphic objects corresponding to one or more executable functions is displayed to the display unit 151.

Here, as the brightness sensing result of the illumination sensor, when the sensed value is greater than a predetermined threshold, the controller 180 can output a typical screen to the display unit 151 as shown in (c) of FIG. 14. However, when the brightness sensed by the illumination sensor is less than or equal to the predetermine threshold, the controller 180 can determine that it is dark around the mobile terminal 100 and output a display screen corresponding thereto.

In (b) of FIG. 14, such an example is shown. For example, when it is determined that it is dark around the mobile terminal 100, the controller 180 can output a screen for distinctly checking information displayed on the display screen even in a dark state, to the display unit 151. For example, the controller 180 can provide brief information on a current state of the mobile terminal 100 and a list of currently executable functions to the user using a clear contrast between light and shade by outputting a black and white screen to the display unit 151, instead of a color screen.

Here, the executable functions may be functions, such as a music playback or recording function or a flash on/off function, that are executable even when it is dark around the mobile terminal 100. In addition, the list of the functions may be displayed on the display unit 151 in the form of graphic objects 1450 and then provided to the user. In this instance, the graphic objects 1450 may be displayed on the display unit 151 in a larger size than in a typical state, that is, when the vicinity of the mobile terminal 100 is well lit.

Here, the controller 180 can adjust the brightness of the screen that is output to the display unit 151 and sizes of the graphic objects 1450 based on the sensing result of the illumination sensor. Here, even when the result of sensing of the ambient brightness of the mobile terminal 100 is greater than the predetermined threshold as well as less than or equal to the predetermined threshold, the controller 180 can change the brightness of the screen that is output to the display unit 151 and the sizes of the graphic objects corresponding to the executable functions based on the sensing result of the illumination sensor.

As described above, when the plurality of taps are sensed, the controller 180 of the mobile terminal 100 according to an embodiment of the present invention may determine whether the plurality of taps are applied with one hand or finger of the user or with both hands or at least two fingers of the user. For example, in order to determine whether the plurality of taps are applied with one hand or finger of the user or with both hands or at least two fingers of the user, the control unit may use angles at which the plurality of taps are sensed and a distance between regions in which the plurality of taps are sensed.

Here, when a difference between the sensed angles is less than or equal to a certain level, the controller 180 can determine that the angles at which the plurality of taps are sensed are the same as or similar to each other, and thereby may recognize that the plurality of taps are applied with one hand or finger of the user. However, when a difference between the angles at which the plurality of taps are sensed is greater than the certain level, the controller 180 can determine that the sensed angles are different, and thereby may recognize that the plurality of taps are applied with both hands or at least two fingers.

Alternatively, the controller 180 can recognize that the plurality of taps have been applied through different fingers using fingerprints of fingers that apply taps to the display unit 151 of the mobile terminal 100. Depending on whether the plurality of taps are applied with one hand or finger of the user or with both hands or at least two fingers of the user, the control unit may output a screen including different graphic objects to the display unit 151. The graphic objects correspond to functions that is executable by the mobile terminal 100.

That is, when it is determined that the plurality of taps are applied with one hand or finger, the controller 180 can output graphic objects corresponding to functions that are mainly used with one hand or finger to the display unit 151. On the contrary, when it is determined that the plurality of taps are applied with both hands or at least two fingers, the controller 180 can output graphic objects corresponding to functions that are mainly used with both hands or at least two fingers to the display unit 151.

Figure 15A:
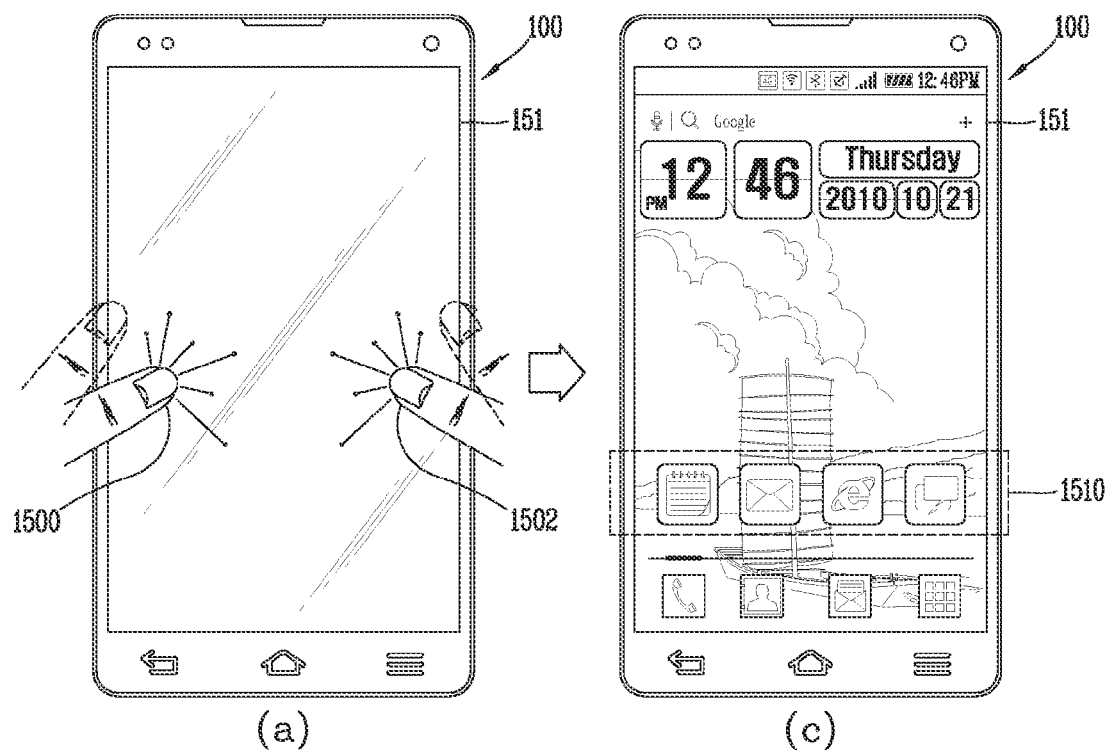
FIGS. 15A and 15B are conceptual views showing an example in which a mobile terminal displays at least one executable function based on a state of a tap input applied to a main body according to an embodiment of the present invention.
Figure 15B:
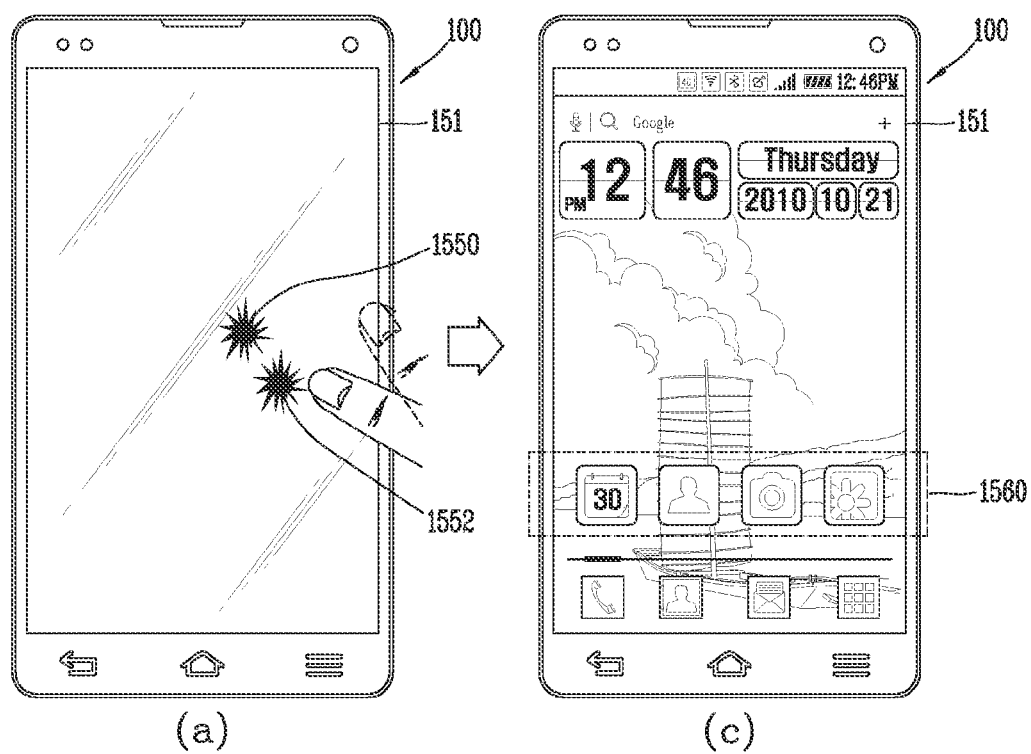

FIGS. 15A and 15B are views showing an example in which a mobile terminal displays at least one executable function based on a state of a tap input applied to a main body according to an embodiment of the present invention. For example, as shown in (a) of FIG. 15A, when the user applies a plurality of taps 1500 and 1502 to the display unit 151 in a doze mode state, the controller 180 can sense positions in which the plurality of taps 1500 and 1502 are applied using a touch sensor or an acceleration sensor. Here, the plurality of taps 1500 and 1502 may be sensed at the same time. When the positions in which the plurality of taps 1500 and 1502 are sensed are separated a certain distance from each other, the controller 180 can determine that the plurality of taps 1500 and 1502 are applied by the user with fingers from both hands.

In this instance, the controller 180 can display graphic objects 1510 corresponding to character input-related functions on the display unit 151, as shown in (b) of FIG. 15A. This is because the character input-related functions may be generally performed using a virtual keyboard and so on, and when multiple keys are used as in the virtual keyboard, characters may be input more quickly and easily with fingers from both hands than with one finger.

As shown in (a) of FIG. 15B, when the user applies a plurality of taps 1550 and 1552 with one finger in a doze mode state, the controller 180 can sense this to determine that the plurality of taps 1550 and 1552 are applied using one finger. For example, when the positions in which the plurality of taps 1500 and 1502 are not separated a certain distance from each other, the controller 180 can determine that the plurality of taps 1500 and 1502 are applied by the user with one finger.

In this instance, the controller 180 can display graphic objects 1560 corresponding to a phone call function, a contact search function, a camera function, and the like on the display unit 151, as shown in (b) of FIG. 15B. This is because such functions, unlike the character input function, do not need keys to be input by the user for control of the functions and thereby the functions may be sufficiently controlled with one finger.

When the user applies a plurality of taps with one hand finger in the doze mode state, the controller 180 can display graphic objects 1560 that are disposed on a predetermined home screen on the display unit 151. That is, when the user applies a plurality of taps with one hand finger, the mobile terminal 100 according to an embodiment of the present invention may recognize that the currently applied plurality of taps intend to make the display unit 151 be activated (that is, in a wake-up state).

It has been described as an example that graphic objects corresponding to different functions are displayed on the display unit 151 depending on whether the user applies the plurality of taps with one hand or with both hands. In addition, the controller 180 can display an interface screen including different functions, that is, applications on the display unit 151 when the user applies a plurality of taps depending on whether or not the user wears a glove on the hand.

For example, when the plurality of taps are sensed, the mobile terminal 100 according to an embodiment of the present invention may determine whether or not the user wears a glove on the hand depending on the intensity of an electric current that is generated from a touch object for applying the tap to the display unit 151.

Further, when a plurality of taps are applied to the display unit 151, the tap sensing unit 141 can further sense an electric current that is generated from the touch object that has applied the plurality of taps. That is, as the sensing result of the tap sensing unit 141, the controller 180 can determine whether the taps are applied through a body part (for example, a hand) of the user or through an object (for example, a touch pen) based on whether the electric current is sensed from the touch object that has applied the tap.

When the electric current is sensed from the touch object, the controller 180 can determine that the touch object is a body part (for example, a hand) of the user. In this instance, the controller 180 can drive different sensing modes depending on the intensity of the sensed electric current. For example, the mobile terminal 100 according to an embodiment of the present invention may be driven in a common sensing mode to sense a touch input of the user when the intensity of the sensed electric current is greater than a predetermined level. On the contrary, when the intensity of the sensed electric current is less than the predetermined level, the mobile terminal 100 may be driven in a high-sensitivity sensing mode.

When the mobile terminal is driven in the high-sensitivity sensing mode based on the intensity of the sensed electric current, the controller 180 can determine that the user has applied the tap with the body part wrapped in clothes or a cloth (for example, a glove). This is because when the user applies the tap to the display unit 151 while wearing a glove, the intensity of the sensed electric current is low, compared to a case in which the user's body is brought in direct contact with the display unit 151.

The high-sensitivity sensing mode that is operated when the intensity of the sensed electric current is low, that is, when the user applies a plurality of taps while wearing a glove may be used only when necessary in order to prevent power consumed by the mobile terminal 100 from being wasted. That is, only when the intensity of the electric current sensed from the touch object is less than the predetermined level, the controller 180 can operate in the high-sensitivity sensing mode.

For convenience of description, as a sensing result of the tap sensing unit 141, it is assumed that the user applies a tap with a bare hand when it is determined that the user directly applies a tap with the body part, and it is assumed that the user applies a tap with a gloved hand when it is determined that the user applies a tap with a specific body part wrapped in clothes or a cloth.

As described above, when the intensity of the sensed electric current is less than a predetermined level, that is, when the mobile terminal 100 operates in the high-sensitivity sensing mode, it is assumed that the controller 180 determines that the user wears a glove on the hand. On the contrary, when the intensity of the sensed electric current is greater than or equal to the predetermined level, that is, when the mobile terminal 100 operates in the common sensing mode, it is assumed that the controller 180 determines that the user has bare hands. However, the present invention is not limited thereto. If another condition for determining whether or not the user wears a glove on the hand may be further sensed, the present invention may be applied according to the condition for determining whether the user wears a glove on the hand.

Figure 16:
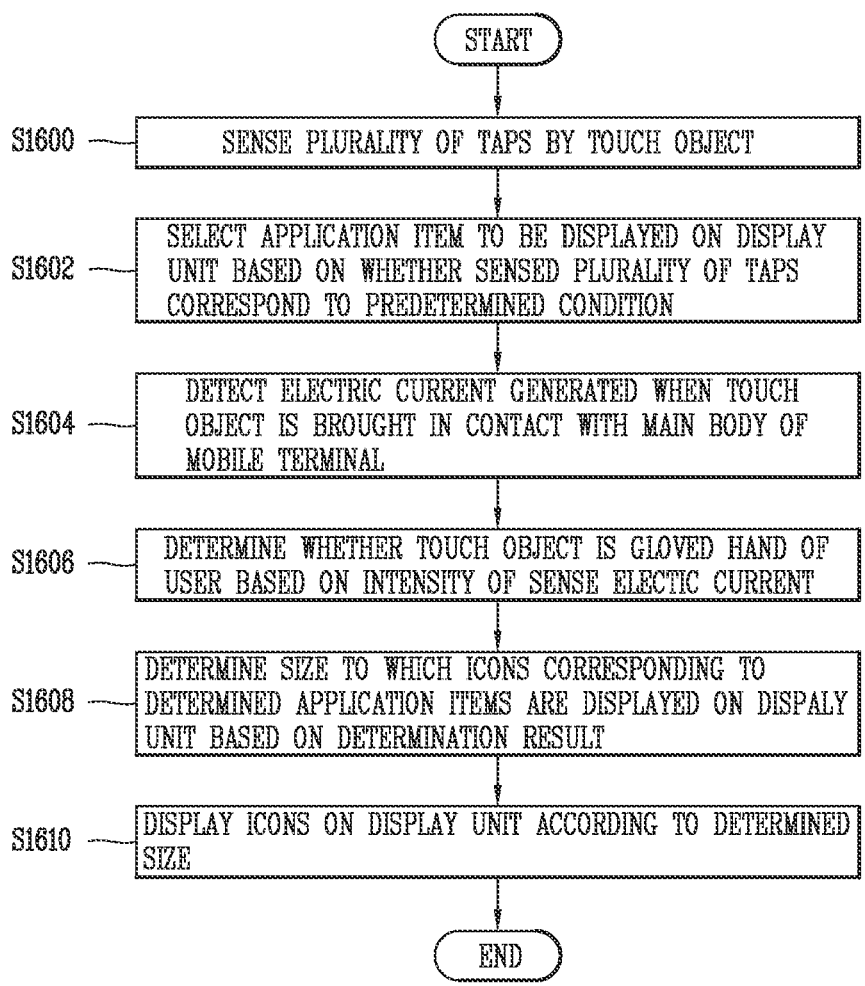
FIG. 16 is a flowchart showing a method of a mobile terminal outputting different interface screens depending on the intensity of an electric current that is sensed from a touch object according to an embodiment of the present invention.

FIG. 16 is a flowchart showing a method of a mobile terminal outputting different interface screens depending on the intensity of an electric current that is sensed from a touch object according to an embodiment of the present invention. When a plurality of taps are applied by a user, the controller 180 of the mobile terminal 100 according to an embodiment of the present invention can sense the plurality of taps through the tap sensing unit 141 (S1600). Here, the plurality of taps may be applied with both hands or with one finger. For example, the controller 180 can determine whether the plurality of taps are applied with fingers from both hands or one finger, depending on whether the positions of the display unit 151 in which the plurality of taps are sensed may be considered as one point (for example, when the plurality of taps are sensed within a predetermined region from a position in which an initial tap has been applied) or two points, as the tap sensing result of the tap sensing unit 141.

The controller 180 selects an item of an application to be displayed on the display unit 151 based on whether the taps correspond to the predetermined condition (S1602). Here, the predetermined condition may be when the plurality of taps are sensed. That is, items of applications corresponding to each condition may be selected depending on whether the tap is applied by the user with fingers from both hands or one finger.

Here, the controller 180 can determine whether the plurality of taps are applied with one finger or fingers from both hands based on a distance between the positions in which the plurality of taps are sensed, fingerprints sensed from the finger of the user who has applied the plurality of taps, and an angle at which the touch object has applied the plurality of taps.

As the determination result, when it is determined that the plurality of taps are applied by the user with fingers from both hands, the controller 180 can select at least one character input-related application as applications to be displayed on the display unit 151. In addition, when the plurality of taps are applied with one finger, the controller 180 can select applications included in the typical home screen.

In this instance, the controller 180 can further sense an electric current that is generated from the touch object for applying the plurality of taps (S1604). As a result of sensing the electric current generated from the touch object, the controller 180 can detect whether the intensity of the sensed electric current is less than a predetermined level. The controller 180 can determine whether the touch object that apply the plurality of taps is a bare hand or a gloved hand depending on the detection result (S1606). That is, the controller 180 can determine whether the user wears a glove on the hand based on the intensity of an electric current that is generated from the touch object.

The control unit determines the size in which icons corresponding to application items that are determined in operation S1602 are to be displayed on the display unit 151 based on the determination result in the operation S1606, that is, based on whether the user wears a glove on the hand (S1608). For example, when the user wears a glove, in consideration of this, the controller 180 can display the icons in an enlarged form such that the user can easily select a desired function (S1610).

Figure 17A:
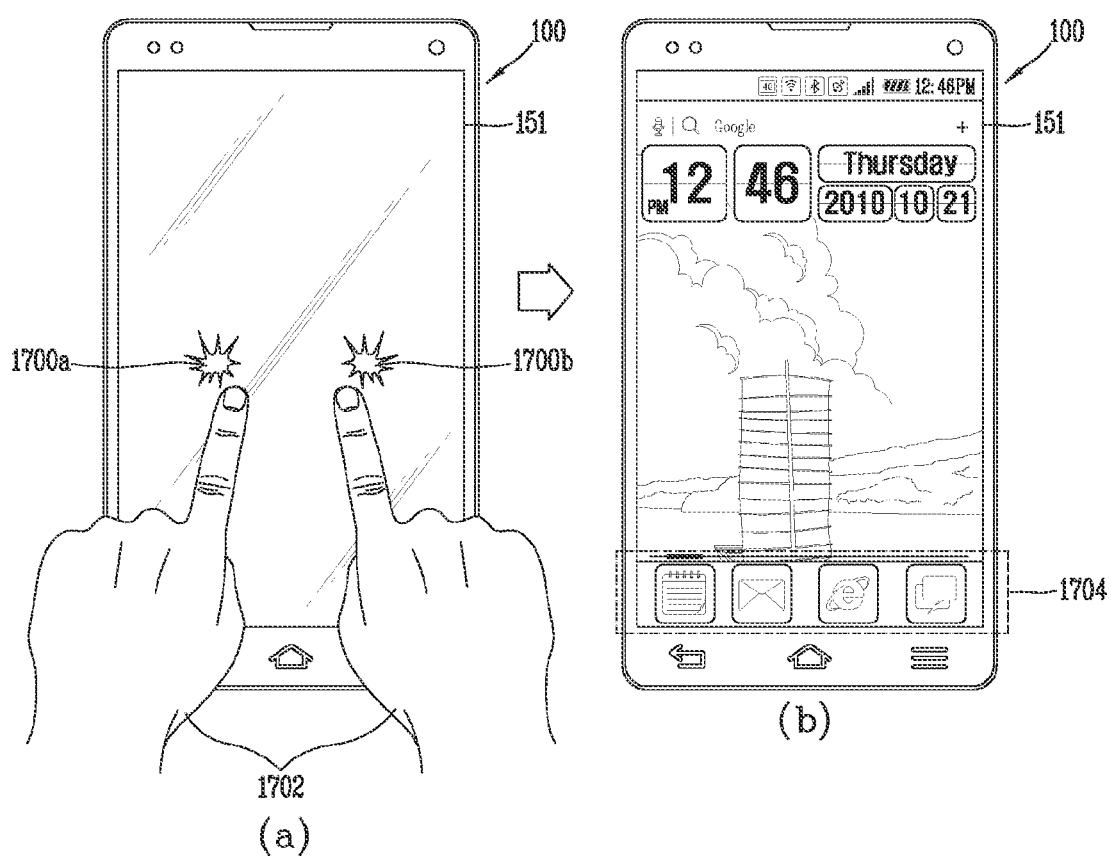
FIGS. 17A and 17B are views showing an example of a screen that is displayed by a mobile terminal when a plurality of taps are applied by both hands based on whether a user wears a glove on the hand according to an embodiment of the present invention.
Figure 17B:
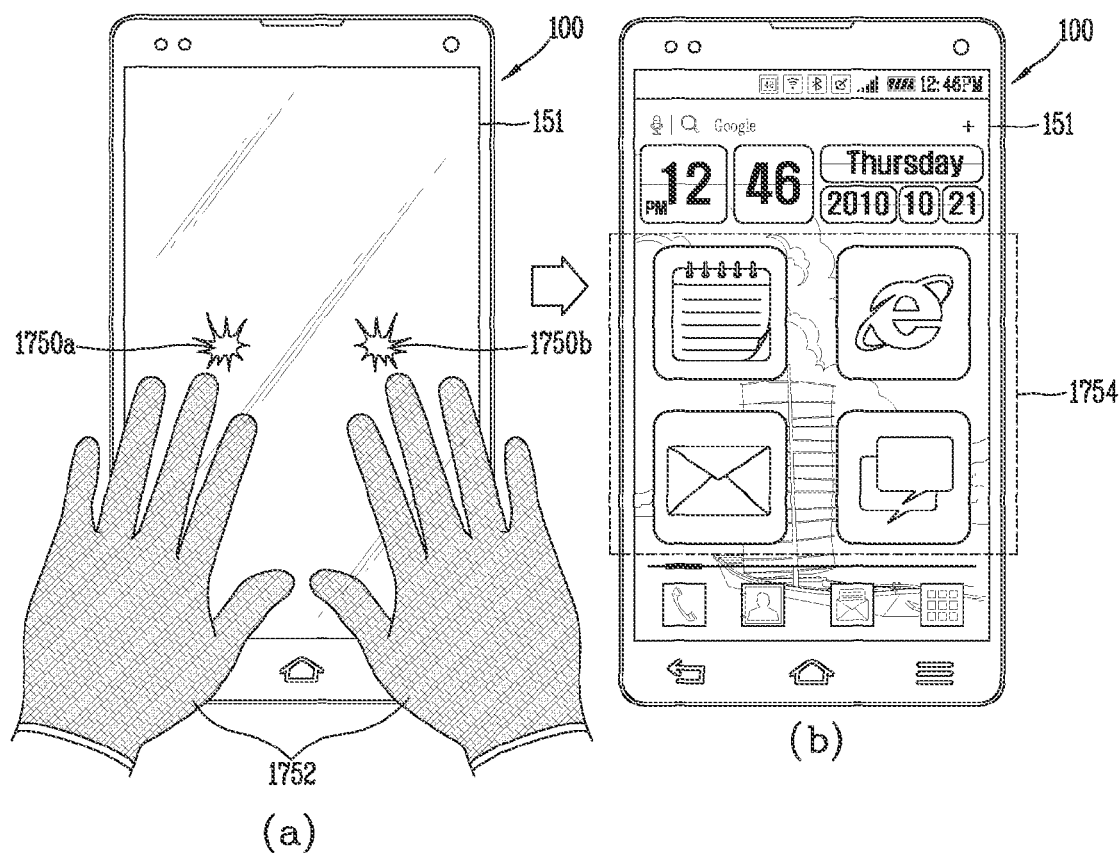

In FIGS. 17A and 17B, such an example is shown. As shown in FIGS. 17A and 17B, when the user applies a plurality of taps with fingers from both hands, the controller 180 can select an application to be displayed on the display unit 151 based on when the plurality of taps are applied. The controller 180 can determine the size of an icon corresponding to the determined application based on whether the user wears a glove on the hand or not.

That is, when the user applies a plurality of taps 1700a and 1700b using fingers from both bare hands as shown in (a) of FIG. 17A or the user applies a plurality of taps 1750a and 1750b using gloved fingers from both hand, items 1704 and 1754 corresponding to one or more character input-related function applications may be selected.

In this instance, the controller 180 can sense an electric current generated from a touch object, that is, the hands 1702 and 1752 of the user who applies the plurality of taps and determine the size of an icon that is displayed on the display unit 151 based on the intensity of the sensed electric current. For example, when the touch object that applies the plurality of taps is a bard hand of the user (see (a) of FIG. 17A), the controller 180 can sense that the intensity of the electric current is greater than or equal to a predetermined level, as the sensing result of the tap sensing unit 141. In this instance, the controller 180 can display an icon of the selected application in a typical size, as shown in (b) of FIG. 17A.

However, when the touch object that applies the plurality of taps is a gloved hand of the user (see (b) of FIG. 17B), the controller 180 can sense that the intensity of the electric current is less than the predetermined level, as the sensing result of the tap sensing unit 141. In this instance, the controller 180 can display an icon of the selected application in a much larger size than the typical size, as shown in (b) of FIG. 17B. This allows the user to easily select a desired application even when the user wears a glove on the hand and thereby the user becomes insensitive or the intensity of the electric current sensed from the hand of the user becomes low.

Unlike as shown in FIGS. 17A and 17B, when a user touches the display unit 151 of the mobile terminal 100 with one finger, the controller 180 can display a predetermined home screen, that is, applications included in the home screen on the display unit 151. In this instance, when it is determined that the user wears a glove, the controller 180 can display icons corresponding to the applications on the display unit 151 in a much larger size than the typical size, as shown in (b) of FIG. 17B.

Figure 18A:
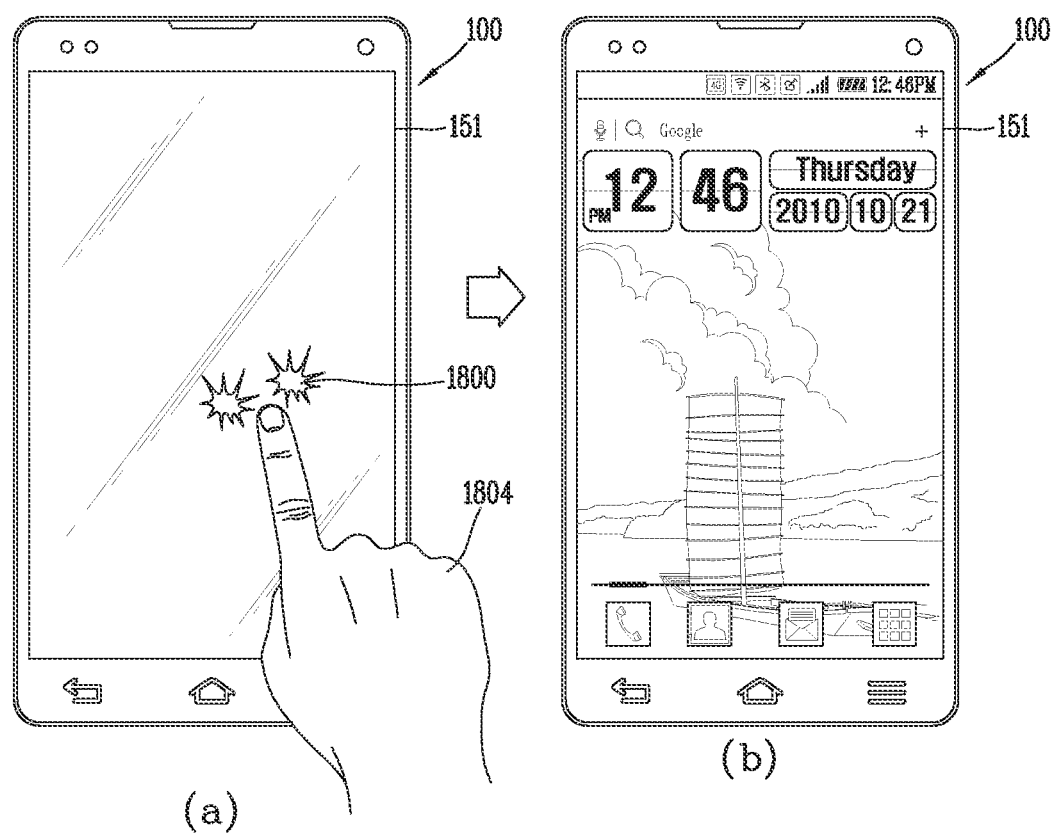
FIGS. 18A and 18B are views showing an example of a screen that is displayed by a mobile terminal when a plurality of taps are applied by one hand based on whether a user wears a glove on the hand according to an embodiment of the present invention.
Figure 18B:
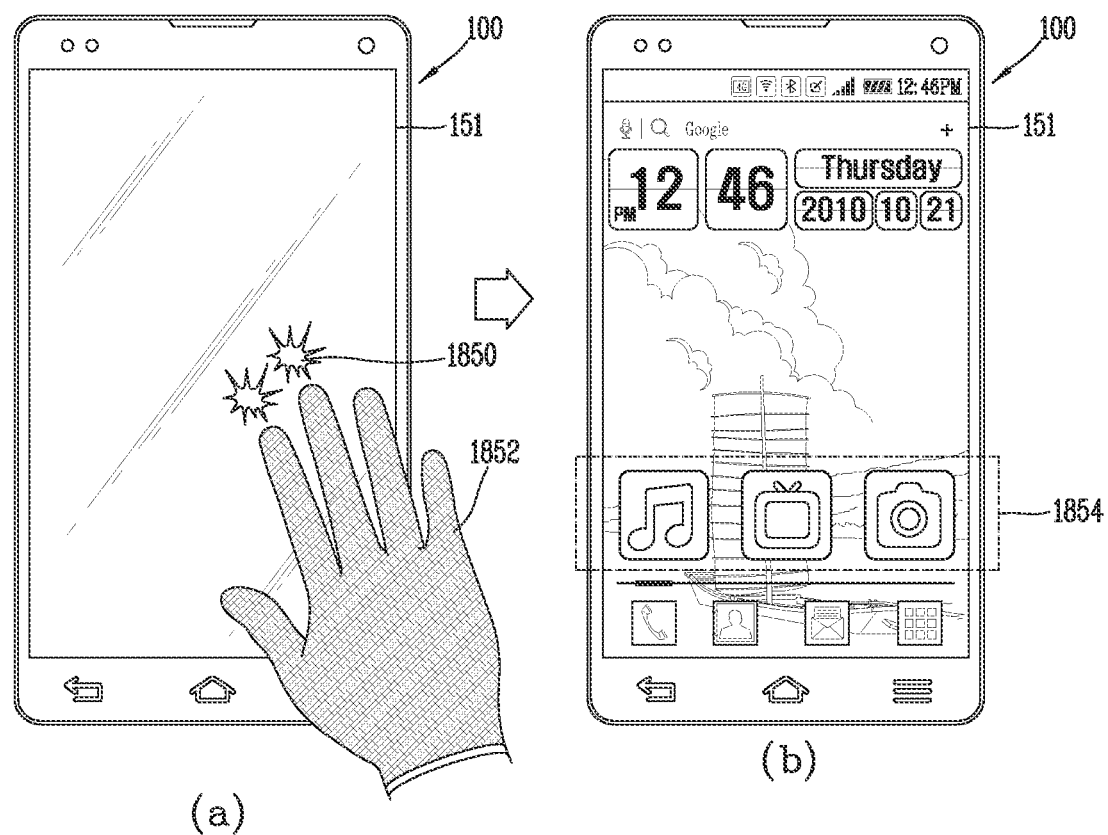

In FIGS. 18A and 18B, such an example is shown. As described above, the controller 180 can determine an item of an application to be displayed on the display unit 151 when the plurality of taps are applied. In this instance, as shown in (a) of FIG. 18A, when the plurality of taps are applied by a user with one finger, the controller 180 can determine the applied plurality of taps are not consistent with a predetermined condition (when the plurality of taps are applied with fingers from both hands) and perform selection such that the applications included in the home screen are displayed on the display unit 151.

In this instance, the controller 180 can further sense the intensity of an electric current that is generated from a touch object, that is, the user's hand. That is, as described above, the controller 180 can determine whether the touch object is a touch pen (when the electric current is not sensed), a bare hand (when the sensed electric current is greater than or equal to a predetermined intensity), or a gloved hand (when the sensed electric current is less than a predetermined intensity) through the electric current generated from the touch object.

Accordingly, when the user applies the plurality of taps with one bare hand finger 1804 in a doze mode state as shown in (a) of FIG. 18A, the home screen can be output to the display unit 151 that is turned on in response to the plurality of taps as shown in (b) of FIG. 18A. However, when the user applies the plurality of taps with one gloved hand finger 1852 as shown in (a) of FIG. 18B, the controller 180 can display application icons 1854 on the display unit 151 in a larger size than the typical size as shown in (b) of FIG. 18.

Thus, as shown in (b) of FIG. 18B, a home screen including the application icons having the enlarged size may be displayed on the display unit 151. In addition to as shown in FIGS. 17B and 18B, when it is determined that the user wears a glove on the hand, the controller 180 can further provide a function of allowing the user to easily select a desired application and input a key.

Figure 19:
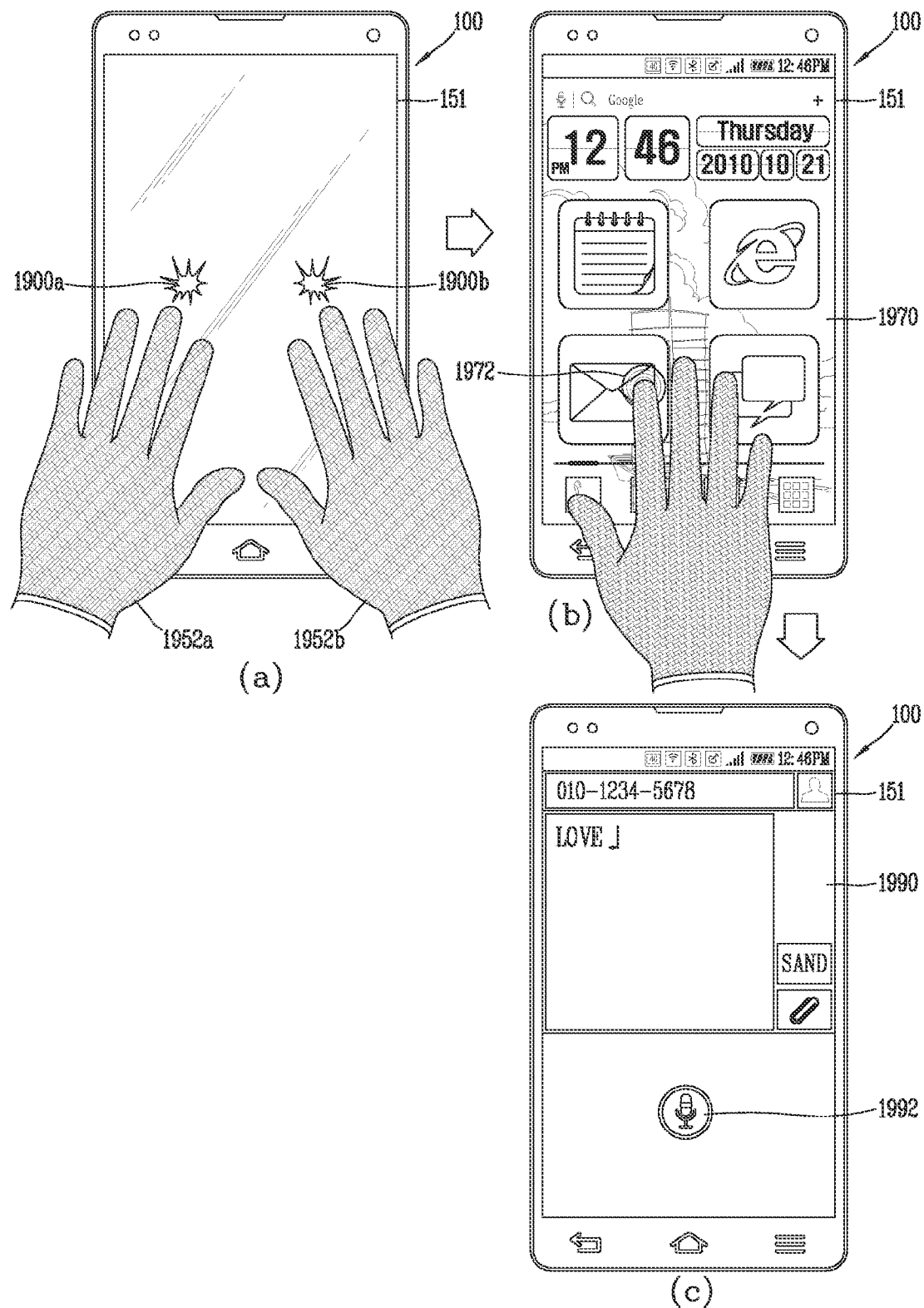
FIG. 19 is a view showing an example in which a mobile terminal executes a specific application when a plurality of taps are sensed according to an embodiment of the present invention.

FIG. 19 illustrates such an example. For example, when the user applies the plurality of taps with both gloved-hand fingers 1952a and 1952b as shown in (a) of FIG. 19, the controller 180 can select applications related to a character input function as shown in (b) of FIG. 19 and display icons corresponding to the applications on the display unit 151 in an enlarged form. Then, when the user selects any one icon 1972 as shown in (b) of FIG. 19, the controller 180 can execute an application corresponding to the selected icon.

Here, the controller 180 allows the user to apply a voice input, instead of a key input of the user to the currently selected application, additionally using a voice input function as shown in (c) of FIG. 19. That is, when the user executes an application related to the character input function while wearing a glove, the controller 180 can also execute a voice input function such that the user may easily input a desired character although the user wears a glove.

In this instance, as shown in (c) of FIG. 19, the controller 180 can divide the display unit 151 into a plurality of regions. Then, the controller 180 can output a screen related to an application in execution to any one of the plurality of regions and output a screen related to a voice input function to another of the plurality of regions. In addition, the controller 180 can convert a voice signal of the user, which has been sensed until the application is ended by the selection of the user or the voice input function is ended, into character information to display the converted character information on a screen related to the application.

The voice input function may be executed by the selection of the user. For example, when it is determined that the user wears a glove in the hand, the controller 180 can execute the voice input function when a specific key input or an additional tap to a specific point of the main body or display unit 151 of the mobile terminal 100 is sensed. In addition, the controller 180 can also execute the voice input function in addition to the character input application when the plurality of taps applied by the user are sensed. For example, when a sensing state for any one of the plurality of taps is maintained over a certain time, that is, when any one 1952b of fingers of the user who applies a plurality of taps is held while the plurality of taps are applied, the controller 180 can execute the voice input function in addition to the character input application.

It has been described as only an example that when the plurality of taps are sensed, the controller 180 senses the intensity of an electric current generated from the touch object that applies the plurality of taps to determines whether or not the user wears a glove and display icons enlarged to a predetermined size on the display unit 151. However, the present invention is not limited thereto. That is, in the mobile terminal 100 according to an embodiment of the present invention, a menu or user interface corresponding to when the user wears a glove may have been previously set, and when the controller 180 determines that the user wears a glove, the controller 180 can change the setting of the mobile terminal 100 to the previously set menu or the user interface state. Further, in the memory 160, information related to the user interface corresponding to the user wearing a glove and/or information related to at least one menu corresponding to when the user wears a glove may be further stored.

Here, the user interface for when the user wears a glove may indicate a user interface in which characters or elements of all menu screens are enlarged to a predetermined size such that the user can easily manipulate the mobile terminal 100 while wearing a glove. Alternatively, the user interface for the state in which the user wears a glove may indicates an operation state in which only icons are enlarged to a predetermined size and then output as shown in FIGS. 17B, 18B, and 19.

Furthermore, the menu that has been previously set corresponding to the state in which the user wears a glove may indicate a menu including specific applications that have been previously set as being frequently used in the state in which the user wears a glove. For example, when a plurality of taps are applied by a user who wears a glove while the display unit 151 is deactivated, the controller 180 of the mobile terminal 100 according to an embodiment of the present invention may determine that the user is in an outdoor area and display a menu screen including applications that are mainly used outdoors on the display unit 151. In this instance, the controller 180 can output a menu screen including an application related to a navigation function or applications, such as a passometer, an ictometer, and a calorimeter, for measuring an exercise amount of a user to the display unit 151.

The controller 180 can determine whether the user wears a glove to output its associated menu or automatically operate in an operation mode (hereinafter, referred to as a glove mode) in which the mobile terminal is driven in a user interface environment. However, the controller 180 can automatically switch the mobile terminal to the glove mode based on the sensing result of the touch object only when the user selects automatic switching to the glove mode according to the selection of the user.

It has been descried as an example that when a user applies the plurality of taps, different applications (for example, a character input-related application) desired by a user to be executed are displayed depending on a state of the user when the plurality of taps are applied and the intensity of an electric current sensed from the touch object. However, the mobile terminal 100 according to an embodiment of the present invention may recognize at least one of its own state and an ambient environment to determine a current situation of the user and allow a function appropriate to the determined situation of the user to be performed.

Figure 20:
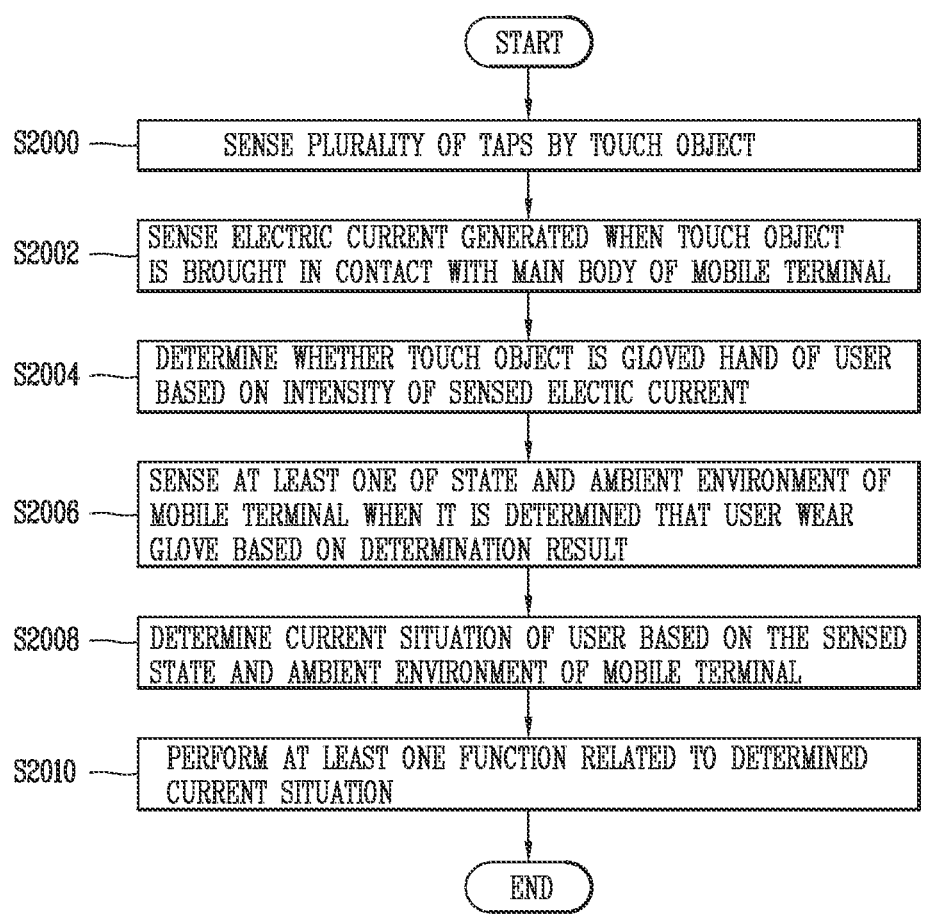
FIG. 20 is a flowchart showing a method of a mobile terminal performing a function appropriate to a user's situation based on the intensity of an electric current that is sensed from a touch object according to an embodiment of the present invention.

FIG. 20 is a flowchart showing a method of a mobile terminal performing a function appropriate to a situation of a user based on the intensity of an electric current sensed from a touch object according to an embodiment of the present invention. Referring to FIG. 20, when the plurality of taps are applied, the controller 180 of the mobile terminal according to an embodiment of the present invention senses the plurality of taps (S2000). When the touch object that applies the plurality of taps is brought in contact with the display unit 151 of the mobile terminal 100, the controller 180 senses an electric current generated from the touch object and measures the intensity of the sensed electric current (S2002). The controller 180 determines whether the touch object is a user's hand based on the intensity of the sensed electric current and determines whether the user wears a glove when the touch object is the user's hand (S2004).

Based on the determination result in operation S2004, when it is determined that the touch object is a gloved hand of the user, the controller 180 senses at least one of a current state of the mobile terminal 100 and an ambient environment of the mobile terminal 100 (S2006). The controller 180 can determine the current situation of the user based on the sensed state and ambient environment of the mobile terminal 100 (S2008).

For example, when the plurality of taps are applied, the controller 180 can determine whether the user is in an indoor area or an outdoor area based on whether or not the user wears a glove. Alternatively, the controller 180 can determine various operation states of the user through the state sensing unit 142. That is, as the sensing result of the state sensing unit 142, when an acceleration is sensed over a certain time in a certain magnitude or pattern, the controller 180 can determine that the user is walking or running. Furthermore, the controller 180 can compare the sensing results that are sensed by various sensors included in the state sensing unit 142 with user operation information that has been previously stored in the memory to determine a current operation state of the user. Thus, the state sensing unit 142 can further include an acceleration sensor and an inertial sensor in addition to an illumination sensor or gyro sensor.

In addition, the controller 180 can further utilize the result obtained by sensing an ambient environment of the mobile terminal 100 in order to accurately determine the current situation of the user. For example, when it is determined that the user stops for a certain period of time or more while walking or running, the controller 180 can determine that the user is taking a break.

The controller 180 executes at least one function related to the determined current situation of the user (S2010). For example, the controller 180 can select and play back different songs based on a user operation state when it is determined that a user is running or walking. When the user is in an outdoor area, the controller 180 can execute a navigation function in which a current position of the mobile terminal 100 and map information about surrounding areas are displayed, through the position information module 115.

Figure 21:
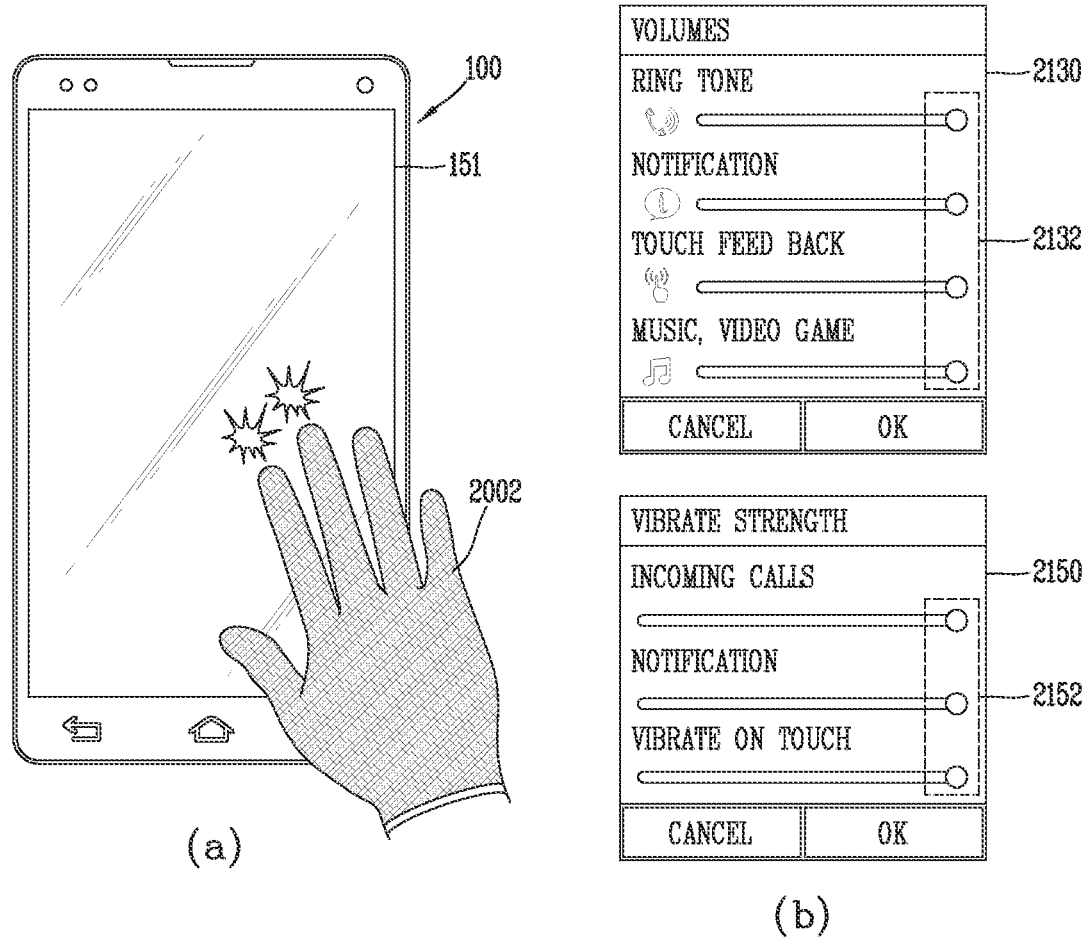
FIG. 21 is a view showing an example in which a mobile terminal changes its setting state based on the intensity of an electric current that is sensed from a touch object according to an embodiment of the present invention.

FIG. 21 is a view showing an example in which a mobile terminal changes its setting state based on the intensity of an electric current sensed from a touch object according to an embodiment of the present invention. For example, as shown in (a) of FIG. 21, when the user applies a plurality of taps to the display unit 151 of the mobile terminal 100 while wearing a glove, the controller 180 can determine that the user wears the glove based on the intensity of an electric current sensed from a hand 2100 of the user. When the user wears a glove, the controller 180 can determine that the user is in an outdoor area.

In this instance, the controller 180 can change various setting states, appropriately to the outdoor situation. For example, as shown in (b) of FIG. 21, the controller 180 can change the output intensity of a sound signal such as a bell sound and an alarm sound to a predetermined level and also change the intensity of vibration to a predetermined level. In addition, the controller 180 can change the illumination brightness to a predetermined level based on the outdoor state.

In this instance, in order to prevent the setting of the mobile terminal 100 from being changed whenever the user applies the plurality of taps, the controller 180 can check a current state of the mobile terminal in advance before the setting changing. In this instance, the controller 180 can change the setting of the mobile terminal 100 only when the intensity of the sound signal or the brightness of illumination is less than a predetermined level as a result of checking the setting state.

The state change may be performed at different levels based on a current time. For example, when it is determined that the user is in an outdoor area, the controller 180 can further check whether it is daytime or nighttime by checking the current time. The controller 180 can set the illumination brightness of the display unit 151 to the maximum level when the current time is a night and to a certain level when the current time is a day.

Furthermore, the controller 180 can sense the ambient environmental state to set the output intensity of the sound signal, such as a bell sound and an alarm sound, and the intensity of vibration differently from each other. For example, the controller 180 can measure a degree of ambient noise using a microphone or sensor included in the state sensing unit 142. Based on the measured degree of ambient noise, the controller 180 can set the output intensity of the sound signal to be higher than the intensity of the vibration when the ambient noise is less than or equal to a predetermined level and may set the intensity of the vibration to be higher than the output intensity of the sound signal when the ambient noise is greater than a predetermined level.

When a plurality of taps are sensed, the controller 180 of the mobile terminal 100 according to an embodiment of the present invention may execute a specific function based on the current time and the current state of the user. When it is determined that the user is in an outdoor area, the controller 180 can execute different functions based on a time when the plurality of taps are sensed.

Figure 22:
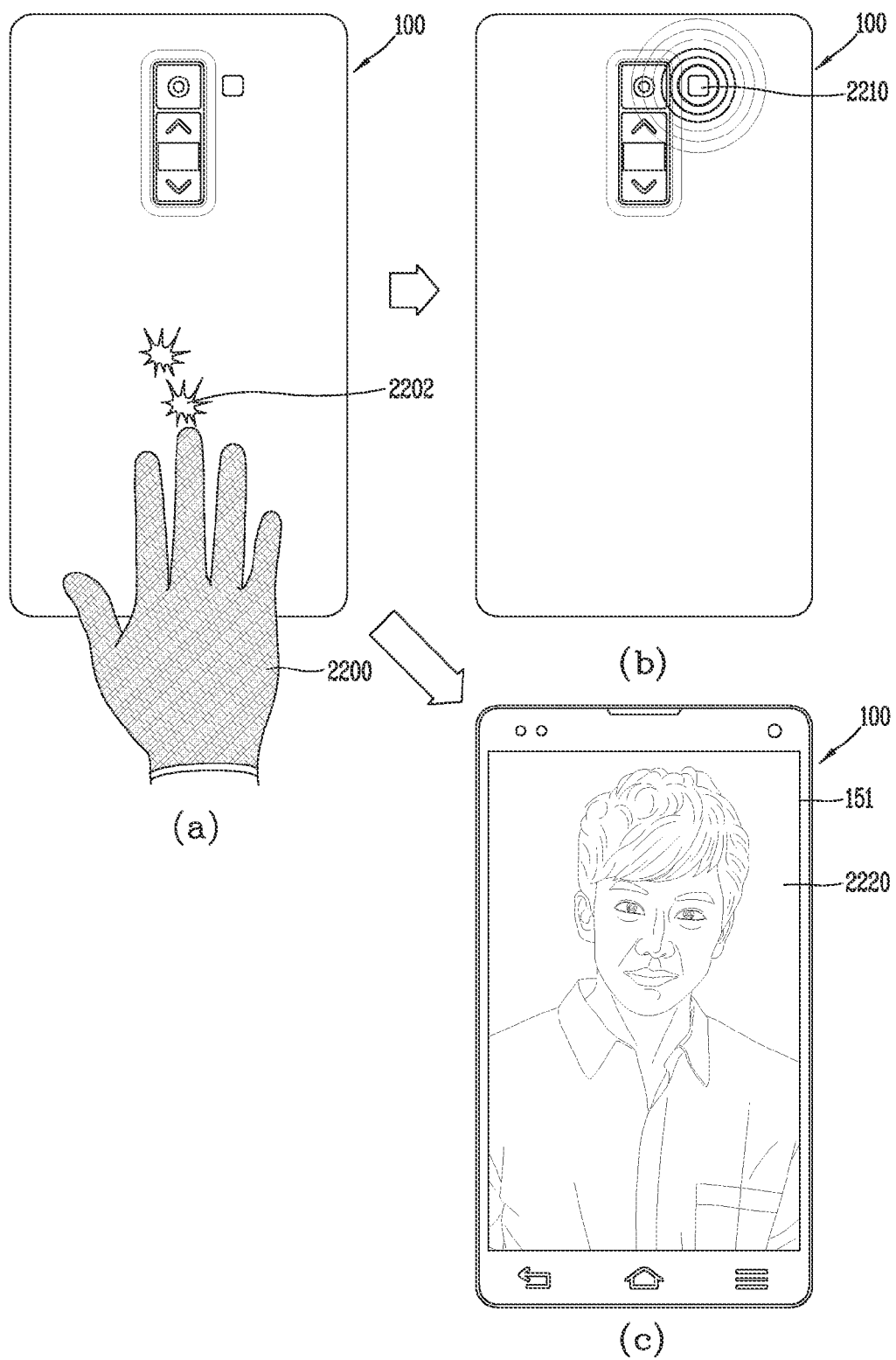
FIG. 22 is a view showing an example in which different functions are performed based on a time when a plurality of taps are sensed in a mobile terminal according to an embodiment of the present invention.

FIG. 22 is a view showing an example in which different functions are performed based on a time when a plurality of taps are sensed in a mobile terminal according to an embodiment of the present invention. For example, when a plurality of taps 2202 are applied to the display unit 151 while a user wears a glove, the controller 180 can check a time when the plurality of taps are applied. When the checked time corresponds to a "nighttime," the controller 180 can perform a flash function of allowing the mobile terminal 100 to be used as a flashlight using a flash of the mobile terminal 100, as shown in (b) of FIG. 22. However, when the checked time corresponds to a "daytime," the controller 180 can perform a mirror function of allowing the display unit 151 of the mobile terminal 100 to be used as a mirror, as shown in (c) of FIG. 22.

Such functions as shown in FIG. 22 are examples of functions that may be performed depending on a time when the plurality of taps are sensed in the mobile terminal 100 according to an embodiment of the present invention. That is, much more functions may be executed in addition to the functions shown in FIG. 22. Furthermore, such functions may be designated in advance.

For example, when the time at which the plurality of taps are applied is a time at which the predetermined wakeup call alarm is output, the controller 180 can determine that the plurality of taps intend for the user to stop outputting the wakeup call alarm. In this instance, when the plurality of taps are sensed, the controller 180 can complete the currently output wake-up call alarm and its associated at least one alarm. For example, when the user applies the plurality of taps while any one wakeup call alarm is output, the controller 180 can complete all of wakeup call alarms that are scheduled this morning.

In addition, similarly, when the plurality of taps are sensed in a time zone automatically set by the user in advance as a bedtime slot, the controller 180 can complete all of alarms that are set within the bedtime slot. Here, the alarm may include all of an incoming bell and a message incoming alarm.

In addition, according to the selection of the user, when the user applies a plurality of taps while wearing a glove, that is, being in an outdoor area, the controller 180 sends a call to a predetermined telephone number (for example, home) if the time at which the plurality of taps are applied is a "nighttime." In addition, the controller 180 allows the user to input the phone number using the user's voice signal to more easily send a call to a desired phone number.

However, when the user is in an outdoor area (that is, wears a glove), and a time at which a plurality of taps are applied is a "daytime," the controller 180 can finds out the current position of the user to display the current position of the user and regional information on the region in which the user is located on the display unit 151.

Figure 23:
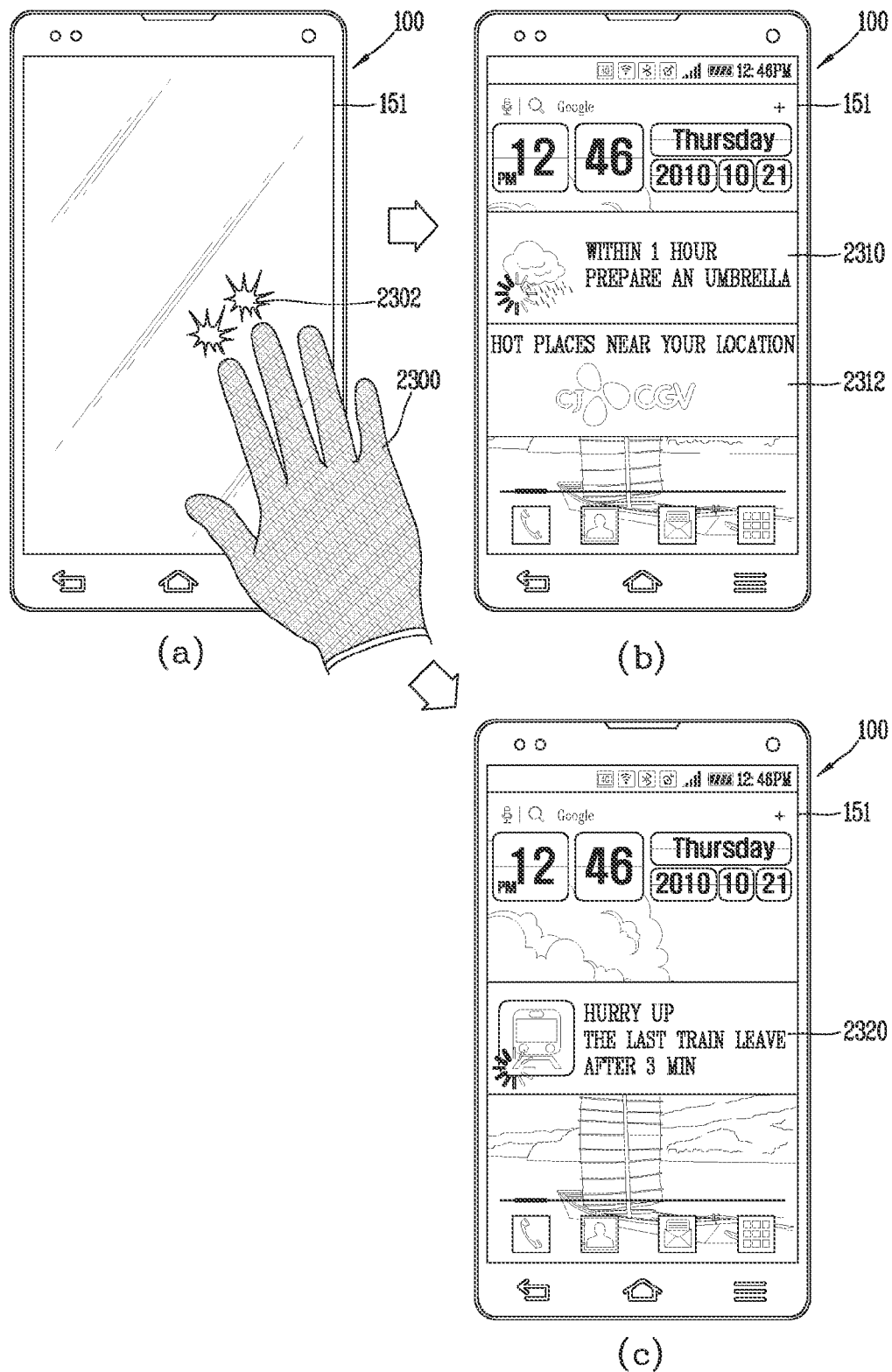
FIG. 23 is a view showing an example in which alarm information is displayed according to a user's current situation a mobile terminal according to an embodiment of the present invention.

FIG. 23 is a view showing an example in which a mobile terminal displays regional information on a region where a user is located when the user is in an outdoor area alarm information according to a current situation of a user according to an embodiment of the present invention. For example, as shown in (a) of FIG. 23, when the user applies a plurality of taps 2302 while wearing a glove 2300, the controller 180 can determine that the user wears the glove based on the intensity of an electric current sensed from a touch object. In this instance, as described above, the controller 180 can determine that the user is in the outdoor area and display various information suitable for the current situation of the user on the display unit 151.

For example, the controller 180 can sense the current position of the mobile terminal 100 using the position information module 115 and provide information on a region where the user is currently positioned to the user based on the sensed position. That is, the controller 180 can output weather information on the region where the user is currently positioned or a building or place of a landmark around the region where the user is currently positioned in an alarm form. Alternatively, the controller 180 can search for a place corresponding to a category that has been previously set by the user and output an alarm including the search information. Alternatively, the controller 180 can further sense at least one of the specific state of the mobile terminal and the specific ambient environment of the mobile terminal 100 in addition to the current position of the user and display information on a place suitable of a current situation of the user on the display unit 151.

In (b) and (c) of FIG. 23, such an example is shown. Referring to (b) of FIG. 23, in (b) of FIG. 23, an example is shown in which the controller 180 searches for weather information on the region the user is currently positioned and a hot place in the region where the user is currently positioned and displays the search information on different regions of the display unit 151. As such, when it is determined that the user is in an outdoor area, the mobile terminal 100 according to an embodiment of the present invention may provide information suitable for the current situation of the user.

Although an example in which only two pieces of information are displayed on the display unit 151 is shown in (b) of FIG. 23, the information that may be displayed according to an embodiment of the present invention is not limited thereto. That is, according to the selection of the user, the controller 180 can display information, which is not shown in (b) of FIG. 23, on the display unit 151 in an alarm form.

For example, according to the selection of the user, the controller 180 can search for various places, such as a theater, a restaurant, a bookstore, and the like, corresponding to a category desired by the user in the region where the user is currently positioned at the same time. In this instance, the controller 180 can search for a place (for example, a restaurant or theater) corresponding to the category selected by the user, in the region in which the user is currently positioned. Furthermore, the controller 180 can display an alarm screen including at least one of the found places on the display unit 151 based on predetermined priorities. For example, the controller 180 can use a comment score of another user who has experienced the restaurant or theater as the priorities for selecting at least one from among the places.

As such, when there are two or more pieces of information to be displayed in the alarm screen, the controller 180 can divide the alarm screen into a plurality of regions based on the number of pieces. The controller 180 can output the alarm screen including the information pieces in respective regions of the alarm screen divided into a plurality of regions corresponding to the number of information pieces to be displayed, to a portion of the display unit 151.

In addition, as shown in (c) of FIG. 23, when it is determined that the user is in an outdoor area, based on the time at which the user has applied the plurality of taps, the controller 180 can output an alarm screen 2320 for alarming the user that the day's last train will leave soon to the display unit 151.

That is, the mobile terminal 100 according to an embodiment of the present invention allows information on at least one place based on the current situation of the user among places near the current position of the user to be displayed on the alarm screen. For example, when the user applies the plurality of taps, the user may determine whether or not the user is in an outdoor region through the intensity of the sensed electric current. When it is determined that the user is in an outdoor area, the controller 180 can sense a time at which the plurality of taps are applied. When the time at which the plurality of taps are applied approaches a preset specific time (for example, a last train time) to a certain degree or more, the controller 180 can output an alarm screen for inform the user of the approach to at least a portion of the display unit 151.

Here, the alarm screen may include different contents depending on the user's situation although the time at which the plurality of taps are applied is the same. For example, an alarm screen corresponding to the specific time may include contents for reminding the user of something when it is determined that the user is in an indoor area and include information on a train time as shown in (c) of FIG. 23 when it is determined that the user is in an outdoor area.

The specific time may be previously set by the user or automatically set based on the current situation of the user. For example, when it is determined that the user is in an outdoor region, the controller 180 can receive information on a bus stop or a subway station the closest to the current position of the user through a web search or from a designated external server, and check a time at which a last bus or train passes through the bus stop or subway station from the received information. In addition the controller 180 can automatically set the checked time to the specific time.

In this instance, when the time at which the plurality of taps are applied by the user is within a preset time before the checked pass time, the controller 180 can display an alarm screen including the remaining time to the checked pass time and information on transportation corresponding to the checked pass time to at least a portion of the display unit 151.

It has been described that the mobile terminal 100 according to an embodiment of the present invention performs a function of displaying, on the display unit 151, an alarm screen including specific information based on whether the user who applies the plurality of taps is in an outdoor region or in an indoor region, the user's position, and the time at which the plurality of taps are applied. However, the mobile terminal 100 according to an embodiment of the present invention may further perform various functions in addition to the functions of displaying alarm screens.

For example, the mobile terminal 100 according to an embodiment of the present invention may further sense an operation state of the user, and perform more various functions based on the sensed operation state of the user. For example, the controller 180 of the mobile terminal 100 according to an embodiment of the present invention may determine whether the user is walking or running using values sensed by various sensors that are included in the state sensing unit 142.

As an example, the state sensing unit 142 can include at least one sensor, such as an acceleration sensor and an inertial sensor, for detecting a movement state of the mobile terminal 100 and determine whether the user is walking or running based on the sensing results of the sensors. In addition, when the user is walking or running, the state sensing unit 142 can previously store the sensing result of the sensors included in the state sensing unit 142 as operation state information of the user. Furthermore, the controller 180 can determine whether the user is walking or running according to the operation state information corresponding to the sensing result of the state sensing unit 142.

In addition, the controller 180 can measure position information of the user at a certain period of time to determine whether the user is walking or running based on a speed of the user's position. When the operation state of the user is determined as a waking state or a running state, the controller 180 can perform different functions based on the determined operation state of the user.

Figure 24A:
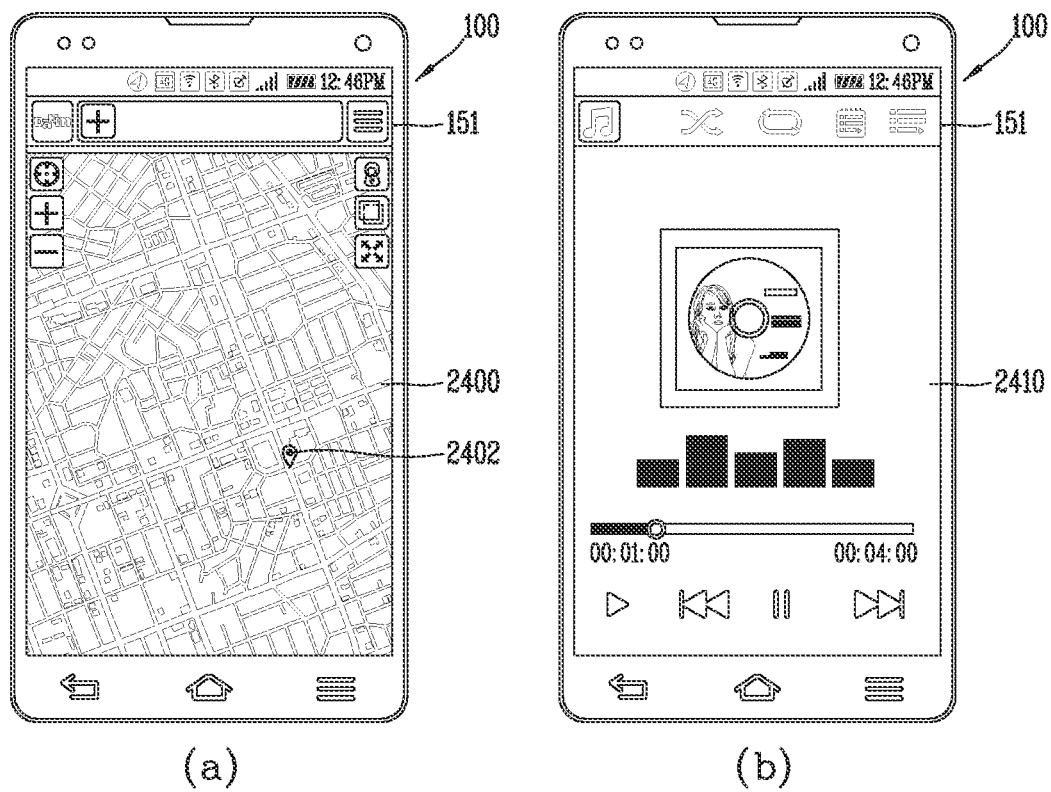
FIGS. 24A and 24B are views showing an example in which a mobile terminal performs its associated function based on a sensed a user's operation state.
Figure 24B:
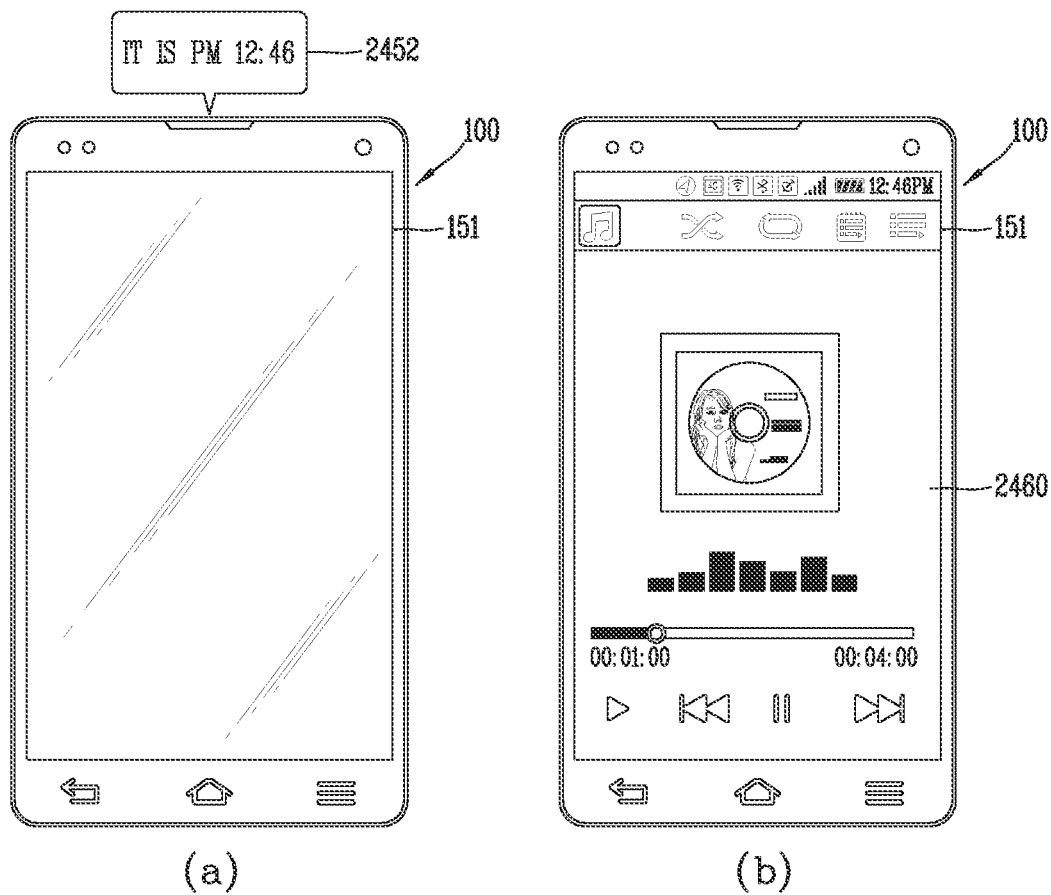

FIGS. 24A and 24B are views showing an example in which a mobile terminal performs its associated function based on a sensed operation state of a user. First, FIG. 24A shows an example of functions that are executable when it is determined that the user is walking. For example, when the user applies the plurality of taps to the display unit 151, the controller 180 can determine whether or not the user wears a glove based on the intensity of the sensed electric current.

As the determination result, when it is determined that the user wears a glove, the controller 180 can determine that the user is in an outdoor area and may further determine an operation state of the user. For example, as described above, the controller 180 can measure the position of the user at a certain time interval and determine that the user is walking when the position of the user is moved and a speed of the movement is less than or equal to a certain speed.

In addition, the controller 180 can use a value measured by the acceleration sensor or inertial sensor included in the state sensing unit 142 in order to measure a moving speed of the user. Furthermore, the controller 180 can compare the previously stored operation state information corresponding to the walking state with values sensed by the plurality of sensors of the state sensing unit 142 to determine that the user is walking in an external area.

As such, when it is determined that the user is walking, the controller 180 can execute a navigation function of displaying map information 2400 including the position 2042 where the user is currently positioned, on the display unit 151, as shown in (a) of FIG. 24A. In this instance, the controller 180 can display the position movement state of the user on the map information 2400 based on the sensed speed and direction of the user or based on the positions of the user that are sensed at a certain time interval.

In addition, the controller 180 can play back a sound source corresponding to the position movement state of the user. For example, the controller 180 can search the memory 160 that stores one or more sound sources for at least one sound source having a bit per minute (BPM) based on the moving speed of the user, that is, a speed at which the user walks. Furthermore, the controller 180 can generate a playback list composed of only the searched sound sources and play back the sound sources included in the generated playback list. In (b) of FIG. 24A, an example is shown in which a slow-beat sound source (for example, a sound source having BPM being less than or equal to a predetermined level) is selected and played back based on the operation state of the user who is slowly walking As the result of sensing the operation state of the user, when it is determined that the user is running, the controller 180 can execute a function based on the operation state of the user.

FIG. 24B illustrates such an example. For example, when the user applies the plurality of taps to the display unit 151, the controller 180 can determine whether or not the user wears a glove based on the intensity of the an electric current generated by a touch object that applies the plurality of taps. When the user wears a glove, the controller 180 can determine that the user is in an outdoor area and determine whether the user is running or not based on the sensing result of the state sensing unit 142 and the result of sensing the current position of the mobile terminal 100.

For example, the controller 180 can measure the movement speed of the user using the result of measuring the position of the mobile terminal 100 or the result of sensing by the sensors including an acceleration sensor or inertial sensor included in the state sensing unit 142. When the measured movement speed is greater than a certain speed, the controller 180 can determine that the user is running In this instance, when the plurality of taps are sensed, the controller 180 can also output information on the current time as a voice signal, corresponding to the plurality of taps, as shown in (a) of FIG. 24B. This allows the user to be informed of the information on the current time based on the selection of the user when the user is running In addition, the controller 180 can play back a sound source corresponding to the operation state indicating that the user is running. For example, the controller 180 can search the memory 160 that stores one or more sound sources for at least one sound source having a bit per minute (BPM) based on the moving speed of the user, that is, a speed at which the user runs. Furthermore, the controller 180 can generate a playback list composed of only the searched sound sources and play back the sound sources included in the generated playback list. In (b) of FIG. 24B, an example is shown in which a fast-beat sound source (for example, a sound source having BPM being greater than a predetermined level) is selected and played back based on the operation state of the user who is running When the user is walking or running, the controller 180 can play back another sound source based on the position of the user. For example, when the sensed current position of the user is a specific place (for example, a park) designated by the user, the controller 180 can play back a preset sound source corresponding to the specific place. Thus, if the user takes a break in a park during a stroll or jogging, a sound source corresponding to the user's situation in which the user takes a break may be selected and played back.

When the user walks or runs, various functions that are determined based on the plurality of taps may be determined based on the state in which the plurality of taps are sensed. For example, when the user applies a plurality of taps to the display unit 151 with one gloved hand finger, the control unit may execute a navigation function or a current time informing function, as shown in (a) of FIG. 24A and (a) of FIG. 24B. However, when the user applies a plurality of taps to the display unit 151 with both-gloved-hand fingers, the control unit may execute a navigation function or a current time informing function, as shown in (a) of FIG. 24A and (a) of FIG. 24B.

It has been described as an example that it is determined whether the user is in an outdoor area based on the intensity of the electric current sensed from the touch object. Even when the user does not wear a glove, it may be determined whether the user is in an outdoor area or not. For example, when the user applies a plurality of taps to the display unit 151 while not wearing a glove, the controller 180 can further sense an ambient environment of the mobile terminal 100 to determine whether the user is in an outdoor area.

Figure 25:
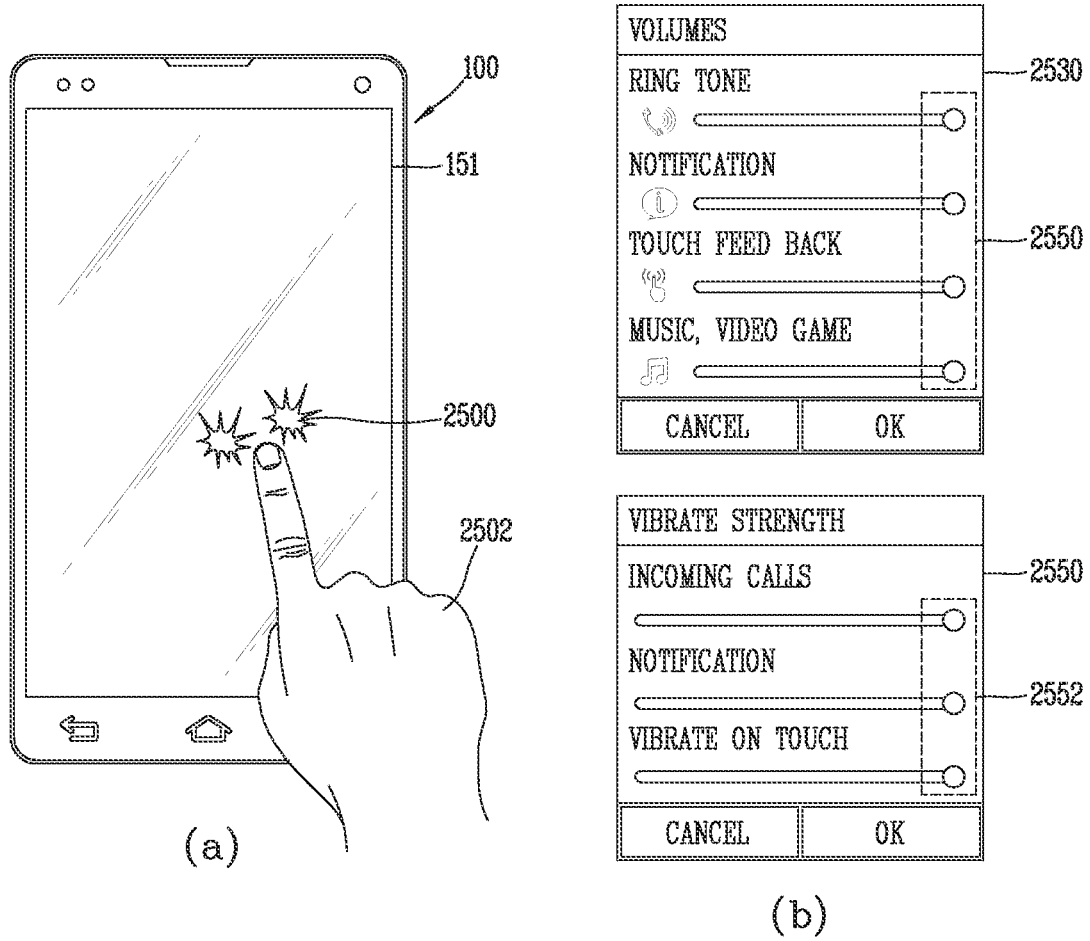
FIG. 25 is a view showing an example in which a mobile terminal changes its setting state based on the intensity of an electric current that is sensed from a touch object and a sensed surrounding environment according to an embodiment of the present invention.

FIG. 25 is a view showing an example in which a mobile terminal changes its setting state based on the intensity of an electric current sensed from a touch object according to an embodiment of the present invention. For example, as shown in (a) of FIG. 25, when the user applies a plurality of taps to the display unit 151 while not wearing a glove, the controller 180 can determine that the user does not wear the glove based on the intensity of an electric current generated by a touch object. In this instance, the controller 180 can determine whether the user is in an outdoor area or not based on the sensing results of the illumination sensor of the state sensing unit 142 and the position information module 115.

As an example, the controller 180 can determine whether the user is in an outdoor area or in an indoor area based on a time at which the plurality of taps are sensed and illumination around the mobile terminal 100. For example, when the current time is a nighttime, the controller 180 can determine that the user is in an indoor area when the illumination is greater than or equal to a predetermined level and determine that the user is in an outdoor area when the illumination is less than the predetermined level.

When it is determined that the user is in an outdoor area, as shown in (b) of FIG. 25, the controller 180 can change a setting state of the mobile terminal 100 corresponding to the state in which the user is in an outdoor area. Furthermore, similarly to as shown in (b) of FIG. 21, the controller 180 can set different values based on the current time.

When it may be determined that the user is in an outdoor area though the user applies the plurality of taps with a bare hand, similarly to as shown in FIGS. 22 to 24, the controller 180 can execute one or more various functions using at least one of the time at which the plurality of taps are applied and the result of determining the operation state of the user.

That is, when it is determined that the user is in an outdoor area though the user applies a plurality of taps with a bare hand, the controller 180 can execute a flash function or mirror function based on the time at which the plurality of taps are applied. In addition, the controller 180 can sense the current position of the user to execute an alarm function of displaying information on a region in which the user is positioned on the display unit 151.

Furthermore, the controller 180 can further sense the operation state of the user, and execute a navigation function or a function of directly informing the user of the current time using a voice based on whether the user is walking or running. In addition, the controller 180 can play back sound sources having different beat rates based on whether the user is walking or running. Moreover, based on whether the user has applied the plurality of taps with one finger or with fingers from both hands, the controller 180 can execute any one of the navigation function and a slow-beat music playback function or any one of the time information voice informing function and a fast-beat music playback function.

It has been described as an example that different functions are performed based on the time at which the plurality of taps are sensed and the operation state of the user. However, a mobile terminal according to an embodiment of the present invention may execute a specific function based on a state of the display unit 151 as well as the operation state of the user.

Figure 26:
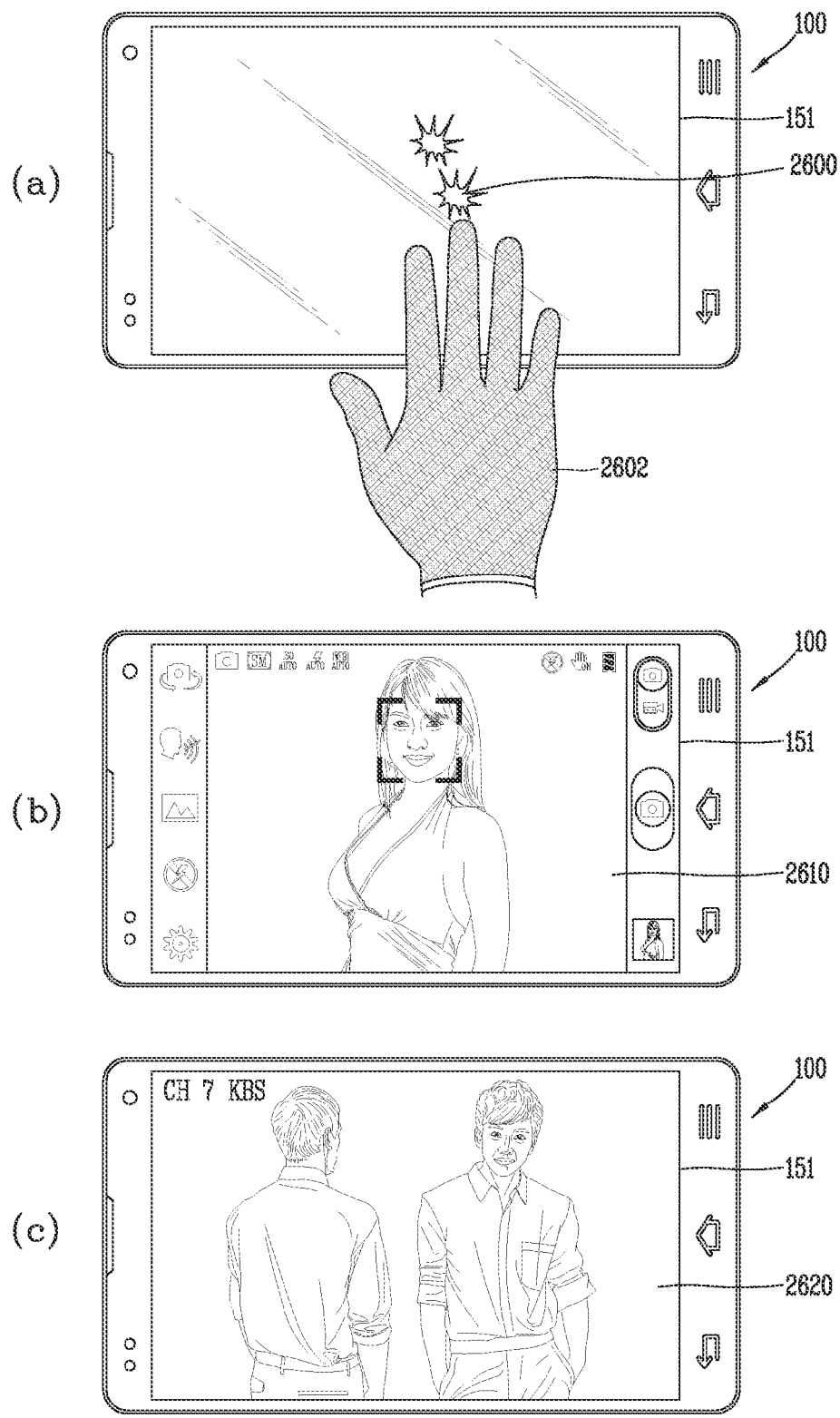
FIG. 26 is a view showing an example in which a mobile terminal performs different functions based on a state of the mobile terminal and a user's situation according to an embodiment of the present invention.

FIG. 26 is a view showing an example in which a mobile terminal performs different functions based on the state of the mobile terminal and a situation of a user according to an embodiment of the present invention. For example, when the user applies the plurality of taps, the controller 180 can determine whether the user is in an outdoor area or in an indoor area based on whether the user wears a glove. In this instance, when display unit 151 of the mobile terminal 100 is in a landscape mode (for example, a horizontal viewing mode), the controller 180 can execute various functions according to the state of the display unit 151, as shown in (a) of FIG. 26.

For example, when it is determined that the user is in an outdoor area and the display unit 151 is in the landscape mode, the controller 180 can execute a camera function, as shown in (b) of FIG. 26. However, when it is determined that the user is in an indoor area or the user is on board a subway, a bus, or a train, the controller 180 can execute a function of outputting a DMB broadcasting or a function of playing back video data, as shown in (c) of FIG. 26.

Here, as the position sensing result of the mobile terminal 100, when it is sensed that the user moves very quickly (at a speed exceeding a predetermined speed) or the sensing is failed (for example, the user is in a basemen), or when the number of times the handover occurs in the mobile terminal 100 within a predetermined time is greater than a certain number, the controller 180 can determine that a user holding the mobile terminal 100 is on board a means of transportation such as a subway, a bus, and a train. Alternatively, the controller 180 can determine that the user is on board a specific means of transportation through a vibration pattern (for example, a vibration pattern caused when a subway train stops for 2 to 3 minutes at every station) that has been previously stored by the user.

As described above, the mobile terminal 100 can recognize various ambient situations of the user and perform various functions based on the recognized ambient situations of the user. However, the mobile terminal 100 according to an embodiment of the present invention may execute a variety of different functions based on a place where the user is positioned or a place where the mobile terminal 100 is placed.

Figure 27:
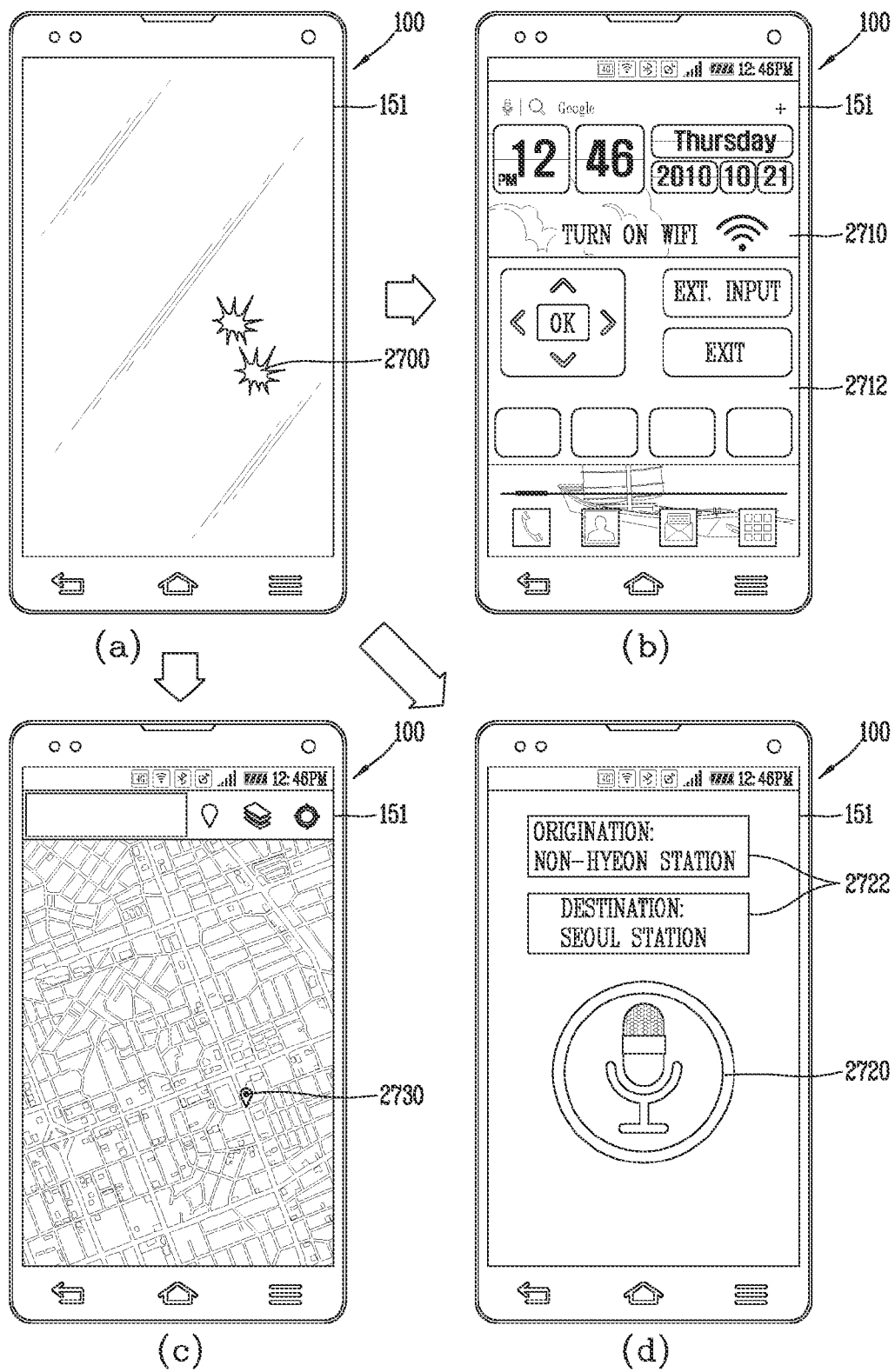
FIG. 27 is a view showing an example in which a mobile terminal performs different functions based on the current position according to an embodiment of the present invention.

FIG. 27 is a view showing an example in which a mobile terminal performs different functions based on the current position according to an embodiment of the present invention. First, as shown in (a) of FIG. 27, if the plurality of taps are applied to the mobile terminal 100, the controller 180 can further include whether the mobile terminal 100 is positioned at a specific place. That is, when the position is in a predetermined specific place as a result of receiving current position information from a separate apparatus provided in the predetermined specific place or as a result of determining the current position, the controller 180 can execute a function corresponding thereto.

For example, when the current position is in a specific place as a result of sensing the current position, or when a signal transmitted from a specific apparatus (for example, a wireless router provided in the use's house) provided in the specific place is received, the controller 180 can determine that the user is positioned in the specific place. Alternatively, when a predetermined at least one peripheral device is sensed around the mobile terminal 100, the control unit may determine that the current position is in a predetermined specific place. In this instance, the controller 180 can execute a predetermined function related to the connected peripheral device.

Such a function may be a controlling at least one home appliance provided in the user's house, as shown in (b) of FIG. 27. Alternatively, the function may be a function of checking a state of the connected wireless router and controlling the connected wireless router. In this instance, as shown in (b) of FIG. 27, the controller 180 can divide the display unit 151 into a plurality of regions, and display screen information related to the connection peripheral device on at least one region. Accordingly, as shown in (b) of FIG. 27, a screen 2710 for displaying a state of the wireless router, a screen 2712 for selecting and controlling any one of multiple home appliances, and so on may be displayed on the display unit 151.

When the mobile terminal 100 is placed in a specific position, the controller 180 can perform a specific function. For example, when the mobile terminal 100 is placed in a car-mount holder, the controller 180 can sense that the current position is inside a vehicle through communication connection with an electronic control system of the vehicle or due to a near field communication (NFC) tag provided inside the vehicle.

In this instance, the controller 180 can execute a navigation function as a function corresponding to predetermined function related to the connected peripheral device. Accordingly, as shown in (c) of FIG. 27, the controller 180 can display map information including a current position 2730 of a vehicle on the display unit 151 and receive information on an origination and a destination from the user to display a route from the current position to the destination.

Here, in consideration of when the user is driving, as shown in (d) of FIG. 27, the controller 180 can execute a voice input function that allows the user to input the information on the origination and the destination using his/her voice. In this instance, the controller 180 can display a graphic object 2720 for indicating that the voice input function is being executed on the display unit 151. Furthermore, while the voice input function is executed, the controller 180 can convert the voice signal input from the user into character information on the origination or destination and display the character information on at least a partial region 2722 of the display unit 151, thereby allowing the user to confirm the origination and the destination that are input by the user.

The mobile terminal and the control method thereof according to an embodiment of the present invention selects a user's desired function of the mobile terminal based on the user's tap input to a main body of the mobile terminal, thus allowing the user to more easily execute the desired function of the mobile terminal.

The mobile terminal and the control method thereof according to an embodiment of the present invention can also output a virtual keyboard based on the user's tap input and process information input through the virtual keyboard in association with an executable function, thus allowing the user to easily and conveniently use a function of the mobile terminal related to character input.

The mobile terminal and the control method thereof according to an embodiment of the present invention may recognize a state of a user who applies a tap to the mobile terminal and provide a user interface screen more suitable for the user according to the recognized state of the user.

Further, the mobile terminal and the control method thereof according to an embodiment of the present invention may recognize a state and an ambient situation of the mobile terminal, determine a current operation state of the user, and provide a more suitable user interface to the determined operation state of the user.

In addition, according to an embodiment of the present invention, the above-described method may be implemented in a program recording medium as a processor readable code. Examples of processor readable medium include a ROM, a RAM, a CD-ROM, a magnetic tape, a floppy disk, and an optical data storage. Further, the processor readable medium may be implemented in the form of a carrier wave such as Internet transmission.

While the present invention has been described in connection with the embodiments thereof, various modifications and variations can be made without departing from the scope of the present invention. Specifically, in an embodiment of the present invention, it has been described as an example that when the display unit is deactivated and the plurality of taps are applied by the user, the controller 180 can output a virtual keyboard, receive any one of character input-related functions from the user the virtual keyboard is output, and process information input through the virtual keyboard in association with the selected character input-related function. However, the present invention is not limited thereto.

That is, for example, when the plurality of taps are applied to the main body or the display unit 151, the controller 180 can change a function executable by the mobile terminal to a different function other than the character input function. That is, for example, if the user selects a specific music file playback function as a function executed when the user applies a plurality of taps while the display unit 151 are deactivated, the controller 180 can output a screen for selecting a specific music file in response to the plurality of taps applied on the display unit 151 while the display unit 151 is deactivated. When the specific music file is selected by the user, the controller 180 can select any one of its associated functions, such as a bell sound setting function, an alarm setting function, or a music playback function, that may use the music file based on the user's input. In addition, the controller 180 can perform the selected function using the currently selected music file.

In addition, it has been described that an icon is enlarged when the user wear a glove or a navigation function or music playback function is executed based on an operation state of the user. However, functions other than the above described functions may be executed.

For example, when a user select a function such as a passometer, an ictometer, and a calorimeter as a function to be executed while the user wears a glove, that is, a function to be executed in a glove mode, and the plurality of taps are applied to the main body or the display unit 151, the controller 180 of the mobile terminal 100 may execute a function that has been previously set to be executed. In addition, when the user applies the plurality of taps to the main body or the display unit 151 while wearing a glove according to the selection of the user, the control unit may not operate in a glove mode in which such functions have been previously set to be executed.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a wireless communication unit configured to provide wireless communication;
   a touch screen; and
   a controller configured to:
   receive a plurality of taps applied to the touch screen, and
   display at least one function executable by the mobile terminal on the touch screen based the received plurality of taps and based on at least one of an operating state or an ambient environmental state of the mobile terminal,
   wherein the controller is further configured to:
   determine whether a user tapping the mobile terminal is wearing a glove based on an electric current generated from tapping the mobile terminal, and
   display a first user interface corresponding to a glove wearing state when the controller determines the user is wearing a glove and display a second user interface corresponding to a non-glove wearing state when the controller determines the user is not wearing a glove.

2. The mobile terminal of claim 1, wherein when the plurality of taps are applied while the touch screen is deactivated, the controller is further configured to display at least one icon corresponding to at least one different function executable by the mobile terminal on the touch screen based on at least one of a distance between positions in which the plurality taps are applied and angles at which the plurality of taps are applied.

3. The mobile terminal of claim 1, wherein based on the ambient brightness of the mobile terminal, the controller is further configured to display a menu screen including an icon corresponding to at least one application for adjusting a brightness of the touch screen based on the ambient brightness, when the plurality of taps are applied.

4. The mobile terminal of claim 1, wherein the first user interface includes application icons having a size larger than corresponding application icons included in the second user interface.

5. The mobile terminal of claim 1, wherein when the controller displays the first user interface, and at least one icon corresponding to at least one application related to a character input is selected, the controller is further configured to convert an input voice signal into character information to process the character information in association with the at least one application corresponding to the at least one icon.

6. The mobile terminal of claim 1, wherein when the plurality of taps are applied while the touch screen is deactivated, the controller is further configured to display a menu screen including an icon corresponding to at least one predetermined application on the touch screen based on whether the user wears a glove.

7. The mobile terminal of claim 1, wherein when the plurality of taps are applied, the controller is further configured to perform different functions based on at least one of a current time and a position movement state of the mobile terminal and based on whether the user wears a glove.

8. The mobile terminal of claim 7, wherein the controller is further configured to:
   determine whether the user is running or walking based on at least one of the current time and the position movement state, and
   when the plurality of taps are applied, output information related to a current position of the mobile terminal or information about the current time in different forms based on the determined operation state of the user.

9. The mobile terminal of claim 1, wherein when at least one peripheral device is positioned in proximity to the mobile terminal and the plurality of taps are applied, the controller is further configured to wirelessly connect to the at least one peripheral device and display information related to the connected peripheral device on the touch screen.

10. The mobile terminal of claim 1, wherein when the plurality of taps are applied to at least two different positions on the touch screen while the touch screen is operated in a doze mode, the controller is further configured to turn on a light emitting device for outputting a screen to the touch screen and display a predetermined virtual keyboard for performing a character input function to at least a portion of the touch screen and process information input through the virtual keyboard in association with the at least one function, and
   wherein the doze mode is a mode in which only the light emitting device is turned off, and the touch sensor is maintained in an on-state.

11. The mobile terminal of claim 10, wherein the controller is further configured to:
   display at least one graphic object corresponding to the at least one function on the touch screen before displaying the virtual keyboard when the plurality of taps are applied,
   receive a selection of the at least one graphic object,
   display the virtual keyboard, and
   process the information input through the virtual keyboard in association with the at least one function corresponding to the selected at least one graphic object.

12. The mobile terminal of claim 10, wherein the controller is further configured to display the virtual keyboard when the plurality of taps corresponds to a predetermined condition.

13. The mobile terminal of claim 12, wherein the predetermined condition is that a first tap indicating the touch screen is tapped a first reference number of times is applied and then a second tap indicating the touch screen is tapped a second reference number of times is applied in a predetermined time or that the first and second taps are applied to positions separated a certain distance from each other.

14. The mobile terminal of claim 10, wherein the controller is further configured to perform a search using information input through the virtual keyboard and output a search result on the touch screen.

15. The mobile terminal of claim 10, wherein the controller is further configured to:
   display a graphic object displaying at least one unchecked event on a lock screen indicating the touch screen is locked, and
   display information related to the at least one unchecked event on the touch screen based on the received plurality of taps while the lock screen is output.

16. The mobile terminal of claim 15, wherein the controller is further configured to process the information input through the virtual keyboard in association with the information displayed related to the at least one unchecked event.

17. The mobile terminal of claim 16, wherein the controller is further configured to:

display the information related to the unchecked event and the virtual keyboard to different regions of the touch screen, and process the information input through the virtual keyboard in association with the selected at least one graphic object when the plurality of taps are applied.

18. The mobile terminal of claim 17, wherein the controller is further configured to update a checked state of the at least one graphic object, and display the graphic object having the updated checked state.

19. A method of controlling a mobile terminal, the method comprising:

receiving, via a controller of the mobile terminal, a plurality of taps applied to a touch screen of the mobile terminal; and displaying at least one function executable by the mobile terminal on the touch screen based the received plurality of taps and based on at least one of an operating state or an ambient environmental state of the mobile terminal, wherein the method further comprises:

determining whether a user tapping the mobile terminal is wearing a glove based on an electric current generated from tapping the mobile terminal; and displaying a first user interface corresponding to a glove wearing state when the controller determines the user is wearing a glove and displaying a second user interface corresponding to a non-glove wearing state when the controller determines the user is not wearing a glove.

* * * * *